(12) United States Patent
Oommen et al.

(10) Patent No.: US 7,508,935 B2
(45) Date of Patent: Mar. 24, 2009

(54) CRYPTOSYSTEM FOR DATA SECURITY

(75) Inventors: B. John Oommen, North Gower (CA); Luis G. Rueda, Windsor (CA)

(73) Assignee: 3927296 Canada, Inc., Ontario (CA)

( * ) Notice: Subject to any disclaimer, the term of this patent is extended or adjusted under 35 U.S.C. 154(b) by 494 days.

(21) Appl. No.: 10/811,493

(22) Filed: Mar. 24, 2004

(65) Prior Publication Data

US 2004/0223608 A1 Nov. 11, 2004

Related U.S. Application Data

(63) Continuation of application No. PCT/CA01/01429, filed on Oct. 15, 2001.

(30) Foreign Application Priority Data

Nov. 25, 2001 (CA) .................................... 2358048

(51) Int. Cl.
- *H04K 1/00* (2006.01)
- *H04K 1/04* (2006.01)
- *H04L 9/00* (2006.01)

(52) U.S. Cl. .............................. 380/28; 380/37; 380/268

(58) Field of Classification Search ................... 380/28, 380/37, 268
See application file for complete search history.

(56) References Cited

U.S. PATENT DOCUMENTS

| | | | | |
|---|---|---|---|---|
| 4,906,991 A * | 3/1990 | Fiala et al. | ..................... | 341/51 |
| 4,935,877 A * | 6/1990 | Koza | ........................... | 706/13 |
| 4,951,139 A * | 8/1990 | Hamilton et al. | ........ | 375/240.07 |
| 5,003,307 A * | 3/1991 | Whiting et al. | ............... | 341/51 |
| 5,377,266 A * | 12/1994 | Katta et al. | .................. | 380/217 |
| 5,490,258 A * | 2/1996 | Fenner | .......................... | 711/1 |
| 5,784,631 A * | 7/1998 | Wise | .......................... | 382/246 |
| 6,075,864 A * | 6/2000 | Batten | ........................ | 380/255 |
| 6,122,378 A * | 9/2000 | Yoshiura et al. | ............. | 380/217 |
| 6,272,257 B1 * | 8/2001 | Prokop | ........................ | 382/246 |
| 6,411,714 B1 * | 6/2002 | Yoshiura et al. | ............. | 380/269 |
| 6,697,488 B1 * | 2/2004 | Cramer et al. | ................ | 380/30 |
| 6,748,116 B1 * | 6/2004 | Yue | ............................. | 382/238 |
| 6,885,749 B1 * | 4/2005 | Chang et al. | ................ | 380/269 |
| 2003/0215093 A1 | 11/2003 | Ding | | |
| 2004/0156498 A1 | 8/2004 | Paeng et al. | | |

\* cited by examiner

*Primary Examiner*—Emmanuel L Moise
*Assistant Examiner*—Techane J Gergiso
(74) *Attorney, Agent, or Firm*—Katten Muchin Rosenman LLP

(57) ABSTRACT

A method and device for creating ciphertext from plaintext, and for decoding ciphertext, utilizing a tree structure for both encoding and decoding, the tree having leaves which are associated with plaintext symbols and the branches having assigned thereto a member of the ciphertext alphabet so that when encoding, a traversal is made between the root and the leaf corresponding to the plaintext and recording the ciphertext associated with each branch traversed, and when decoding, using the ciphertext to determine the branches to be traversed until a leaf is reached and recording the plaintext associated with that leaf.

33 Claims, 23 Drawing Sheets

(a) Huffman tree labelled using the assignment 0 to the left and 1 to the right.

(b) The labelling strategy is done by assigning 1 to the left and 0 to the right.

CRYPTOSYSTEM FOR DATA SECURITY

CROSS-REFERENCE TO RELATED APPLICATION

The present application is a continuation of and claims priority under 35 USC § 120 from International PCT Application No. PCT/CA01/01429, filed on Oct. 15, 2001 which claims priority under 35 USC § 119 from Canadian Patent Application Number 2,358,048 filed on Sep. 25, 2001.

FIELD OF THE INVENTION

The present invention relates to the field of data encoding and encryption, and in particular, to data encryption in which statistical information in the "plaintext" is removed in the transformation of the plaintext into the "ciphertext".

BACKGROUND OF THE INVENTION

The need for sending messages secretly has led to the development of the art and science of encryption, which has been used for millennia. Excellent surveys of the field and the state of the art can be found in Menezes et al. (*Handbook of Applied Cryptography*, CRC Press, (1996)), Stallings (*Cryptography & Network Security: Principles & Practice*, Prentice Hall, (1998)), and Stinson (*Cryptography: Theory and Practice*, CRC Press, (1995)).

The hallmark of a perfect cryptosystem is the fundamental property called Perfect Secrecy. Informally, this property means that for every input data stream, the probability of yielding any given output data stream is the same, and independent of the input. Consequently, there is no statistical information in the output data stream or ciphertext, about the identity and distribution of the input data or plaintext.

The problem of attaining Perfect Secrecy was originally formalized by C. Shannon in 1949 (see Shannon (Communication Theory of Secrecy Systems, *Bell System Technical Journal*, 28:656-715, (1949))) who has shown that if a cryptosystem possesses Perfect Secrecy, then the length of the secret key must be at least as large as the plaintext. This restriction makes Perfect Secrecy impractical in real-life cryptosystems. An example of a system providing Perfect Secrecy is the Vernam One-time pad.

Two related open problems in the fields of data encoding and cryptography are:

1. Optimizing the Output Probabilities

There are numerous schemes which have been devised for data compression/encoding. The problem of obtaining arbitrary encodings of the output symbols has been studied by researchers for at least five decades. Many encoding algorithms (such as those of Huffman, Fano, Shannon, the arithmetic coding and others) have been developed using different statistical and structure models (e.g. dictionary structures, higher-order statistical models and others). They are all intended to compress data, but their major drawback is that they cannot control the probabilities of the output symbols. A survey of the field is found in Hankerson et al. (*Introduction to Information Theory and Data Compression*, CRC Press, (1998)), Sayood (*Introduction to Data Compression*, Morgan Kaufmann, 2nd. edition, (2000)), and Witten et al. (*Managing Gigabytes: Compressing and Indexing Documents and Images*, Morgan Kaufmann, 2nd. edition, (1999)).

Previous schemes have a drawback, namely that once the data compression/encoding method has been specified, the user loses control of the contents and the statistical properties of the compressed/encoded file. In other words, the statistical properties of the output compressed file is outside of the control of the user—they take on their values as a consequence of the statistical properties of the uncompressed file and the data compression method in question.

A problem that has been open for many decades (see Hankerson et al. (*Introduction to Information Theory and Data Compression*, CRC Press, (1998) pp.75-79)), which will be referred to herein as the Distribution Optimizing Data Compression (or "DODC") problem, (or in a more general context of not just compressing the plaintext, it will be referred to herein as the Distribution Optimizing Data Encoding (or "DODE") problem), consists of devising a compression scheme, which when applied on a data file, compresses the file and simultaneously makes the file appear to be random noise. The formal definition of this problem is found in Appendix A. If the input alphabet is binary, the input probability of '0' and '1' could be arbitrary, and is fully dictated by the plaintext. The problem of the user specifying the output probability of '0' and '1' in the compressed file has been considered an open problem. Indeed, if the user could specify the stringent constraint that the output probabilities of '0' and '1' be arbitrarily close to 0.5, the consequences are very far-reaching, resulting in the erasure of statistical information.

2. Achieving Statistical Perfect Secrecy

The problem of erasing the statistical distribution from the input data stream and therefore the output data stream, has fundamental significance in cryptographic applications. It is well known that any good cryptosystem should generate an output that has random characteristics (see Menezes et al. (*Handbook of Applied Cryptography*, CRC Press, (1996)), Stallings (*Cryptography & Network Security: Principles & Practice*, Prentice Hall, (1998)), Stinson (*Cryptography: Theory and Practice*, CRC Press, (1995)), and Shannon (Communication Theory of Secrecy Systems, *Bell System Technical Journal*, 28:656-715, (1949))).

A fundamental goal in cryptography is to attain Perfect Secrecy (see Stinson, *Cryptography: Theory and Practice*, CRC Press, (1995))).

Developing a pragmatic encoding system that satisfies this property is an open problem that has been unsolved for many decades. Shannon (see Menezes (*Handbook of Applied Cryptography*, CRC Press, (1996)), Stallings *Cryptography & Network Security: Principles & Practice*, Prentice Hall, (1998)), Stinson (*Cryptography: Theory and Practice*, CRC Press, (1995)), and Shannon (Communication Theory of Secrecy Systems, *Bell System Technical Journal*, 28:656-715, (1949))) showed that if a cryptosystem possesses Perfect Secrecy, then the length of the secret key must be at least as large as the Plaintext. This makes the development of a realistic perfect secrecy cryptosystem impractical, such as demonstrated by the Vernam One-time Pad.

Consider a system in which X=x[1] ... x[M] is the plaintext data, stream, where each x[k] is drawn from a plaintext alphabet, S={$s_1$, ... $s_m$}, and Y=y[1] ... y[R] is the ciphertext data stream, where each y[k]∈A of cardinality r.

Informally speaking, a system (including cryptosystems, compression systems, and in general, encoding systems) is said to possess Statistical Perfect Secrecy if all its contiguous output sequences of length k are equally likely, for all values of k, independent of X. Thus, a scheme that removes all statistical properties of the input stream also has the property of Statistical Perfect Secrecy. A system possessing Statistical Perfect Secrecy maximizes the entropy of the output computed on a symbol-wise basis.

More formally, a system is said to possess Statistical Perfect Secrecy if for every input X there exists some integer $j_0 \geq 0$ and an arbitrarily small positive real number $\delta_0$ such that for all $$j > j_0, \, Pr[y_{j+1} \ldots y_{j+k} \mid \chi] = \frac{1}{r^k} \pm \delta_0 \text{ for all } k, \, 0 < k < R - j_0.$$

A system possessing this property is correctly said to display Statistical Perfect Secrecy. This is because for all practical purposes and for all finite-lengthened subsequences, statistically speaking, the system behaves as if it indeed, possessed the stronger property of Perfect Secrecy.

It is interesting to note that Statistical Perfect Secrecy is related to the concept of Perfect Secrecy. However, since the property of Statistical Perfect Secrecy can characterize any system and not just a cryptosystem, there is no requirement of relating the size of the key to the size of the input, as required by Shannon's theorem.

SUMMARY OF THE INVENTION

The object of the present invention is to provide an improved method of encoding and decoding data, which permits the user to specify certain statistical parameters of the ciphertext, and to control or remove statistical information during the process of encoding plaintext into ciphertext.

It is a further object of an embodiment of the present invention to provide an improved method of encoding and decoding data, which permits the user to obtain Statistical Perfect Secrecy in the ciphertext.

It is a further object of an embodiment of the present invention to provide an improved method of encoding and decoding data, which ensures that Statistical Perfect Secrecy in the ciphertext has been obtained.

It is a further object of an embodiment of the present invention to provide an improved method of encryption and decryption.

It is a further object of an embodiment of the present invention to provide an improved method of steganography.

It is a further object of an embodiment of the present invention to provide an improved method of secure communications.

It is a further object of an embodiment of the present invention to provide an improved method of secure data storage and retrieval.

Accordingly, in one aspect, the present invention relates to a method for creating ciphertext from plaintext comprising the steps of: (a) receiving a character of plaintext; (b) traversing an Oommen-Rueda Tree between the root and that leaf corresponding to that character of plaintext and recording the Assignment Value of each branch so traversed; (c) receiving a next character of plaintext; and repeating steps (b) and (c) until the plaintext has been processed.

In another aspect, the present invention relates to a method for creating ciphertext from plaintext comprising the steps of: (a) creating an Oommen-Rueda Tree; (b) receiving a character of plaintext; (c) traversing the Oommen-Rueda Tree between the root and that leaf corresponding to that character of plaintext and recording the Assignment Value of each branch so traversed; (d) receiving a next character of plaintext; and (e) repeating steps (c) and (d) until the plaintext has been processed.

In another aspect, the present invention relates to a method for creating ciphertext from plaintext comprising the steps of: (a) receiving an Oommen-Rueda Tree; (b) receiving a character of plaintext; (c) traversing the Oommen-Rueda Tree between the root and that leaf corresponding to that character of plaintext and recording the Assignment Value of each branch so traversed; (d) receiving a next character of plaintext; and (e) repeating steps (c) and (d) until the plaintext has been processed.

In another aspect, the present invention relates to a method for creating ciphertext from plaintext comprising the steps of: (a) creating an Oommen-Rueda Tree, which Oommen-Rueda Tree has leaves associated with the members of the alphabet of the plaintext, each member of the alphabet of the plaintext being associated with at least one leaf, which Oommen-Rueda Tree's internal nodes each have at least one branch depending therefrom, which Oommen-Rueda Tree branches have associated therewith an Assignment Value, which Assignment Value is associated with a member of the alphabet of the ciphertext, which Oommen-Rueda Tree's nodes each have associated therewith a quantity related to the frequency weight (b) receiving a first character of plaintext; (c) traversing the Oommen-Rueda Tree between the root and that leaf corresponding to that character of plaintext and recording the Assignment Value of each branch so traversed; (d) receiving the next symbol of plaintext; and (e) repeating steps (c) and (d) until the plaintext has been processed.

In another aspect, the present invention relates to a method for creating ciphertext from plaintext comprising the steps of: (a) receiving an Oommen-Rueda Tree, which Oommen-Rueda Tree has leaves associated with the members of the alphabet of the plaintext, each member of the alphabet of the plaintext being associated with at least one leaf, which Oommen-Rueda Tree's internal nodes each have at least one branch depending therefrom, which Oommen-Rueda Tee branches have associated therewith an Assignment Value, which Assignment Value is associated with a member of the alphabet of the ciphertext, which Oommen-Rueda Tree's nodes each have associated therewith a quantity related to the frequency weight of each of the nodes and leaves dependant therefrom; (b) receiving a first character of plaintext; (c) traversing the Oommen-Rueda Tree between the root and that leaf corresponding to that character of plaintext and recording the Assignment Value of each branch so traversed; (d) receiving the next symbol of plaintext; and (e) repeating steps (c) and (d) until the plaintext has been processed.

In another aspect, the present invention relates to a method of decoding ciphertext, comprising the steps of: (a) receiving a first character of ciphertext; (b) utilizing an Oommen-Rueda Tree having a structure corresponding to the Oommen-Rueda Tree initially utilized by the encoder and utilizing the same Branch Assignment Rule as utilized by the encoder to provide the Assignment Values for the branches depending from the root, traversing such Oommen-Rueda Tree from the root towards a leaf, the first symbol character of ciphertext determining the branch to then be traversed; (c) if a leaf has not been reached, utilizing the same Branch Assignment Rule as utilized by the encoder to provide Assignment Values for the branches depending from the node that has been reached, receiving the next character of ciphertext, and continuing to traverse the Oommen-Rueda Tree from the node that has been reached towards a leaf, the current symbol of ciphertext determining the branch to then be traversed; (d) when a leaf is reached, recording the plaintext character associated with the label of the leaf, the root becoming the node that has been reached for the purpose of further processing; (e) repeating steps (c) and (d) until all symbols of ciphertext have been processed.

In another aspect, the present invention relates to a method of decoding ciphertext, comprising the steps of: (a) creating an Oommen-Rueda Tree (b) receiving a first character of ciphertext; (c) utilizing an Oommen-Rueda Tree having a structure corresponding to the Oommen-Rueda Tree initially utilized by the encoder and utilizing the same Branch Assignment Rule as utilized by the encoder to provide the Assignment Values for the branches depending from the root, traversing such Oommen-Rueda Tree from the root towards a leaf, the first character of ciphertext determining the branch to then be traversed; (d) if a leaf has not been reached, utilizing the same Branch Assignment Rule as utilized by the encoder to provide Assignment Values for the branches depending from the node that has been reached, receiving the next character of ciphertext, and continuing to traverse the Oommen-Rueda Tree from the node that has been reached towards a leaf, the current symbol of ciphertext determining the branch to then be traversed; (e) when a leaf is reached, recording the plaintext character associated with the label of the leaf, the root becoming the node that has been reached for the purpose of further processing; repeating steps (d) and (e) until all symbols of ciphertext have been processed.

In another aspect, the present invention relates to a method of decoding ciphertext, comprising the steps of: (a) receiving an Oommen-Rueda Tree (b) receiving a first character of ciphertext; (c) utilizing an Oommen-Rueda Tree having a structure corresponding to the Oommen-Rueda Tree initially utilized by the encoder and utilizing the same Branch Assignment Rule as utilized by the encoder to provide the Assignment Values for the branches depending from the root, traversing such Oommen-Rueda Tree from the root towards a leaf, the first character of ciphertext determining the branch to then be traversed; (d) if a leaf has not been reached, utilizing the same Branch Assignment Rule as utilized by the encoder to provide Assignment Values for the branches depending from the node that has been reached, receiving the next character of ciphertext, and continuing to traverse the Oommen-Rueda Tree from the node that has been reached towards a leaf, the current symbol of ciphertext determining the branch to then be traversed; (e) when a leaf is reached, recording the plaintext character associated with the label of the leaf, the root becoming the node that has been reached for the purpose of further processing; repeating steps (d) and (e) until all symbols of ciphertext have been processed.

The advantage of an embodiment of the present invention is that it provides a method of encoding and decoding data, which encoded data has the Statistical Perfect Secrecy property.

A further advantage of an embodiment of the present invention is that it guarantees that the encoded message has the Statistical Perfect Secrecy property.

A further advantage of an embodiment of the present invention is that it can be adapted to simultaneously provide optimal and lossless compression of the input data stream in a prefix manner.

A further advantage of an embodiment of the present invention is that it can also be adapted to simultaneously provide an output of the same size or larger than the input data stream in a prefix manlier.

A further advantage of an embodiment of the present invention is that it provides an improved method of encryption and decryption.

A further advantage of an embodiment of the present invention is that it provides an improved method of steganography.

A further advantage of an embodiment of the present invention is that it provides an improved method of secure communications.

A further advantage of an embodiment of the present invention is that it provides an improved method of secure data storage and retrieval.

DESCRIPTION OF THE PREFERRED EMBODIMENTS

Figure 1:
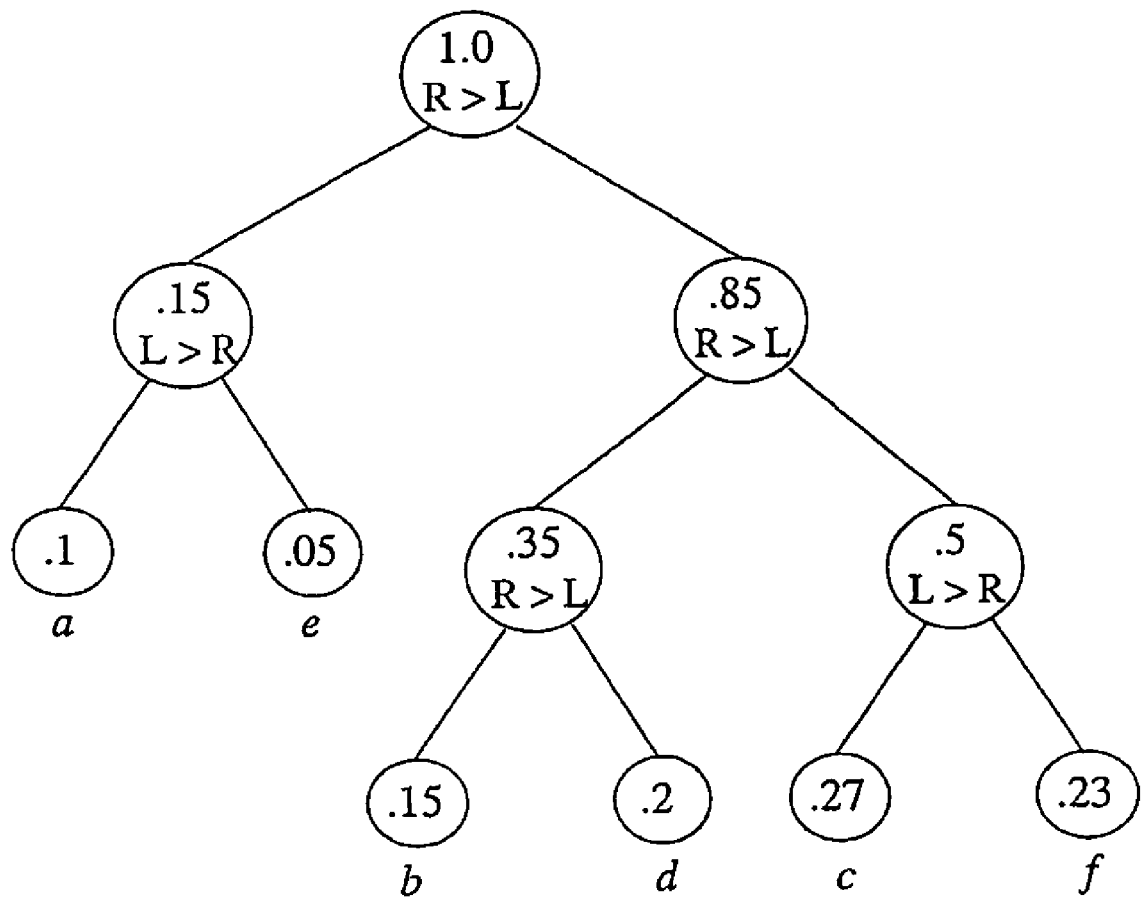
FIG. 1 presents an Oommen-Rueda Tree in which the input alphabet S={a, b, c, d, e, f} with probabilities P={0.1, 0.15, 0.27, 0.2, 0.05, 0.23}, and the output alphabet is A={0, 1}. The root points to two children. Each node stores a weight, which is the sum of the weights associated with its children. It also stores the ordering of the children in terms of their weights, i.e., whether the weight of the left child is greater than that of the right child, or vice versa. Although, in this example, the encoding does not achieve optimal data compression, using DODE, arbitrary output probabilites can be achieved.
Figure 2:
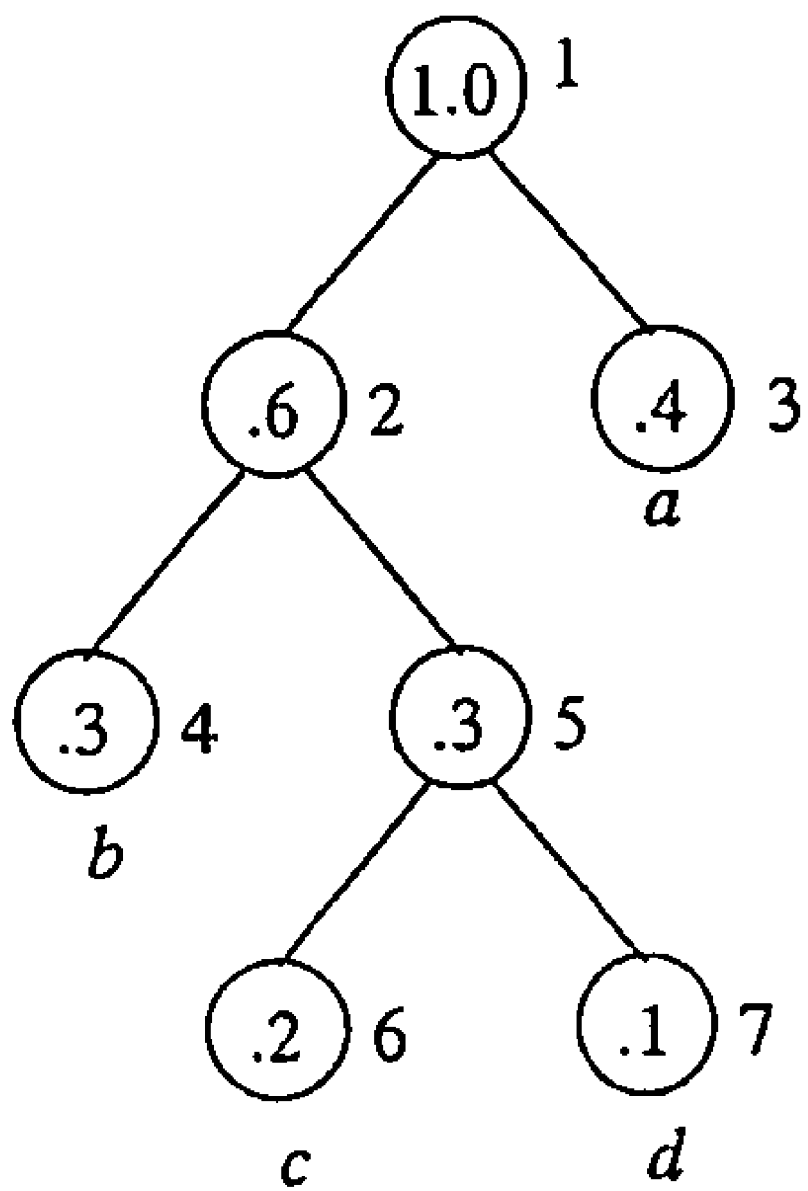
FIG. 2 presents a Huffman tree constructed using Huffman's algorithm with S={a, b, c, d}, P={0.4, 0.3, 0.2, 0.1}, and A={0, 1}.

The invention operates on a data structure referred to as the Oommen-Rueda Tree defined as below for a plaintext alphabet of cardinality m and an ciphertext alphabet of cardinality r, where the desired output frequency distribution is F* and its measured (estimated) value is $\hat{F}$.

The Oommen-Rueda Tree

An optimized Oommen-Rueda Tree is defined recursively as a set of Nodes, Leaves and Edges as follows:

1. The tree is referenced by a pointer to the tree's root—which is a unique node, and which has no parents.
2. Every node contains a weight which is associated with the sum of the weights associated with its children (including both nodes and leaves).
3. In a typical Oommen-Rueda Tree, every node has r edges (or branches), each edge pointing to one of its r children, which child could be a node or a leaf. However, if any node has less than r children, it can be conceptually viewed as having exactly r children where the rest of the children have an associated weight of zero.
4. Every node maintains an ordering on its children in such a way that it knows how the weights of the children are sorted.
5. Each plaintext alphabet symbol is associated with a leaf (where a leaf is a node that does not have any children). The weight associated with each leaf node is associated with the probability (or an estimate of the probability) of the occurrence of the associated plaintext symbol.
6. A hashing function is maintained which maps the source alphabet symbols to the leaves, thus ensuring that when an input symbol is received, a path can be traced between the root and the leaf corresponding to that; input symbol. An alternate approach is to search the entire tree, although this would render the Oommen-Rueda Process less efficient.
7. If the input symbol probabilities are known a priori, the Oommen-Rueda Tree is maintained statically. Otherwise, it is maintained adaptively in terms of the current estimates of the input probabilities, by re-ordering the nodes of the tree so as to maintain the above properties.

Specific instantiations of the Oommen-Rueda Tree are the Huffman tree, and the Fano tree, in which the ordering of the nodes at every level obeys a sibling-like property (see Hankerson et al. (*Introduction to Information Theory and Data Compression*, CRC Press, (1998))).

It is to be understood that the Oommen-Rueda Trees referred to herein, include those less optimal versions of the above-defined Oommen-Rueda Tree which can be designed by introducing nodes, leaves and edges which have no significant contribution, or whose significance can be minimized by merging them with other nodes, leaves and edges respectively, resulting in a Oommen-Rueda Tree with a lesser number of nodes, leaves and edges respectively.

It is further to be understood that if the sibling property is not maintained in a left-to-right order, the corresponding assignments will not be made in a left-to-right order.

It is to be understood that the term "plaintext" encompasses all manner of data represented symbolically and includes, but is not limited to, data utilized in the processing of audio data, speech, music, still images, video images, electronic mail, internet communications and others.

Finally, it is to be understood that the combination of the Oommen-Rueda Tree with the encoding and decoding processes described herein, will provide, a solution of the Distribution Optimizing Data Encoding problem in which the output may be compressed, of the same size, or even expanded.

The Encoding Process Utilizing Oommen-Rueda Trees

The encoding process related to Oommen-Rueda Trees involves traversing (in accordance with a hashing function maintained for the Oommen-Rueda Tree) the Oommen-Rueda Tree between the root and the leaf corresponding to the current plaintext symbol, and recording the branch assignment of the edges so traversed, which branch assignment is determined in accordance with the Branch Assignment Rule. The actual encoding of the current plaintext symbol is done by transforming the plaintext input symbol into a string associated with the labels of the edges (determined as per the Branch Assignment Rule) on the path from the root to the leaf associated with that plaintext symbol.

It is understood that the traversal of the Oommen-Rueda Tree (as dictated by the Hashing function) in the Encoding Process can be achieved either in root-to-leaf manner, or in a leaf-to-root manner, in which latter case the output stream is reversed for that particular plaintext symbol.

The Branch Assignment Rule

1. This Rule determines the assignment of labels on the edges of the tree, the labels being associated with the symbols of the output alphabet.
2. The assignment can be chosen either deterministically, or randomly involving a fixed constant, or randomly by invoking random variables whose distributions do not depend on the current measurement (or estimate), $\hat{F}$, or randomly by invoking at least one random variable whose distribution depends on the current measurement (or estimate), $\hat{F}$.
3. The assignments can be made so as to converge to the predetermined value of F*. Additionally, the Branch Assignment Rule can be designed so that the Process converges to a probability distribution which simultaneously maintains the independence of the output symbols. This can be achieved by utilizing the Markovian history, for example, using $f_{0|0}$, and $f_{0|1}$ to converge to $f^*_{0|0}$, and $f^*_{0|1}$ respectively, when the output alphabet is binary.

The Tree Restructuring Rule

1. If the Oommen-Rueda Tree is updated adaptively, the updating of the Oommen-Rueda Tree is done after the processing of each plaintext symbol has been affected. For example, in the case of the Huffman tree, the updating is achieved by using the technique described by Knuth (Dynamic Huffman Coding, *Journal of Algorithms*, 6:163-180, (1985)), or Vitter (Design and Analysis of Dynamic Huffman Codes, *Journal of the ACM*, 34(4):825-845, (1987)), wherein the tree is updated so as to maintain the sibling property at every level of the tree.
2. For other instantiations of the Oommen-Rueda Trees, it is to be understood that the Tree Restructuring Rule can be affected by either re-creating the tree using an exhaustive search of all possible Oommen-Rueda Trees characterizing that instantiation, or by incrementally modifying them based on the properties of the particular instantiation.

The Decoding Process Utilizing Oommen-Rueda Trees

The decoding process assumes that the Decoder can either create or is provided with an Oommen-Rueda Tree, which Tree is identical to the Oommen-Rueda tree utilized by the Encoder to encode the any pre-specified plaintext symbol. The actual decoding process involves the steps of:

1. Traversing the Decoder's copy of the Oommen-Rueda Tree from the root to a leaf, the traversal being determined by the same Branch Assignment Rule utilized by the Encoder, and the ciphertext symbols.
2. The label of the leaf is recorded as the decoded symbol.
3. If the Oommen-Rueda Tree is updated adaptively, the updating of the Decoder's Oommen-Rueda Tree is done as per the Tree Restructuring Rule described above, after the source symbol associated with the current encoded string has been determined. This ensures that after the decoding of each plaintext symbol has been affected, both the Encoder and Decoder maintain identical Oommen-Rueda Trees.

It is to be understood that if the Encoder utilized a process that involved a Branch Assignment Rule, the same Branch Assignment Rule must also be utilized by the Decoder. Furthermore, if the Encoder utilized a process that did not involve a Branch Assignment Rule, the Decoder's process must also not involve a Branch Assignment Rule.

It is further to be understood that if the Encoder utilized a process that involved a Tree Restructuring Rule, the same Tree Restructuring Rule must also be utilized by the Decoder. Furthermore, if the Encoder utilized a process that did not involve a Tree Restructuring Rule, the Decoder's process must also not involve a Tree Restructuring Rule.

Additional Instantiations of the Invention

The Oommen-Rueda Tree may be used in a wide range of circumstances and is flexible to the needs of the user.

If the occurrence probabilities of the plaintext input symbols are known a priori, the tree (and consequently, the associated processes) are Static. On the other hand, if the occurrence probabilities of the input symbols are not known a priori, the tree (and consequently, the associated processes) are Adaptive.

As indicated above, this invention also utilizes an Branch Assignment Rule for the labels of the edges of the Oommen-Rueda Tree. A process manipulating the tree is termed Deterministic or Randomized depending on whether the Branch Assignment Rule is Deterministic or Randomized respectively, which is more fully described below for the specific instantiations.

The various embodiments of the invention are specified herein by first stating whether the Branch Assignment Rule is (D)eterministic or (R)andomized. In the case of a randomized Branch Assignment Rule, the effect of randomization on the branch assignment can be either determined by a comparison with (F)ixed constant, a (V)ariable or a (R)andom variable itself, The second specification of a process details whether the tree is created in a (S)tatic or (A)daptive manner.

The third specification of the embodiment details the specific instantiation of the Oommen-Rueda Tree (that is, whether the generalized Oommen-Rueda Tree is being used, or a specific instantiation such as the Huffman or Fano tree is being used).

The fourth specification of a process informs whether it is an Encoding or Decoding Process.

The last specification are the cardinalities of the input and output alphabets.

The following sections describe specific embodiments of the invention for the case when the size of the ciphertext alphabet is 2. It is easily seen that when the size of the ciphertext alphabet is r, the corresponding r-ary embodiment can be obtained by concatenating $\log_2 r$ bits in the output and causing this binary string of length $\log_2 r$ to represent a single symbol from the output r-ary alphabet. When r is not a power of two, r symbols can be composed with probability fract1, r, thus ignoring the other strings of length $\log_2 r$, implying that this method assigns a probability value of zero for the strings of length $\log_2 r$ that have been ignored.

Using the above nomenclature, the following are some specific embodiments of the Invention:

| Nomenclature | Process Type | Tree Maintenance | Tree | Task | Source Alphabet Size | Code Alphabet Size |
| --- | --- | --- | --- | --- | --- | --- |
| $D\_A\_OR\_E_{m,r}$ | Deterministic | Adaptive | Oommen-Rueda | Encoding | $|S| = m$ | $|A| = r$ |
| $D\_S\_H\_E_{m,2}$ | Deterministic | Static | Huffman | Encoding | $|S| = m$ | $|A| = 2$ |
| $D\_S\_H\_D_{m,2}$ | Deterministic | Static | Huffman | Decoding | $|S| = m$ | $|A| = 2$ |
| $D\_A\_H\_E_{m,2}$ | Deterministic | Adaptive | Huffman | Encoding | $|S| = m$ | $|A| = 2$ |
| $D\_A\_H\_D_{m,2}$ | Deterministic | Adaptive | Huffman | Decoding | $|S| = m$ | $|A| = 2$ |
| $D\_A\_F\_E_{m,2}$ | Deterministic | Adaptive | Fano | Encoding | $|S| = m$ | $|A| = 2$ |
| $D\_A\_F\_D_{m,2}$ | Deterministic | Adaptive | Fano | Decoding | $|S| = m$ | $|A| = 2$ |
| $RF\_A\_H\_E_{m,2}$ | Randomized Fixed | Adaptive | Huffman | Encoding | $|S| = m$ | $|A| = 2$ |

-continued

| Nomenclature | Process Type | Tree Maintenance | Tree | Task | Source Alphabet Size | Code Alphabet Size |
|---|---|---|---|---|---|---|
| $RF\_A\_H\_D_{m,2}$ | Randomized Fixed | Adaptive | Huffman | Decoding | $|S| = m$ | $|A| = 2$ |
| $RV\_A\_H\_E_{m,2}$ | Randomized Variable | Adaptive | Huffman | Encoding | $|S| = m$ | $|A| = 2$ |
| $RV\_A\_H\_D_{m,2}$ | Randomized Variable | Adaptive | Huffman | Decoding | $|S| = m$ | $|A| = 2$ |
| $RR\_A\_H\_E_{m,2}$ | Randomized Ran. Variable | Adaptive | Huffman | Encoding | $|S| = m$ | $|A| = 2$ |
| $RR\_A\_H\_D_{m,2}$ | Randomized Ran. Variable | Adaptive | Huffman | Decoding | $|S| = m$ | $|A| = 2$ |

Throughout this document, unless otherwise specified, DDODE (for Deterministic Distribution Optimizing Data Encoding) will be used as a generic name for any Deterministic solution that yields Statistical Perfect Secrecy. Specific instantiations of DDODE are $D\_S\_H\_E_{m,2}$, $D\_A\_H\_E_{m,2}$ etc. Similarly, RDODE (for Randomized Distribution Optimizing Data Encoding) will be used as a generic name for any Randomized solution that yields Statistical Perfect Secrecy. Specific instantiations of RDODE are $RF\_S\_H\_E_{m,2}$, $RV\_A\_H\_E_{m,2}$ etc.

$D\_S\_H\_E_{m,2}$: The Deterministic Embodiment Using Static Huffman Coding

The Encoding Process: $D\_S\_H\_E_{m,2}$

This section describes the process that provides a method of optimizing the distribution of the output by using the sibling property of Huffman trees (see Hankerson et al. (*Introduction to Information Theory and Data Compression*, CRC Press, (1998)), Sayood (*Introduction to Data Compression*, Morgan Kaufmann, 2nd. edition, (2000)), and Witten et al. (*Managing Gigabytes: Compressing and Indexing Documents and Images*, Morgan Kaufmann, 2nd. edition, (1999))), and a deterministic rule that changes the labeling of the encoding scheme dynamically during the encoding process.

This document uses the notation that $\hat{f}(n)$ represents the estimate of the probability of 0 in the output at time 'n', and f (n) refers to the actual probability of 0 in the output at time 'n'. The estimation of $\hat{f}(n)$ uses a window that contains the last t symbols generated at the output, and $\hat{f}(n)$ is estimated as $$\frac{c_0(t)}{t},$$

where $c_0(t)$ is the number of 0's in the window. In the included analysis and implementation, the window has been made arbitrarily large by considering t=n, i.e. the window is the entire output sequence up to time 'n'. The effect of the window size, 't', will be discussed later.

Figure 3:
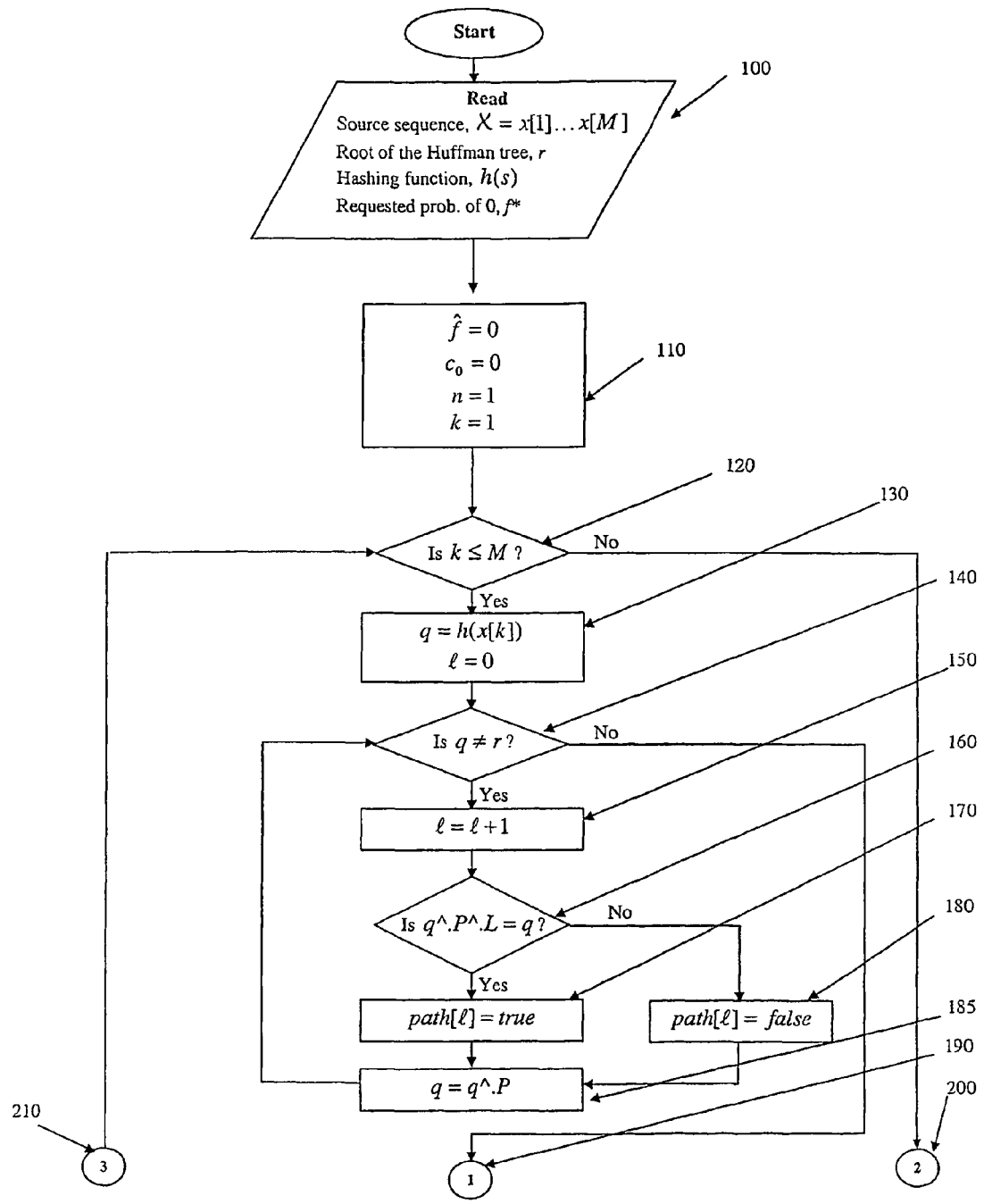
FIGS. 3 and 4 present a schematic diagram showing the Process $D\_S\_H\_E_{m,2}$ used to encode an input data sequence. The input to the process is the Static Huffman Tree, T, and the source sequence, X. The output is the sequence, Y. It is assumed that there is a bashing function which locates the position of the input alphabet symbols as leaves in T.
Figure 4:
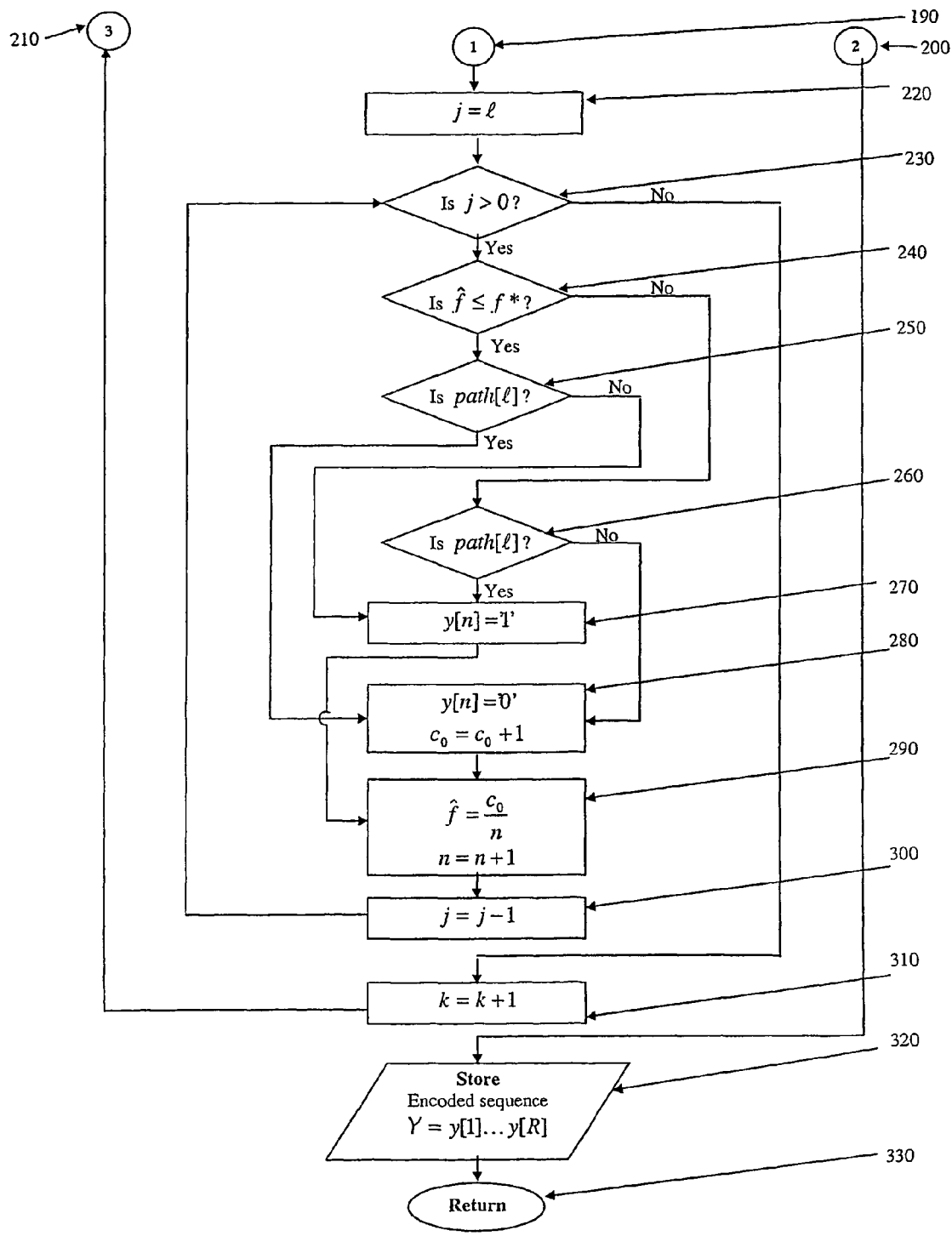

The process $D\_S\_H\_E_{m,2}$ is formally given below and pictorially in FIGS. 3 and 4.

Schematic of $D\_S\_H\_E_{m,2}$

The schematic chart of Process $D\_S\_H\_E_{m,2}$ is explained here. The figures begin with and Input/Output block (block 100) in which (i) the source sequence, X=x[1] . . . x[M], is the data to be encoded, (ii) r is the root of the Huffman tree that has been created using the static Huffman coding approach (see Huffman (A Method for the Construction of Minimum Redundancy Codes, *Proceedings of IRE*, 40(9), pp. 1098-1101, (1952))), (iii) h(s) is the hashing function that returns the pointer to the node associated with any plaintext symbol s, and (iv) f* is the requested probability of '0' in the output.

In block 110, the estimated probability of '0' in the output, $\hat{f}$, is initialized to 0, and the counter of zeros in the output, $c_0$, is initialized to 0 as well. The counter of bits in the output, n, is initialized to 1, and the counter of symbols read from the input is initialized to 1 too. Other straightforward initializations of these quantities are also possible.

A decision block is then invoked in block 120 which constitutes the starting of a looping structure that is executed from 1 to the number of symbols in the input, M. In block 130, a variable, q, which keeps the pointer to the current node being inspected in the tree, is initialized to the node associated with the current symbol, x[k], by invoking the hashing function h(x[k]). The length of the code word associated with x[k], l, is initialized to 0. The decision block 140 constitutes the starting point of a looping that traces the path from the node associated with x[k] to the root of the tree, r. Block 150 increments the length of the code word associated with x[k] by 1, since this length is actually the number of edges in that path. The decision block 160 tests if the corresponding path goes through the left or right branch, true for left (block 170) and false for right (block 180). In block 185, the current pointer, q, moves up to its parent towards the root of the tree. Connector 190 is the continuation of the branch "No" of the decision block 140, i.e. when q reaches the root of the tree (q=r). Connector 200 is the continuation of the decision "No" of block 120, which occurs when all the symbols of the input have been read. Connector 210 is the continuation of block 310 and enters in the decision block 120 to process the next symbol from the input.

In block 220, j is initialized to the length of the current path so as to process that path from the root of the tree towards the leaf associated with x[k]. Block 230 involves a decision on whether or not each node in the path has been processed. The decision block 240 compares the estimated probability of '0' in the output, $\hat{f}$, to the probability of '0' requested by the user, f*, so as to decide on the branch assignment strategy to be applied. The branch "Yes" leads to block 250, which test if the path goes to the left (true) or to the right (false). The branch "Yes" of block 250 goes to block 280 in which a '0' is sent to the output, and the corresponding counter, $c_0$, is thus increased. Block 280 is also reached after deciding "No" in block 260, which implies that $\hat{f}>f^*$, and hence the branch assignment 1-0 has been used. The branch "No" of block 250, where the branch assignment 0-1 is applied and the path goes to the right, leads to block 270 in which a '1' is sent to the output. Block 270 is also reached by the branch "No" of block 250 in which the 0-1 branch assignment is used and the path goes to the right.

In block 290, the estimated probability of '0' in the output is updated using the current counter of zeros and the current value of n, and the counter of bits in the output, is, is incremented. Block 300 decrements the counter of edges in the path, j, and goes to the decision block 230, which decides "No" when the node associated with x[k] is reached. In this case, block 310 is reached, where the counter of symbols in the input, k, is increased and the process continues with the decision block 120 which ends the looping (decides "No") when all the symbols of the input have been processed, reaching the Input/Output block 320 in which the encoded sequence, Y=y[1] . . . y[R], is stored. Block 330 returns the control to the "upper-level" process which invoked Process D_S_H_E$_{m,2}$, and the process D_S_H_E$_{m,2}$ terminates.

Process D_S_H_E$_{m,2}$

Input: The Huffman Tree, T. The source sequence, X. The requested probability of 0, f*.

Output: The output sequence, Y.

Assumption: It is assumed that there is a hashing function which locates the position of the input alphabet symbols as leaves in T.

Method:

```
c₀(0) ← 0; n ← 1; f(0) ← 1
for k ← 1 to M do    // For all the symbols of the input sequence
    Find the path for x[k]
    q ← root(T)
    while q is not a leaf do
        if f(n) ≤ f* then    // Assignment 0-1
            if path is "left" then
                y[n] ← 0; c₀(n) ← c₀(n − 1) + 1; q ← left(q)
            else
                y[n] ← 1; q ← right(q)
            endif
        else    // Assignment 1-0
            if path is "left" then
                y[n] ← 1; q ← left(q)
            else
                y[n] ← 0; c₀(n) ← c₀(n − 1) + 1; q ← right(q)
            endif
        endif f̂(n) ← c₀(n)/n n ← n + 1
    endwhile
endfor
End Process D_S_H_E_{m,2}
```

Rationale for the Encoding Process

In the traditional Huffman encoding, after constructing the Huffman tree in a bottom-up manner, an encoding scheme is generated which is used to replace each symbol of the source sequence by its corresponding code word. A labeling procedure is performed at each internal node, by assigning a code alphabet symbol to each branch. Different labeling procedures lead to different encoding schemes, and hence to different probabilities of the output symbols. In fact, for a source alphabet of m symbols there are $2^{m-1}$ such encoding schemes.

It is easy to see (as from the following example) how the labeling scheme can generate different probabilities in the output.

EXAMPLE 1

Consider S={a, b, c, d}, P={0.4, 0.3, 0.2, 0.1}, A={0, 1}, and the encoding schemes $\phi_A$: S→C$_A$={1, 00, 010, 011} and $\phi_B$: S→C$_B$={0, 10, 110, 111}, generated by using different labeling strategies on the Huffman tree depicted in FIG. 1. The superior encoding scheme between $\phi_A$ and $\phi_B$, such that F*={0.5, 0.5}, is sought for.

First, the average code word length of bits per symbol is calculated (see Hankerson et al. (*Introduction to Information Theory and Data Compression*, CRC Press, (1998))) for the exact formula for computing it) for both encoding schemes: $\bar{l}_A = \bar{l}_B = 1(0.4) + 2(0.3) + 3(0.2) + 3(0.1) = 1.9$.

Second, the distance for $\phi_A$ and $\phi_B$ from the optimal distribution, $d_A(F_A, F^*)$ and $d_B(F_B, F^*)$ respectively, are calculated, by using (15) where Θ=2, as follows:

$$f_{0_A} = \frac{0(0.4) + 2(0.3) + 2(0.2) + 1(0.1)}{1.9} \approx 0.57895,$$

$$f_{1_A} = \frac{1(0.4) + 0(0.3) + 1(0.2) + 2(0.1)}{1.9} \approx 0.42105,$$

$$d_A(F_A, \hat{F}) = |0.57895 - 0.5|^2 + |0.42105 - 0.5|^2 = 0.012466,$$

$$f_{0_B} = \frac{1(0.4) + 1(0.3) + 1(0.2) + 0(0.1)}{1.9} \approx 0.47368,$$

$$f_{1_B} = \frac{0(0.4) + 1(0.3) + 2(0.2) + 3(0.1)}{1.9} \approx 0.52632, \text{ and}$$

$$d_B(F_B, \hat{F}) = |0.47368 - 0.5|^2 + |0.52632 - 0.5|^2 = 0.001385.$$

Third, observe that $C_A$ and $C_B$ are prefix, $\bar{l}_A$ and $\bar{l}_B$ are minimal, and $d_B < d_A$. Therefore, $\phi_B$ is better than $\phi_A$ for F*={0.5, 0.5}.

In order to solve the DODC Problem, a "brute force" technique is proposed in Hankerson et al. (*Introduction to Information Theory and Data Compression*, CRC Press, (1998)), which searches over the $2^{m-1}$ different encoding schemes and chooses the scheme that achieves the minimal is distance. It can be shown that even with this brute force technique, it is not always possible to obtain the requested output probability of 0.5. The following example clarifies this.

EXAMPLE 2

Consider S={a, b, c, d} and A={0, 1}. Suppose that the requested probability of 0 in the output is f*=0.5. There are $2^{m-1}=8$ possible encoding schemes whose code word lengths are {1, 2, 3, 3} (those generated from the Huffman tree depicted in FIG. 1 obtained by using different labeling strategies).

The eight possible encoding schemes, their probabilities of 0 in the output, and their distances, as defined in (14) where Θ=2, are given in Table 1.

TABLE 1

All possible encoding schemes for the code word lengths {1, 2, 3, 3}, where S = {a, b, c, d}, A = {0, 1}, and P = {0.4, 0.3, 0.2, 0.1}.

| j | $\phi_j: S \to C_j$ | f | d(F, F*) |
|---|---|---|---|
| 1 | {0, 10, 110, 111} | 0.47368 | 0.001385 |
| 2 | {0, 10, 111, 110} | 0.42105 | 0.012466 |
| 3 | {0, 11, 100, 101} | 0.47368 | 0.001385 |
| 4 | {0, 11, 101, 100} | 0.42105 | 0.012466 |
| 5 | {1, 00, 010, 011} | 0.57895 | 0.012466 |
| 6 | {1, 00, 011, 010} | 0.52632 | 0.001385 |
| 7 | {1, 01, 000, 001} | 0.57895 | 0.012466 |
| 8 | {1, 01, 001, 000} | 0.52632 | 0.001385 |

Observe that none of these encodings yield the optimal value of f*=0.5. Indeed, the smallest distance is 0.001385, obtained when using, for example, $\phi_1$, in which the probability of 0 in the output is 0.47367.

As seen in Example 2, it is impossible to find the optimal requested probability of 0 in the output even after exhaustively searching over all possible encoding schemes. Rather than using a fixed labeling scheme for encoding the entire input sequence, $D\_S\_H\_E_{m,2}$ adopts a different labeling scheme each time a bit is sent to the output. These labeling schemes are chosen based on the structure of the Huffman tree and the distribution of the output sequence encoded so far.

Basically, $D\_S\_H\_E_{m,2}$ works by taking advantage of the sibling property of the Huffman tree (see Gallager (Variations on a Theme by Huffman, *IEEE Transactions on Information Theory*, 24(6):668-674, (1978))). From this property, it can be observed that the weight of the left child is always greater than or equal to that of the right one. Consider a Huffman tree, T. By keeping track of the number of 0's, $c_0(n)$, and the number of bits already sent to the output, n, the probability of 0 in the output is estimated as $$\hat{f}(n) = \frac{c_0(n)}{n},$$

whenever a node of T is visited. $D\_S\_H\_E_{m,2}$ takes $\hat{f}(n)$ and compares it with f* as follows: if $\hat{f}(n)$ is smaller than or equal to f*, 0 is favored by the branch assignment 0-1, otherwise 1 is favored by the branch assignment 1-0. This is referred to as the $D\_S\_H\_E_{m,2}$ Rule.

Essentially, this implies that the process utilizes a composite Huffman tree obtained by adaptively blending the exponential number of Huffman trees that would have resulted from a given fired assignment. This blending, as mentioned, is adaptive and requires no overhead. The blending function is not explicit, but implicit, and is done in a manner so as to force f(n) to converge to the fixed point, f*.

$D\_S\_H\_E_{m,2}$ also maintains a pointer, q, that is used to trace a path from the root to the leaf in which the current symbol is located in T. This symbol is then encoded by using the $D\_S\_H\_E_{m,2}$ Rule. This division of path tracing and encoding is done to maintain consistency between the Encoder and the Decoder. A small example will help to clarify this procedure.

EXAMPLE 3

Consider the source alphabet S={a, b, c, d} with respective probabilities of occurrence P={0.4, 0.3, 0.2, 0.1} and the code alphabet A={0, 1}. To encode the source sequence X=bacba, $D\_S\_H\_E_{m,2}$, the Huffman tree (shown in FIG. 1) is first constructed using Huffman's algorithm (see Huffman (A Method for the Construction of Minimum Redundancy Codes, f *Proceedings of IRE*, 40(9):1098-1101, (1952))).

The encoding achieved by Process $D\_S\_H\_E_{m,2}$ is detailed in Table 2. First, $c_0(0)$, n, and $\hat{f}(0)$ are all set to 0. The starting branch assignment

TABLE 2

Encoding of the source sequence X = bacba using $D\_S\_H\_E_{m,2}$ and the Huffman tree of FIG. 1. The resulting output sequence is y = 011010011.

| n | x[k] | Path | $c_0(n)$ | f(n) | Assign. | Go | y[n + 1] |
|---|---|---|---|---|---|---|---|
| 0 | b | LL | 0 | 0.0000 | 0-1 | L | 0 |
| 1 |   |    | 1 | 1.0000 | 1-0 | L | 1 |
| 2 | a | R  | 1 | 0.5000 | 0-1 | R | 1 |
| 3 | c | LRL| 1 | 0.3333 | 0-1 | L | 0 |
| 4 |   |    | 2 | 0.5000 | 0-1 | R | 1 |
| 5 |   |    | 2 | 0.4000 | 0-1 | L | 0 |
| 6 | b | LL | 3 | 0.5000 | 0-1 | L | 0 |
| 7 |   |    | 4 | 0.5714 | 1-0 | L | 1 |
| 8 | a | R  | 4 | 0.5000 | 0-1 | R | 1 |
| 9 |   |    | 4 | 0.4444 |     |   |   | is 0-1. For each symbol of X, a path is generated, and for each element of this path (column 'Go') using the current assignment, the output is generated. Afterwards, $n_0$, n, and $\hat{f}(n)$ are updated.

From Example 3, the power of $D\_S\_H\_E_{m,2}$ can be observed. The probability of 0 in the output, $\hat{f}(n)$, almost approaches f*=0.5 after generating only 9 bits in the output. Although this appears to be a "stroke of luck", it is later shown, both theoretically and empirically, that $D\_S\_H\_E_{m,2}$ follows this behavior relatively rapidly.

The Decoding Process: $D\_S\_H\_D_{m,2}$

The decoding process, $D\_S\_H\_D_{m,2}$, is much more easily implemented. For each bit received from the output sequence, $\hat{f}(n)$ is compared with f*. If $\hat{f}(n)$ is smaller than or equal to f*, 0 is favored by the branch assignment 0-1, otherwise 1 is favored by the branch assignment 1-0. $D\_S\_H\_D_{m,2}$ also maintains a pointer, q, that is used to trace a path from the root of T to the leaf where the symbol to be decoded is located.

Figure 5:
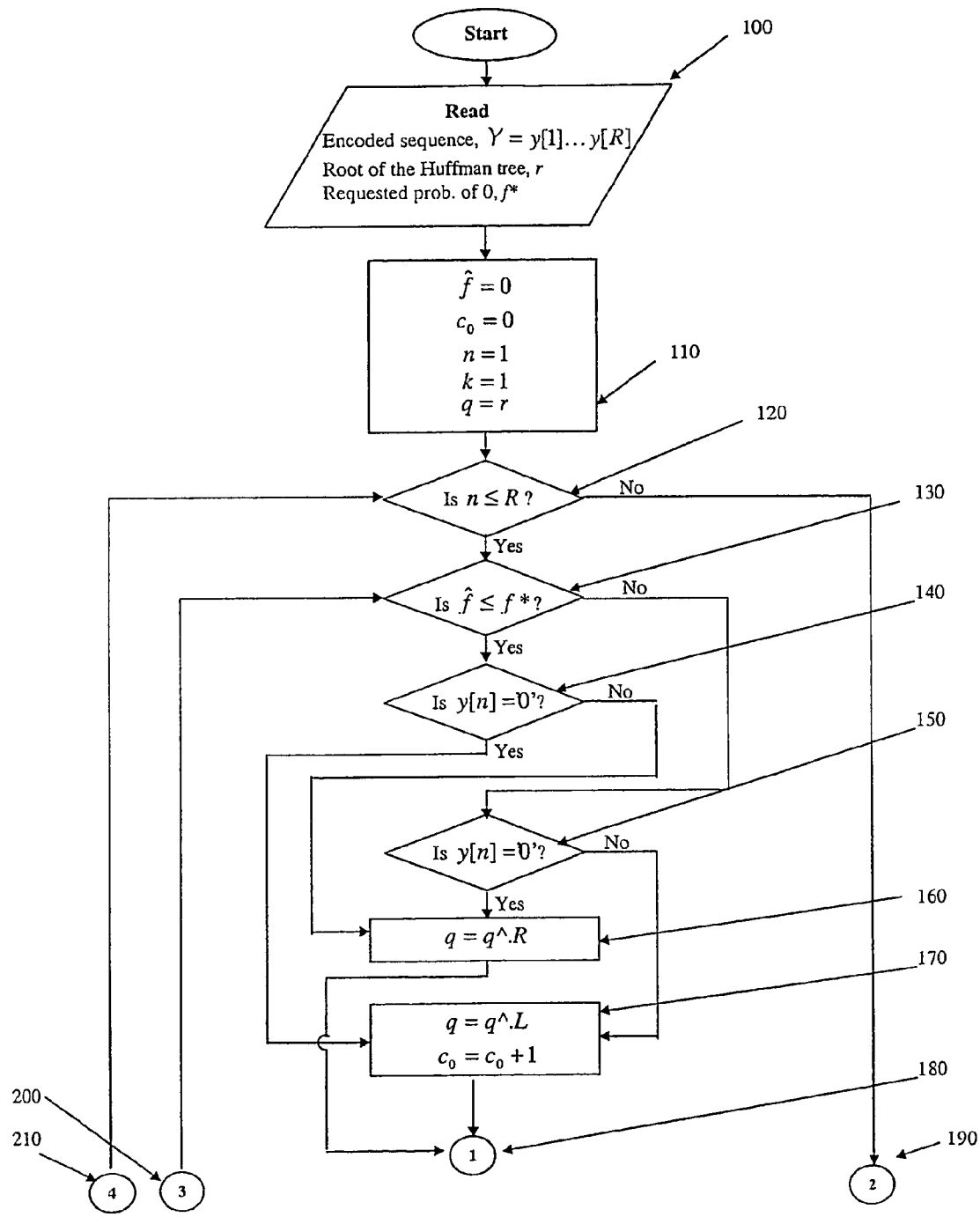
FIGS. 5 and 6 present a schematic diagram showing the Process $D\_S\_H\_E_{m,2}$ used to decode a data sequence encoded by following Process $D\_S\_H\_E_{m,2}$. The input to the process is the static Huffman Tree, T, and the encoded sequence, Y. The output is the decoded sequence, which is, indeed, the original source sequence, X.
Figure 6:
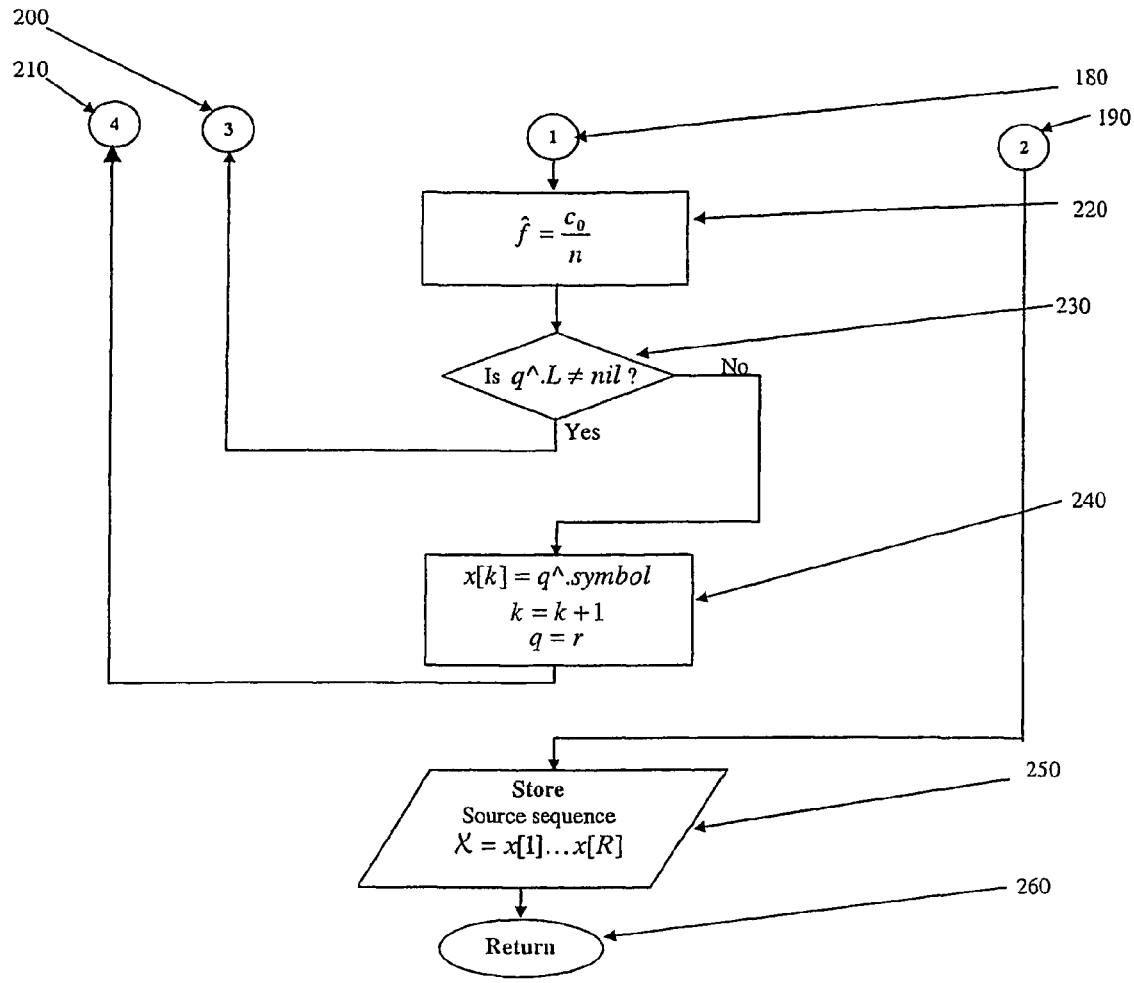

The formal decoding procedure is given in Process $D\_S\_H\_D_{m,2}$, and pictorially in FIGS. 5 and 6.

Schematic of $D\_S\_H\_D_{m,2}$

The process $D\_S\_H\_D_{m,2}$ (see FIGS. 5 and 6) begins with the Input/Output block 100, where the encoded sequence, Y=y[1] . . . y[R], the root of the Huffman tree, r, and the requested probability of '0' in the output, f*, are read. The Huffman tree must be the same as that used by Process $D\_S\_H\_E_{m,2}$ if the original source sequence, X, is to be correctly recovered.

In block 110, the estimated probability of '0' in the output, $\hat{f}$, and the counter of zeros in the output, $c_0$, are initialized to 0. The number o of bits processed from the input sequence, n, and the number of symbols sent to the output, k, are both initialized to 1. As in $D\_S\_H\_E_{m,2}$, other straightforward initializations of these quantities are also possible, but the Encoder and Decoder must maintain identical initializations if the original source sequence, X, is to be correctly recovered. The Process also initializes a pointer to the current node in the tree, q, which is set to the root of the tree, r.

The decision block 120 constitutes the starting of a looping structure that ends (branch labeled "No") when all the bits from Y are processed. The decision block 130 compares the estimated probability of '0' in Y, f̂, with the desired probability, f*, leading to block 140 through the branch "Yes" (branch assignment 0-1) if f̂≦f*. The decision block 140 leads to block 170 if the current bit is a '0' because the branch assignment being used is 0-1 and the path must go to the left. Conversely, when the current bit is a '1', the path must go to the right (block 160). The branch "No" of block 130 (when f̂>f*) leads to the decision block 150, which compares the current bit with '0'. If that bit is a '0', the "Yes" branch goes to block 160, in which the current pointer, q, is set to its right child. When the current bit is a '1' (the branch labeled "No" of block 150), the process continues with block 170, which sets q to its left child, and increments the counter of zeros in Y, $c_0$.

Connector 180 is the continuation of the process after block 160 or 170 have been processed. Connector 190 is the continuation of the branch "No" of block 120, which implies that all the bits from Y have been processed. Connector 200 is the continuation of the branch "Yes" of block 230, and goes to block 130 to continue processing the current path. Connector 210 is the continuation of the looping structure that process all the bits of Y.

In block 220, the estimated probability of '0' in Y, f̂, is updated using the current counter of zeros, and the counter of bits processed.

The next decision block (block 230), checks whether or not the current pointer, q, is pointing to a leaf. In the case in which q is pointing to the leaf associated with the source symbol to be recovered (branch "No"), the process continues with block 240, in which the corresponding source symbol, x[k], is recovered, the counter of source symbols in X, k, is incremented, and the current pointer, q, is moved to the root of the tree.

Block 250 occurs when all the bits from Y have been processed (branch "No" of block 120). At this point, the original source sequence, X, is completely recovered, and the Process $D\_S\_H\_D_{m,2}$ terminates in block 260, where the control is returned to the "upper level" process which invoked it.

Process $D\_S\_H\_D_{m,2}$

Input: The Huffman Tree, T. The encoded sequence, Y. The requested probability of 0, f*.

Output: The source sequence, X.

Method:

```
c_0(0) ← 0; n ← 1; f̂(0) ← 1
q ← root(T); k = 1
for n ← 1 to R do    // For all the symbols of the output sequence
    if f̂(n) ≦ f* then   // Assignment 0-1
        if y[n] = 0 then
            c_0(n) ← c_0(n − 1) + 1; q ← left(q)
        else
            q ← right(q)
        endif
    else    // Assignment 1-0
        if y[n] = 0 then
            q ← right(q)
        else
            c_0(n) ← c_0(n − 1) + 1; q ← left(q)
        endif
    endif
    if q is a "leaf" then
        x[k] ← symbol(q); q ← root(T); k ← k + 1
    endif
```

$$\hat{f}(n) \leftarrow \frac{c_0(n)}{n} \quad \text{// Recalculate the probability of 0 in the output}$$

endfor
End Process $D\_S\_H\_D_{m,2}$

EXAMPLE 4

Consider the source alphabet S={a, b, c, d} with probabilities of occurrence P={0.4, 0.3, 0.2, 0.1} and the code alphabet A={0, 1}. The output sequence Y=011010011 is decoded using $D\_S\_H\_D_{m,2}$ and the Huffman tree depicted in FIG. 1.

The decoding process is detailed in Table 3. As in $D\_S\_H\_E_{m,2}$, $c_0(n)$ and f̂(n) are set to 0, and the default branch assignment is set to be 0-1. For each bit, y[n], read from Y, the current branch assignment and y[n] determine the direction of the path traced, or more informally, where child q will 'Go': left (L) or right (R). Subsequently, $c_0(n)$ and f̂(n) are updated. Whenever a leaf is reached, the source symbol associated with it is recorded as the decoded output. Finally, observe that the original input, the source sequence of Example 3, X=bacba, is completely recovered.

Proof of Convergence of $D\_S\_H\_E_{m,2}$

The fundamental properties of $D\_S\_H\_E_{m,2}$ are crucial in determining the characteristics of the resulting compression and the encryptions which are constructed from it. To help derive the properties of $D\_S\_H\_E_{m,2}$, the properties of the binary input alphabet case are first derived, and later, the result for the multi-symbol input alphabet case is inductively derived.

The Binary Alphabet Case

In this section, the convergence of $D\_S\_H\_E_{m,2}$ for a particular case when the input has a binary source alphabet is proven. In this case,

TABLE 3

Decoding of the output sequence y = 011010011 using Process $D\_S\_H\_D_{m,\,2}$ and the Huffman tree of FIG. 1. The source sequence of Example 3 is completely recovered.

| n | y[n + 1] | $c_0(n)$ | f̂(n) | Assignment | Go | x[k] |
|---|---|---|---|---|---|---|
| 0 | 0 | 0 | 0.0000 | 0-1 | L | |
| 1 | 1 | 1 | 1.0000 | 1-0 | L | b |
| 2 | 1 | 1 | 0.5000 | 0-1 | R | a |
| 3 | 0 | 1 | 0.3333 | 0-1 | L | |
| 4 | 1 | 2 | 0.5000 | 0-1 | R | |
| 5 | 0 | 2 | 0.4000 | 0-1 | L | c |
| 6 | 0 | 3 | 0.5000 | 0-1 | L | |
| 7 | 1 | 4 | 0.5714 | 1-0 | L | b |
| 8 | 1 | 4 | 0.5000 | 0-1 | R | a |
| 9 | | 5 | 0.4444 | | | | the Huffman tree has only three nodes—a root and two children. The encoding process for this case is referred to as $D\_S\_H\_E_{2,2}$.

Consider the source alphabet, S={0, 1}. The encoding procedure is detailed in Process $D\_S\_H\_E_{2,2}$ given below. The symbol s, the most likely symbol of S, is the symbol associated with the left child of the root, and s̄ is the complement of s (i.e. s̄ is 0 if s is 1 and vice versa) is associated with the right child.

Process $D\_S\_H\_E_{2,2}$

Input: The source alphabet, S, and the source sequence, X. The requested probability of 0, f*.

Output: The output sequence, Y.

Method:

```
c_0(0) ← 0; f(1) ← 0; s ← The most likely symbol of S.
for n ← 1 to M do   // For all the symbols of the input sequence
    if f(n) ≤ f* then   // Assignment 0-1
        if x[n] = 0 then
            y[n] ← s; c_0(n) ← c_0(n − 1) + s̄
        else
            y[n] ← s̄; c_0(n) ← c_0(n − 1) + s
        endif
    else   // Assignment 1-0
        if x[n] = 0 then
            y[n] ← s̄; c_0(n) ← c_0(n − 1) + s
        else
            y[n] ← s; c_0(n) ← c_0(n − 1) + s̄
        endif f̂(n) ← c_0(n)/n   // Recalculate the probability of 0 end for
End Process D__S__H__E_{2,2}
```

The Huffman tree for this case is straightforward, it has the root and two leaf nodes (for 0 and 1). There are two possible labeling strategies with this tree. The first one consists of labeling the left branch with 0 and the right one with 1 (FIG. 6(a)), which leads to the encoding scheme $\phi_0$: S→C={0, 1}. The alternate labeling strategy assigns 1 to the left branch and 0 to the right branch (FIG. 6(b)), leading to the encoding scheme $\phi_1$: S→C={1, 0}. Rather than using a fixed encoding scheme to encode the entire input sequence, a labeling strategy that chooses the branch assignment (either 0-1 or 1-0) based on the estimated probability of 0 in the output, f̂(n) is enforced.

In regard to the proof of convergence, it is assumed that the probability of 0 in the input, p, is greater than or equal to 1−p, the probability of 1 occurring in the input, and hence p≥0.5. This means that the most likely symbol of S is 0. The case in which p<0.5, can be solved by symmetry and is straightforward. It is shown that any probability requested in the output, f*, is achieved by the $D\_S\_H\_E_{2,2}$, where 1−p≤f*≤p. The statement of the result is given in Theorem 1 below. The rigorous proof of this theorem is given in Appendix B.

Theorem 1 (Convergence of Process $D\_S\_H\_E_{2,2}$). Consider a stationary, memoryless source with alphabet S={0, 1}, whose probabilities are P=[p, 1−p], where p≥0.5, and the code alphabet, A={0, 1}. If the source sequence X=x[1], ..., x[n], ..., with x[i]∈S, i=1, ..., n, ..., is encoded using the Process $D\_S\_H\_E_{2,2}$ so as to yield the output sequence Y=y[1], ..., y[n], ..., such that y[i]∈A, i=1, ..., n, ..., then $$\lim_{n\to\infty} Pr[\hat{f}(n) = f^*] = 1, \quad (1)$$

where f* is the requested probability of 0 in the output (1−p≤f*≤p), and $$\hat{f}(n) = \frac{c_0(n)}{n}$$

with $c_0(n)$ being the number of 0's encoded up to time n.

The result that $D\_S\_H\_E_{2,2}$ guarantees Statistical Perfect Secrecy follows.

Corollary 1 (Statistical Perfect Secrecy of Process $D\_S\_H\_E_{2,2}$). The Process $D\_S\_H\_E_{2,2}$ guarantees Statistical Perfect Secrecy.

Proof. The result of Theorem 1 states that the probability of 0 in the output sequence, asymptotically converges to the requested value f*, where 1−p≤f*≤p, with probability 1. In particular, this guarantees convergence whenever f* is 0.5.

Since the value of f̂ is guaranteed to be close to 0.5 after a finite number of steps, this, in turn, implies that for every input X, $Pr[y_{j+1} \ldots y_{j+k}]$, the probability of every output sequence of length k occurring, will be arbitrarily close to $$\frac{1}{2^k}.$$

The result follows.

Equation (57) (in Appendix B) also guarantees optimal and lossless compression.

Convergence Properties of $D\_S\_H\_E_{2,2}$

Theorem 1 proves that f̂(n) converges with probability 1 to the value f*. However, the issue of the transient behavior[1] is not clarified. It is now shown that f̂(n) converges very quickly to the final solution. Indeed, if the expected value of f̂(n) is considered, it can be shown that this quantity converges in one step to the value 0.5, if f* is actually set to 0.5.

[1] The transient behavior, its implications in solving the DODE, and how it can be eliminated in any given encryption are re-visited later.

Theorem 2 (Rate of convergence of Process $D\_S\_H\_E_{2,2}$). If f* is set at 0.5, then E[f̂(1)]=0.5, for $D\_S\_H\_E_{2,2}$, implying a one-step convergence in the expected value.

The effect on the convergence (when using a window, which contains the last t symbols in the output sequence, to estimate the probability of 0 in the output) is now discussed.

When the probability of 0 in the output is estimated using the entire sequence of size n, it is well known that f̂(n) converges to f*. Thus, $$\hat{f}(n) = \sum_{i=0}^{n} \frac{c_0(n)}{n} = f^*. \quad (2)$$

Trivially, since the convergence is ensured, after k more steps the estimated probability of 0 in the output again becomes:

$$\hat{f}(n+k) = \sum_{i=0}^{n+k} \frac{c_0(n)}{n+k} = f^*. \quad (3)$$

It is straightforward to see that, by estimating the probability of 0 in the output using the last k bits, the modified $D\_S\_H\_E_{2,2}$ would still converge to the same fixed point f*, since $$\sum_{i=n+1}^{n+k} \frac{c_0(k)}{k} = f^*, \quad (4)$$

were $c_0(k)$ is the number of 0's in the last k bits of the output sequence.

In other words, this means that instead of using a window of size k to implement the learning, one can equivalently use the entire output encoded sequence to estimate f(n) as done in $D\_S\_H\_E_{2,2}$. The current scheme will converge to also yield point-wise convergence.

The Multi-Symbol Alphabet Case

The convergence of $D\_S\_H\_E_{m,2}$, where m>2 is now discussed. For this case, it can be shown that the maximum probability of 0 attainable in the output is $f_{max}$ and the minimum is $1-f_{max}$, where $f_{max}$ is the probability of 0 in the output produced by an encoding scheme obtained by labeling all the branches of the Huffman tree using the branch assignment 0-1. This result is shown by induction on the number of levels of the Huffman tree. It is shown that $D\_S\_H\_E_{m,2}$ converges to the fixed point f* at every level of the tree, using the convergence result of the binary case. The convergence of $D\_S\_H\_E_{m,2}$ is stated and proved in Theorem 4 below.

Theorem 3 (Convergence of Process $D\_S\_H\_E_{m,2}$). Consider a stationary, memoryless source with alphabet $S=\{s_1, \ldots, s_m\}$ whose probabilities are $P=[p_1, \ldots, p_m]$, the code alphabet $A=\{0, 1\}$, and a binary Huffman tree, T, constructed using Huffman's algorithm. If the source sequence $X=x[1] \ldots x[M]$ is encoded by means of the Process $D\_S\_H\_E_{m,2}$ and T, to yield the output sequence $Y=y[1] \ldots y[R]$, then $$\lim_{n \to \infty} Pr[\hat{f}(n) = f^*] = 1, \quad (5)$$

where f* is the requested probability of 0 in the output $(1-f_{max} \leq f^* \leq f_{max})$, and $$\hat{f}(n) = \frac{c_0(n)}{n}$$

with $c_0(n)$ being the number of 0's encoded up to time n.

Corollary 2. The Process $D\_S\_H\_E_{m,2}$ guarantees Statistical Perfect Secrecy.

Empirical Results

One of the sets of files used to evaluate the performance of the encoding algorithms presented in this research work was obtained from the University of Calgary. It has been universally used for many years as a standard test suite known as the Calgary corpus[2]. The other set of files was obtained from the University of Canterbury. This benchmark, known as Canterbury corpus, was proposed in 1997 as a replacement for the Calgary corpus test suite (see Arnold et al. (A Corpus for the Evaluation of Lossless Compression Algorithms, *Proceedings of the IEEE Data Compression Conference* pages 201-210, Los Alamitos, Calif., IEEE Computer Society Press, (1997))). These files are widely used to test and compare the efficiency of different compression methods. They represent a wide range of different files and applications including executable programs, spreadsheets, web pages, pictures, source code, postscript source, etc.

[2]Available at ftp.cpsc.ucalgary.ca/pub/projects/text.compression.corpus/.

Process $D\_S\_H\_E_{m,2}$ has been implemented by considering the ASCII set as the source alphabet, and the results have been compared to the results obtained by traditional Huffman coding. The latter has been considered here as the fixed-replacement encoding scheme obtained by Using a binary Huffman tree and the branch assignment 0-1. This method is referred to as the Traditional Static Huffman (TSH) method. The requested frequency of 0, f*, was set to be 0.5 and Θ was set to be 2. The empirical results obtained from testing $D\_S\_H\_E_{m,2}$ and TSH on files of the Calgary corpus and the Canterbury corpus are given in Tables 4 and 5, respectively. The first column corresponds to the name of the original file in the Calgary or Canterbury corpus. The second column $\hat{f}_{TSH}$ is the maximum probability of 0 attainable with the Huffman tree, i.e. the probability of 0 in the output attained by TSH. $\hat{f}_{DSHE}$ is the estimated probability of 0 in the output sequence generated by $D\_S\_H\_E_{m,2}$. The last column, $d(\hat{f}, F^*)$, is the distance calculated by using (14), where $\hat{f}_{DSHE}$ is the probability of 0 in the compressed file generated by $D\_S\_H\_E_{m,2}$.

The last row of Tables 4 and 5, labeled "Average", is the weighted average of the distance.

From Table 4, observe that $D\_S\_H\_E_{m,2}$ achieves a probability of 0 which is very close to the requested one. Besides, the largest distance (calculated with Θ=2) is approximately 3.0E-08, and the weighted average is less than 7.5E-09.

On the files of the Canterbury corpus, even better results (Table 5) are obtained. Although the worst case was in the output of compressing the file grammar.lsp, for which the distance is about 10E-08, the weighted average distance was even smaller than 5.5E-10.

TABLE 4

Empirical results obtained after executing $D\_S\_H\_E_{m,2}$ and TSH on files of the Calgary corpus, where f* = 0.5.

| File Name | $f_{TSH}$ | $f_{DSHE}$ | d(F, F*) |
|---|---|---|---|
| bib | 0.534628104 | 0.500002577 | 6.64093E−12 |
| book1 | 0.539274158 | 0.500000000 | 0.00000E+00 |
| book2 | 0.536233237 | 0.500173602 | 3.01377E−08 |
| geo | 0.524978249 | 0.499995693 | 1.85502E−11 |
| news | 0.534862968 | 0.500020293 | 4.11806E−10 |
| obj1 | 0.527373684 | 0.500007788 | 6.06529E−11 |
| obj2 | 0.528048693 | 0.500083078 | 6.90195E−09 |
| paper1 | 0.536035267 | 0.500030866 | 9.52710E−10 |
| progc | 0.534078465 | 0.500057756 | 3.33576E−09 |
| progl | 0.531706581 | 0.499963697 | 1.31791E−09 |
| progp | 0.535076526 | 0.499992123 | 6.20471E−11 |
| trans | 0.532803448 | 0.499999065 | 8.74225E−13 |
| Average | | | 7.44546E−09 |

Graphical Analysis

Figure 7:
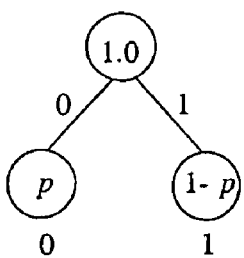
FIG. 7 depicts the two possible labeling strategies that can be done in a Huffman tree constructed for Process $D\_S\_H\_E_{2,2}$, where S={0, 1}, and P=[p, 1−p] with p≧0.5.
Figure 7:
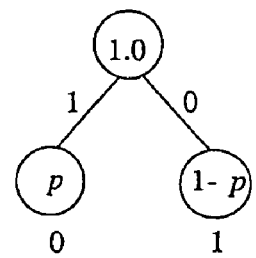
Figure 8:
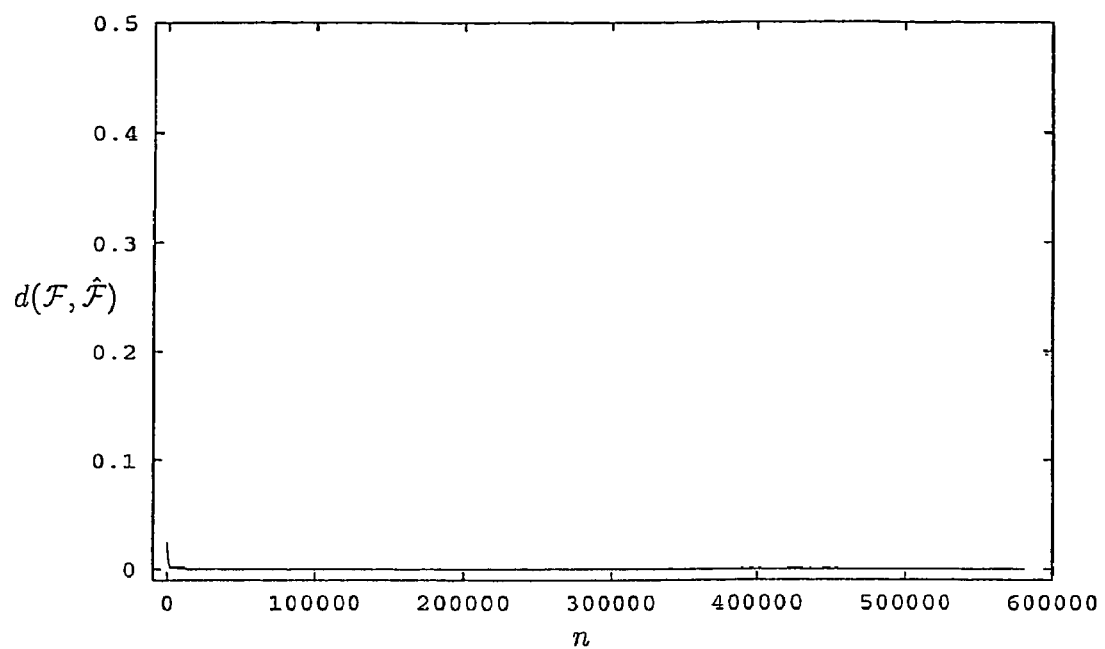
FIG. 8 graphically plots the average distance obtained after running $D\_S\_H\_E_{m,2}$ on file bib from the Calgary Corpus, where f*=0.5 and Θ=2.

The performance of $D\_S\_H\_E_{m,2}$ has also been plotted graphically. The graph for the distance on the file bib of the Calgary corpus is depicted in FIG. 7. The x-axis represents the number of bits generated in the output sequence and the y-axis represents the average distance between the probabilities requested in the output and the probability of 0 in the output sequence.

The average distance mentioned above is calculated as follows. For each bit generated, the distance, d(f, f*), is calculated by using (14), where the probability of 0 requested in the output is f*=0.5, and f

TABLE 5

Empirical results of $D\_S\_H\_E_{m,2}$ and TSH tested on files of the Canterbury corpus, where $f^* = 0.5$.

| File Name | $f_{TSH}$ | $f_{DSHE}$ | $d(F, F^*)$ |
|---|---|---|---|
| alice29.txt | 0.542500235 | 0.499944405 | 3.09080E−09 |
| asyoulik.txt | 0.538999222 | 0.499986084 | 1.93647E−10 |
| cp.html | 0.536978733 | 0.500000000 | 0.00000E+00 |
| fields.c | 0.536561933 | 0.500088959 | 7.91361E−09 |
| grammar.lsp | 0.538545748 | 0.499654298 | 1.19510E−07 |
| kennedy.xls | 0.535706989 | 0.500000278 | 7.70618E−14 |
| lcet10.txt | 0.535809446 | 0.499989274 | 1.15043E−10 |
| plrabn12.txt | 0.542373081 | 0.500000454 | 2.05753E−13 |
| ptt5 | 0.737834157 | 0.500000587 | 3.44100E−13 |
| xargs.1 | 0.532936146 | 0.499879883 | 1.44281E−08 |
| Average | | | 5.42759E−10 | is estimated as the number of 0's, $c_0(n)$, divided by the number of bits already sent to the output. In order to calculate the average distance, the output was divided into 500 groups of $g_i$ bits and the average distance is calculated by adding $d(f, f^*)$ over each bit generated in the group, and dividing it by $g_i$.

From the figure it can be seen that the distance drops quickly towards 0, and remains arbitrarily close to 0. Such convergence is typical for all the files from both the Calgary corpus and Canterbury corpus.

$D\_A\_H\_E_{m,2}$: The Deterministic Embodiment Using Adaptive Huffman Coding

The Encoding Process

The technique for solving DODC by using Huffman's adaptive coding scheme is straightforward. Again, the design takes advantage of the sibling property of the tree at every instant to decide on the labeling strategy used at that time. Apart from this, the process has to incorporate the learning stage in which the probabilities of the source symbols are estimated. This is a fairly standard method and well documented in the literature (see Hankerson et al. (*Introduction to Information Theory and Data Compression*, CRC Press, (1998)), Gallager (Variations on a Theme by Huffman, *IEEE Transactions on Information Theory*, 24(6):668-674, (1978)), Knuth (Dynamic Huffman Coding, *Journal of Algorithms*, 6:163-180, (1985)), and Vitter (Design and Analysis of Dynamic Huffman Codes, *Journal of the ACM*, 34(4):825-845, (1987))).

Figure 9:
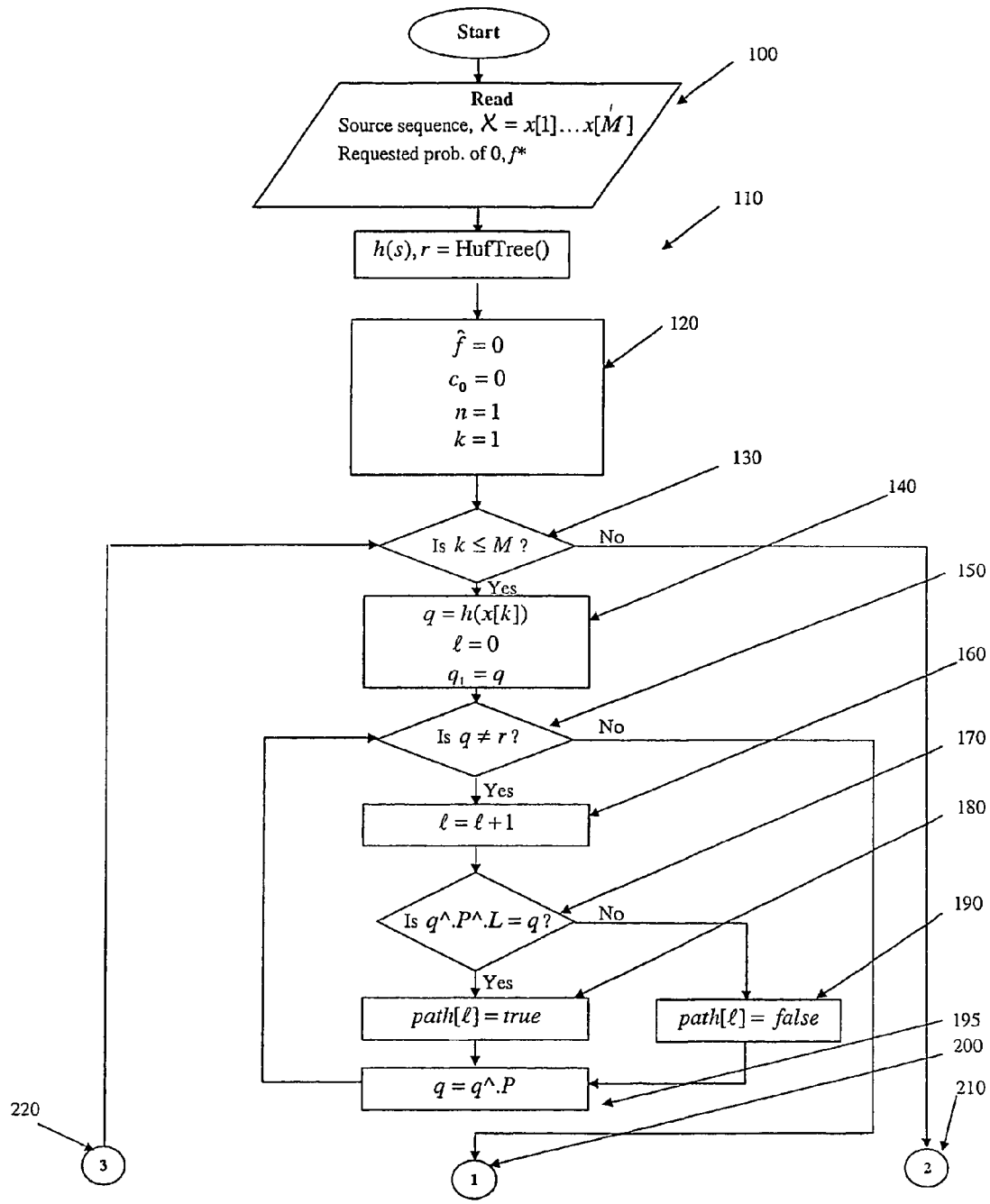
FIGS. 9 and 10 present a schematic diagram showing the Process $D\_A\_H\_E_{m,2}$ used to encode an input data sequence. The input to the process is an initial Adaptive Huffman Tree, T, and the source sequence, X. The output is the sequence, Y. It is assumed that there is a hashing function which locates the position of the input alphabet symbols as leaves in T.
Figure 10:
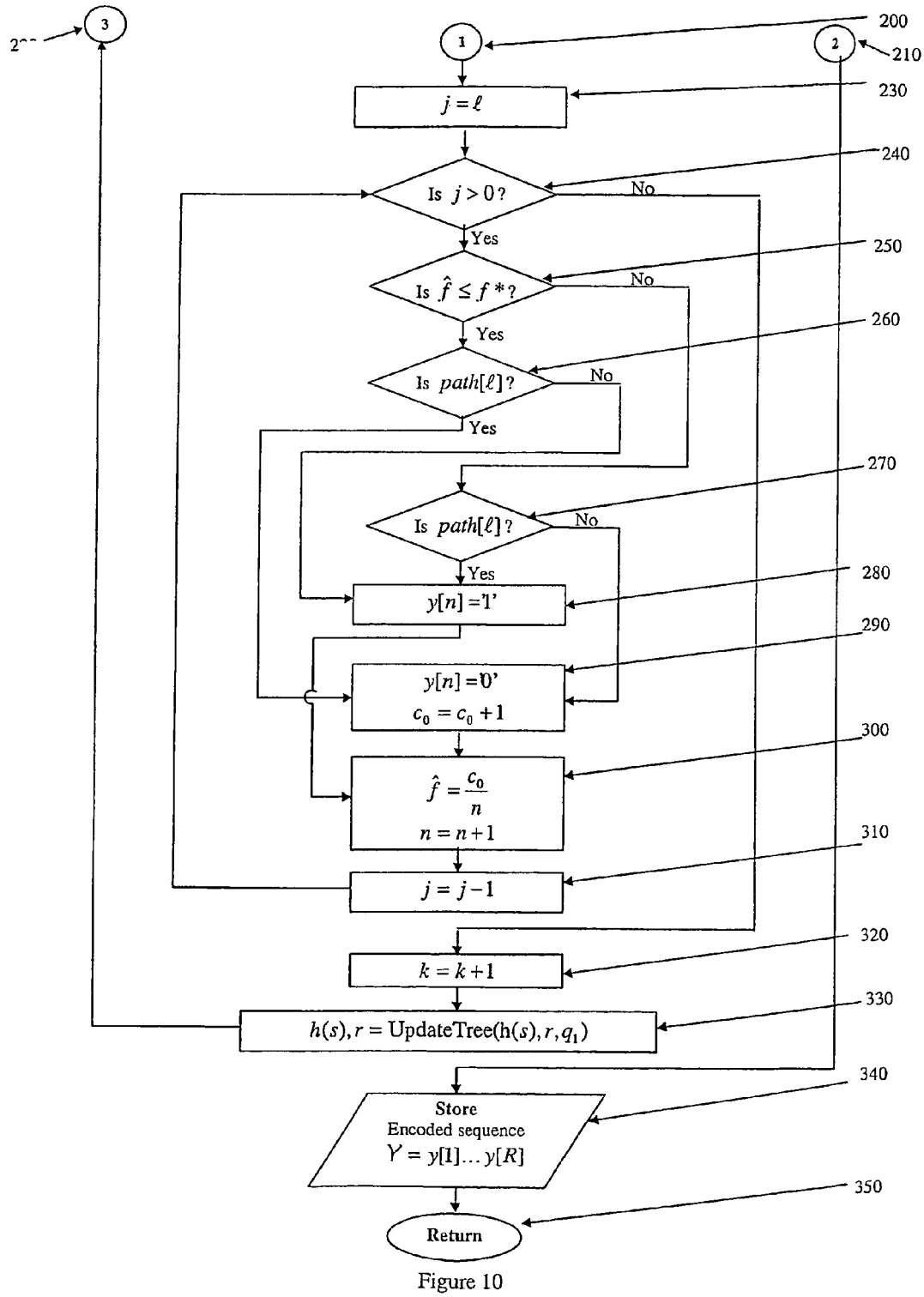

The encoding procedure for the distribution optimizing algorithm using the Huffman coding in an adaptive manner is detailed in Process $D\_A\_H\_E_{m,2}$ given below, and pictorially in FIGS. 9 and 10.

Schematic of $D\_A\_H\_E_{m,2}$

The schematic chart of Process $D\_A\_H\_E_{m,2}$ is explained here. In block 100, the source sequence to be encoded, $X=x[1] \ldots x[M]$, and the requested probability of '0' in the output, $f^*$, are read from the input. In block 110, a Huffman tree is constructed following the procedure presented in Huffman (A Method for the Construction of Minimum Redundancy Codes, *Proceedings of IRE*, 40(9), pp. 1098-1101, (1952)), by assuming a suitable probability distribution for the source symbols. This procedure returns the Huffman tree by means of a pointer to the root, r, and a hashing function, h(.), that is used later to locate the node associated with the symbol being processed from the input.

In block 120, the estimated probability of '0' in the output, f, and the counter of zeros in the output, $c_0$, are set to 0. The corresponding counters for the number of bits sent to the output, n, and for the number of symbols processed from the input, k, are set to 1. As in $D\_S\_H\_E_{m,2}$, other straightforward initializations of these quantities are also possible, but the Encoder and Decoder must maintain identical initializations if the original source sequence, X, is to be correctly recovered.

The decision block 130 constitutes the starting of a looping structure that processes the M symbols from the input. The branch "Yes" leads to block 140, which sets the current pointer, q, to the node associated with the current symbol being processed, x[k], by invoking the hashing function h(.). The length of the path from the root to the node associated with x[k], l, is set to 0, and a temporary pointer, $q_1$, used later when updating the Huffman tree, is set to q so as to store the pointer to the node associated with x[k].

The decision block 150 constitutes the starting of a looping structure that processes all the edges in the path. When the current pointer, q, is not the root, the process continues by tracing the path towards r (branch "Yes"), going to block 160, which increments the length of the path, l The next block in the process is the decision block 170, which checks if the path comes from the left child (branch "Yes" where the path is set to true in block 180), or from the right child, where the path is set to false in block 190. The current pointer, q, is then moved to its parent (block 195). The branch "No" of block 150 indicates that the root of the tree has been reached, and the branch assignment process starts in block 230 (reached through Connector 200), which sets a counter of bits to be sent to the output, j, to the length of the path, l.

Connector 210 is the continuation of the branch "No" of the decision block 130, and indicates that all the symbols coming from the input have been processed. Connector 220 is the continuation of the looping structure that processes all the symbols of the input.

The decision block 240 constitutes the starting of a looping structure that processes all the edges in the current path. When j>0 (branch "Yes"), the process continues by performing a labeling of the current edge (block 250). If the estimated probability of '0' in the output, f, is less than or equal to the required probability, f*, the branch assignment 0-1 is used, and hence when the path leads to the left (true or branch "Yes" of block 260), a '0' is sent to the output and the counter of zeros is incremented (block 290). Conversely, when the path goes to the right (false or branch "No" of block 260), a '1' is sent to the output (block 280). The branch "No" of block 250 (f>f*) indicates that the branch assignment 1-0 is used, leading to the decision block 270, in which the branch "Yes" leads to block 280 (a '1' is sent to the output), and the branch "No" leads to block 290 (a '0' is sent to the output and the counter of zeros, $c_0$, is incremented).

In block 300, the estimated probability of '0' in the output, f, is updated using the current counter of zeros and the current counter of bits. The counter of edges in the path, j, is decremented (block 310), since the path is now being traced from the root to $q_1$.

When all the edges in the path are processed (branch "No" of block 240), the counter of symbols processed from the input, k, is increased (block 320), and the Huffman tree is updated by invoking the procedure described in Knuth (Dynamic Huffman Coding, *Journal of Algorithms*, Vol. 6, pp. 163-180, (1985)), or Vitter (Design and Analysis of Dynamic Huffman Codes, *Journal of the ACM*, 34(4):825-845, (1987)), returning the updated hashing function, h(.), and the new root of the tree, r, if changed.

When all symbols from the input have been processed (branch "No" of block 130) the encoded sequence, Y, is stored (Input/Output block 340), the Process $D\_A\_H\_E_{m,2}$ terminates, and the control is returned to the "upper-level" process (block 350) that invoked it.

Process $D\_A\_H\_E_{m,2}$

Input: The source alphabet, S. The source sequence, X. The requested probability of 0, f*.

Output: The output sequence, Y.

Assumption: It is assumed that there is a hashing function which locates the position of the input alphabet symbols as leaves in T. It is also assumed that the Process has at its disposal an algorithm (see [5], [16]) to update the Huffman tree adaptively as the source symbols come.

Method:

Construct a Huffman tree, T, assuming any suitable distribution for the symbols of S. In this instantiation, it is assumed that the symbols are initially equally likely.

```
c₀(0) ← 0; n ← 1; f(1) ← 0;
for k ← 1 to M do    // For all the symbols of the input sequence
    Find the path for x[k]; q ← root(T)
    while q is not a leaf do
        if f(n) ≦ f* then    // Assignment 0-1
            if path is "left" then
                y[n] ← 0; c₀(n) ← c₀(n − 1) + 1; q ← left(q)
            else
                y[n] ← 1; q ← right(q)
            endif
        else    // Assignment 1-0
            if path is "left" then
                y[n] ← 1; q ← left(q)
            else
                y[n] ← 0; c₀(n) ← c₀(n − 1) + 1; q ← right(q)
            endif
        end if f̂(n) ← c₀(n)/n ; n ← n + 1 endwhile
    Update T by using the adaptive Huffman approach [5], [16].
end for
End Process D_A_H_E_{m,2}
```

The Decoding Process

The decoding process for the adaptive Huffman coding is also straightforward. It only requires the encoded sequence, Y, and some conventions to initialize the Huffman tree and the associated parameters. This procedure is formalized in Process $D\_A\_H\_D_{m,2}$, and pictorially in FIGS. 11 and 12. Observe that, unlike in the static Huffman coding, the Decoder does not require that any extra information is stored in the encoded sequence. It proceeds "from scratch" based on prior established conventions.

Schematic of $D\_A\_H\_D_{m,2}$

Figure 11:
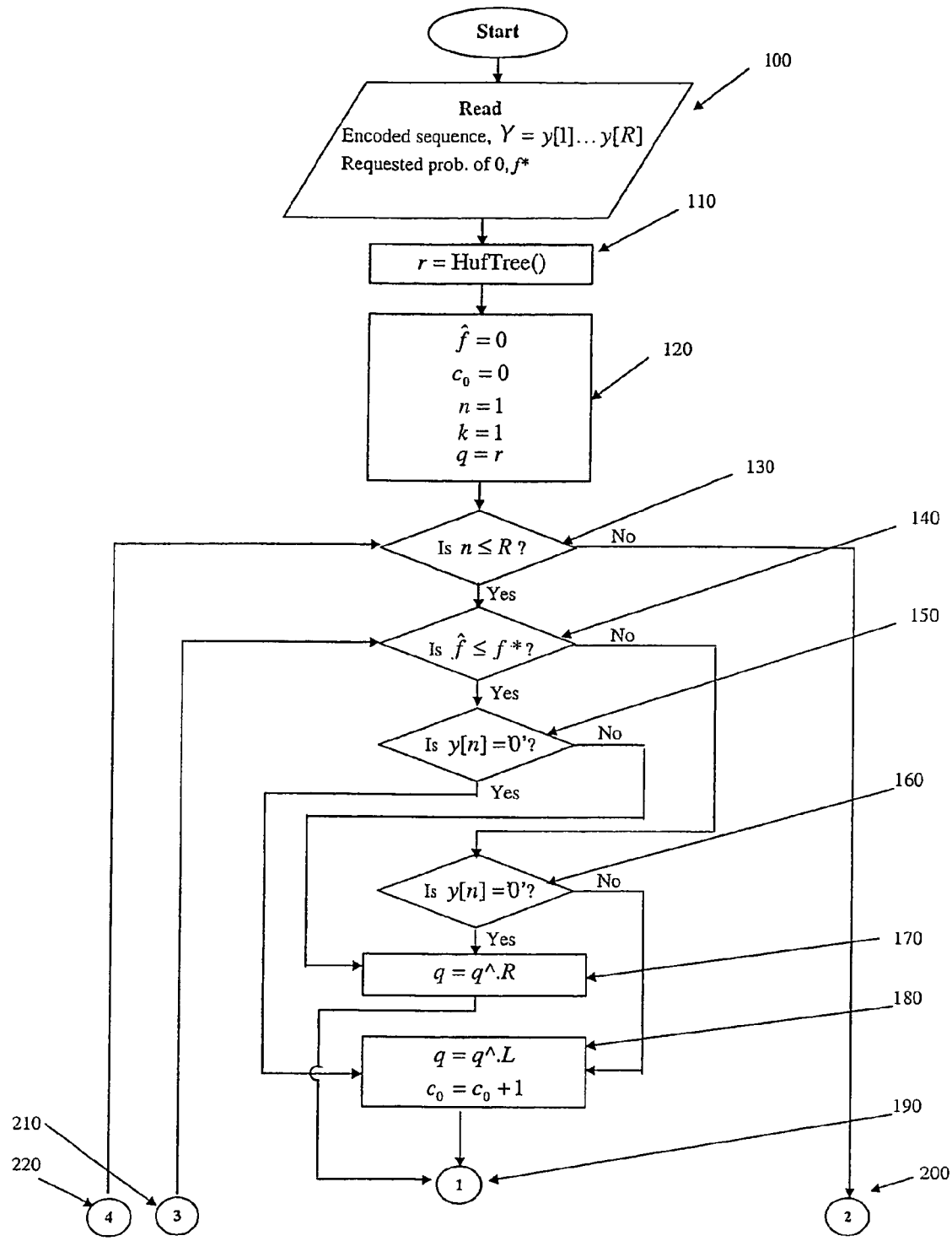
FIGS. 11 and 12 present a schematic diagram showing the Process $D\_A\_H\_D_{m,2}$ used to decode a data sequence encoded by following Process $D\_A\_H\_E_{m,2}$. The input to the process is the same initial Adaptive Huffman Tree, T used by Process $D\_A\_H\_E_{m,2}$, and the encoded sequence, Y. The output is the decoded sequence, which is, indeed, the original source sequence, X.
Figure 12:
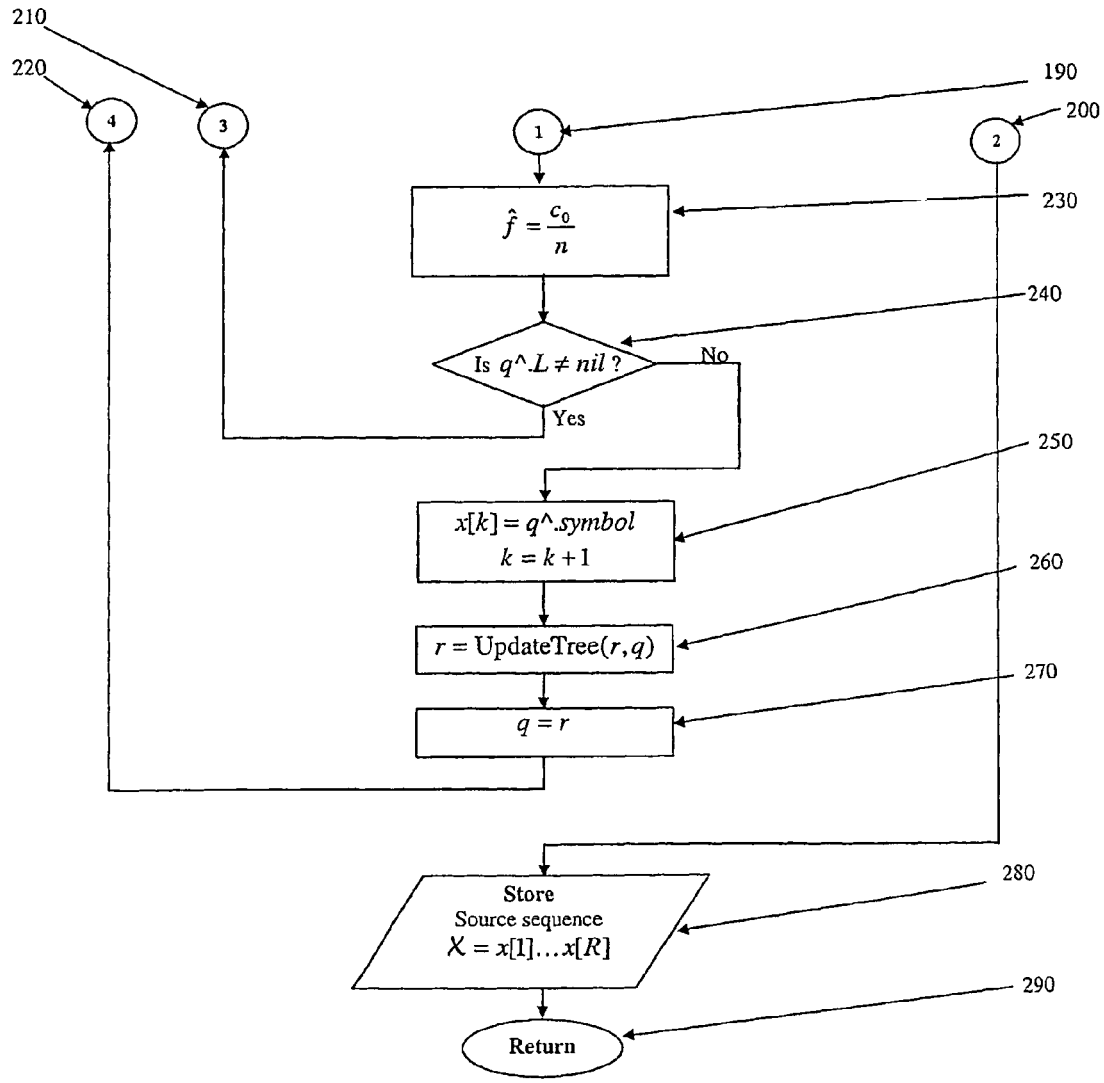
Figure 13:
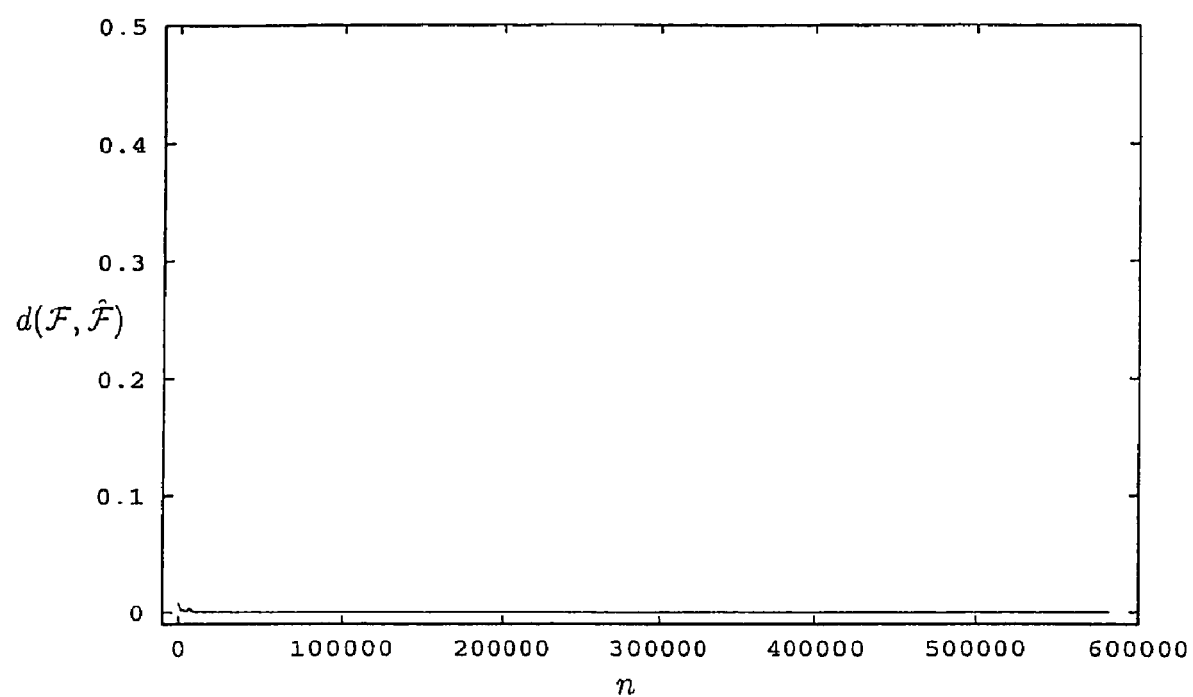
FIG. 13 graphically plots the average distance obtained after running $D\_A\_H\_E_{m,2}$ on file bib from the Calgary Corpus, where f*=0.5 and Θ=2.

The Process $D\_A\_H\_D_{m,2}$, depicted in FIGS. 11 and 12, begins with the Input/Output block 100, where the encoded sequence, $Y=y[1] \ldots y[R]$ and the requested probability of '0', f*, are read. In block 110, the procedure that constructs the Huffman tree is invoked using the same initial probability distributions for the source symbols as those used in the Process $D\_A\_H\_E_{m,2}$ so as to recover the original source sequence, X. Again, the tree is referenced by a pointer to its root, r.

In block 120, the estimated probability of '0' in Y, f̂, and the counter of zeros in Y, $c_0$, are both set to 0. The counter of bits processed, n, and the counter of symbols sent to the output, k, are set to 1, and the current pointer, q, is set to the root of the tree, r. As in $D\_A\_H\_E_{m,2}$, other straightforward initializations of these quantities are also possible, but the Encoder and Decoder must maintain identical initializations if the original source sequence, X, is to be correctly recovered.

The decision block 130 constitutes the starting of a looping structure that processes all the bits from Y. The next block is the decision block 140, which compares the estimated probability of '0' in Y, f̂, to the requested probability, f*. If f̂≦f*, the branch assignment 0-1 is used, and hence in block 150, when a '0' comes from Y, the branch "Yes" moves q to its left child (block 180), and when y[n] is a '1', the current pointer, q, goes to its right child (block 170). The branch "No" of the decision block 140 (f̂>f*) indicates that the branch assignment 1-0 is used, leading to the decision block 160. When the current bit is a '0', the current pointer is set to its right child (block 170), and when y[n] is a '1', the current pointer, q, is set to its left child, and the counter of zeros in Y, $c_0$, is increased (block 180).

The process continues through connector 190, leading then to block 230 in which the estimated probability of '0' in Y, f̂, is updated using the current counter of zeros, $c_0$, and the counter of bits processed, n. The process continues by performing the decision block 240, where the current pointer, q, is tested. If q is not a leaf (i.e. its left child is not nil), the process continues with the next bit (the next edge in the path) going to block 140 through connector 210. Otherwise the corresponding source symbol, x[k], is recovered, and the counter of source symbols, k, is increased (block 250). The process continues with block 260, where the tree is updated by invoking the same updating procedure as that of the $D\_A\_H\_E_{m,2}$ so that the same tree is maintained by both the Encoder and Decoder. In block 270, the current pointer, q, is set to the root r, and the process continues with the decision block 130 through connector 220 so that the next source symbol is processed.

The branch "No" of the decision block 130 indicates that all the bits of Y have been processed, going (through connector 200) to the Input/Output block 280 in which the original source sequence, X, is stored. The Process $D\_A\_H\_D_{m,2}$ terminates in block 290.

Process $D\_A\_H\_D_{m,2}$

Input: The source alphabet, S. The encoded sequence, Y. The requested probability of 0, f*.

Output: The source sequence, X.

Assumption: It is assumed that there is a hashing function which locates the position of the input alphabet symbols as leaves in T. It is also assumed that the Process has at its disposal an algorithm (see [5], [16]) to update the Huffman tree adaptively as the source symbols come.

Method:

Construct a Huffman tree, T, assuming any suitable distribution for the symbols of S. In this instantiation, it is assumed that the symbols are initially equally likely.

```
c₀(0) ← 0; n ← 1; f(1) ← 0
q ← root(T); k ← 1
for n ← 1 to R do    // For all the symbols of the output sequence
    if f(n) ≦ f* then    // Assignment 0-1
        if y[n] = 0 then
            c₀(n) ← c₀(n − 1) + 1; q ← left(q)
        else
            q ← right(q)
        endif
    else    // Assignment 1-0
        if y[n] = 0 then
            q ← right(q)
```

-continued

```
    else
        c_0(n) ← c_0(n −1) + 1; q ← left(q)
    endif
endif
if q is a "leaf" then
    x[k] ← symbol(q)
    Update T by using the adaptive Huffman approach [5], [16].
    q ← root(T); k ← k + 1
endif
```

$\hat{f}(n) \leftarrow \frac{c_0(n)}{n}$ // Recalculate the probability of 0 in the output

```
endfor
End Process D_A_H_D_{m,2}
```

Proof of Convergence

The solution of DODC using $D\_A\_H\_E_{2,2}$ works with a Huffman tree which has three nodes: the root and two children. This tree has the sibling property, hence the decision in the branch assignment rule is based on the value of f(n) compared to the requested probability of 0 in the output, f*. The proof of convergence for this particular case is given below in Theorem 5.

Theorem 4 (Convergence of Process $D\_A\_H\_E_{2,2}$). Consider a memoryless source with alphabet S={0, 1}, whose probabilities are P=[p, 1−p], where p≧0.5, and the code alphabet, A {0, 1}. If the source sequence X=x[1], ..., x[n], ..., with x[i]∈S, i=1, ..., n, ..., is encoded using the Process $D\_A\_H\_E_{2,2}$ so as to yield the output sequence Y=y[1], ..., y[n], ..., such that y[i]∈A, i=1, ..., n, ..., then $$\lim_{n \to \infty} Pr[\hat{f}(n) = f^*] = 1, \quad (6)$$

where f* is the requested probability of 0 in the output, $(1-p \leq f^* \leq p)$, and $$\hat{f}(n) = \frac{c_0(n)}{n}$$

with $c_0(n)$ being the number of 0's encoded up to time n.

The Huffman tree maintained in $D\_A\_H\_E_{m,2}$ satisfies the sibling property, even though its structure may change at every time 'n'. Therefore, the convergence of $D\_A\_H\_E_{m,2}$ follows from the convergence of $D\_A\_H\_E_{2,2}$. The convergence result is stated in Theorem 6, and proved in Appendix B. Here, the fact that the estimated probability of 0 in the is output can vary on the range $[1-f_{max}, f_{max}]$ is utilized. The final result that $D\_A\_H\_E_{m,2}$ yields Statistical Perfect Secrecy follows.

Theorem 5 (Convergence of Process $D\_A\_H\_E_{m,2}$). Consider a memoryless source with alphabet S={$s_1, ..., s_m$} whose probabilities are P=[$p_1, ..., p_m$], and the code alphabet A={0, 1}. If the source sequence X=x[1] ... x[M] is encoded by means of the Process $D\_A\_H\_E_{m,2}$, generating the output sequence Y=y[1] ... y[R], then $$\lim_{n \to \infty} Pr[\hat{f}(n) = f^*] = 1, \quad (7)$$

where f* is the requested probability of 0 in the output $(1-f_{max} \leq f^* \leq f_{max})$, and $$\hat{f}(n) = \frac{c_0(n)}{n}$$

with $c_0(n)$ being the number of 0's encoded up to time 'n'.

Corollary 3. The Process $D\_A\_H\_E_{m,2}$ guarantees Statistical Perfect Secrecy.

Empirical Results

In order to demonstrate the performance of $D\_A\_H\_E_{m,2}$, the latter has been tested on files of the Calgary corpus. The empirical results obtained are cataloged in Table 6, for which the requested probability of 0 in the output is f*=0.5. The column labeled $f_{TAH}$ corresponds to the estimated probability of 0 in the output after encoding the files using the Tradition Adaptive Huffman (TAH) scheme. The column labeled $f_{DAHE}$ corresponds to the estimated probability of 0 in the output of $D\_A\_H\_E_{m,2}$. Observe that $D\_A\_H\_E_{m,2}$ performs very well on these files, and even sometimes attains the value 0.5 exactly. This is also true for the average performance, as can be seen from the table.

TABLE 6

Empirical results obtained after running $D\_A\_H\_E_{m,2}$ and TAH on the files of the Calgary corpus, where f* = 0.5.

| File Name | $f_{TAH}$ | $f_{DAHE}$ | d(F, F*) |
|---|---|---|---|
| bib | 0.534890885 | 0.500002567 | 6.59052E−12 |
| book1 | 0.539382961 | 0.500000142 | 2.02778E−14 |
| book2 | 0.536287453 | 0.499818087 | 3.30923E−08 |
| geo | 0.526089998 | 0.499985391 | 2.13437E−10 |
| news | 0.534758020 | 0.500027867 | 7.76559E−10 |
| obj1 | 0.527805217 | 0.497746566 | 5.07797E−06 |
| obj2 | 0.527944809 | 0.500000000 | 0.00000E+00 |
| paper1 | 0.535224321 | 0.500513626 | 2.63812E−07 |
| progc | 0.535104455 | 0.500121932 | 1.48674E−08 |
| progl | 0.535598140 | 0.500010118 | 1.02366E−10 |
| progp | 0.535403385 | 0.500000000 | 0.00000E+00 |
| trans | 0.533495837 | 0.500001909 | 3.64352E−12 |
| Average | | | 6.46539E−08 |

$D\_A\_H\_E_{m,2}$ was also tested on files of the Canterbury corpus. The empirical results are presented in Table 7, where, as usual, the optimal probability of 0 in the output was set to be f*=0.5. The power of $D\_A\_H\_E_{m,2}$ is reflected by the fact that the average distance is less than 9.0E−10, and that $D\_A\_H\_E_{m,2}$ performed extremely well in all the files contained in this benchmark suite. Observe that the performance achieved by $D\_A\_H\_E_{m,2}$ is as good as that of the static version $D\_S\_H\_E_{m,2}$. Additionally, it is important to highlight the fact that the former does not require any overhead (statistical information of the source) in the encoded data so as to proceed with the encoding and decoding processes.

TABLE 7

Empirical results of $D\_A\_H\_E_{m,2}$ and TAH tested on the files of the Canterbury corpus, where $f^* = 0.5$.

| File Name | $f_{TAH}$ | $f_{DAHE}$ | $d(F, F^*)$ |
|---|---|---|---|
| alice29.txt | 0.543888521 | 0.499945970 | 2.91922E−09 |
| asyoulik.txt | 0.538374097 | 0.500012320 | 1.51787E−10 |
| cp.html | 0.537992949 | 0.500003807 | 1.44948E−11 |
| fields.c | 0.534540728 | 0.499878683 | 1.47179E−08 |
| grammar.lsp | 0.537399558 | 0.499919107 | 6.54369E−09 |
| kennedy.xls | 0.535477484 | 0.499999865 | 1.82520E−14 |
| lcet10.txt | 0.538592652 | 0.499947023 | 2.80657E−09 |
| plrabn12.txt | 0.542479709 | 0.499999531 | 2.19961E−13 |
| ptt5 | 0.736702657 | 0.500000000 | 0.00000E+00 |
| xargs.1 | 0.536812041 | 0.500136005 | 1.84974E−08 |
| Average | | | 8.89609E−10 |

In order to provide another perspective about the properties of $D\_A\_H\_E_{m,2}$, a graphical display of the value of $d(F, \hat{F})$ obtained by processing the files bib of the Calgary corpus is included. The plot of the distance for this file is shown in FIG. 12.

Observe that the convergence of the estimated probability of 0 occurs rapidly, and the distance remains arbitrarily close to 0 as n increases. From our experience, in general, $D\_A\_H\_E_{m,2}$ converges faster than the static version $D\_S\_H\_E_{m,2}$. The results presented here are typical—analogous results are available for the other files of the Calgary corpus and for files of the Canterbury corpus.

The Randomized Embodiments Using Adaptive Huffman Coding

This section describes a few randomized embodiments for solving the Distribution Optimizing Data Compression problem. These processes are obtained by incorporating various stochastic (or randomized) rules in the decision of the labeling assignment. In general, the various embodiments operate on the general Oommen-Rueda Tree, but the embodiments described here specifically utilize a Huffman tree. Also, although the Huffman tree can be statically or adaptively maintained, to avoid repetition, the randomized embodiments are described in terms of the Adaptive Huffman Tree.

The Encoding Process

The first embodiment described is $RV\_A\_H\_E_{m,2}$. The underlying tree structure is the Adaptive Huffman Tree. The Branch Assignment Rule is randomized, and thus an branch assignment decision is made after invoking a pseudo-random number. As per the nomenclature mentioned earlier, it is referred to as $RV\_A\_H\_E_{m,2}$.

Consider the source alphabet $S=\{s_1, \ldots, s_m\}$ and the code alphabet $A=\{0, 1\}$. Consider also an input sequence $X=x[1] \ldots x[M]$, which has to be encoded, generating an output sequence $Y=y[1] \ldots y[R]$. The formal procedure for encoding X into Y by means of a randomized solution to the DODC, and utilizing the Huffman tree in an adaptive manner is formalized in Process $RV\_A\_H\_E_{m,2}$ below. The process is also given pictorially in FIGS. 14 and 15. The decision on the branch assignment to be used at time 'n' is based on the current pseudo-random number obtained from the generator, RNG[next_random_number], assumed to be available for the system in which the scheme is implemented. In general, any cryptographically secure pseudo-random number generator can be used.

Schematic of $RV\_A\_H\_E_{m,2}$

Figure 14:
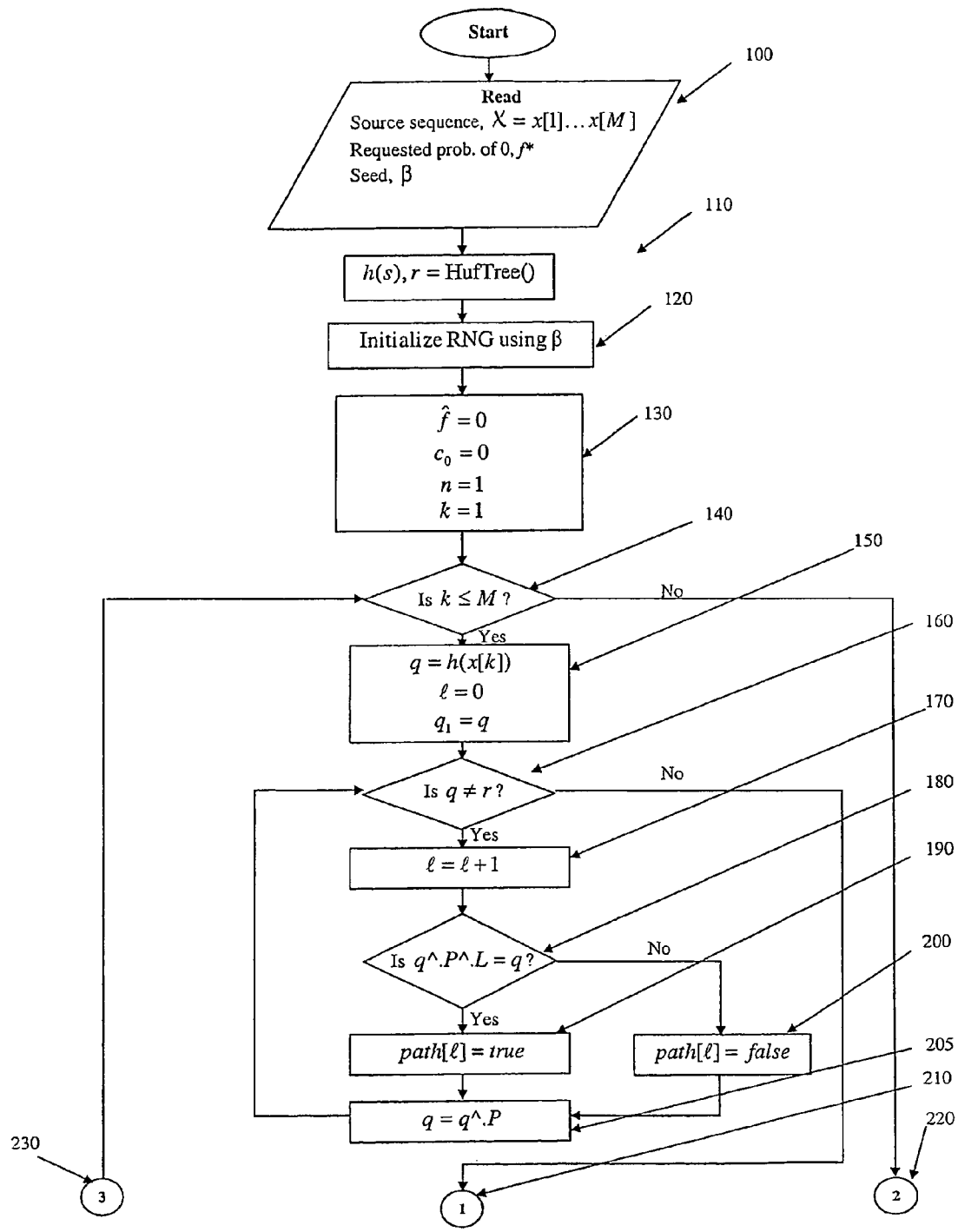
FIGS. 14 and 15 present a schematic diagram showing the Process $RV\_A\_H\_E_{m,2}$ used to encode an input data sequence. The input to the process is an initial Huffman Tree, T, and the source sequence, X. The output is the sequence, Y. It is assumed that there is a hashing function which locates the position of the input alphabet symbols as leaves in T.
Figure 15:
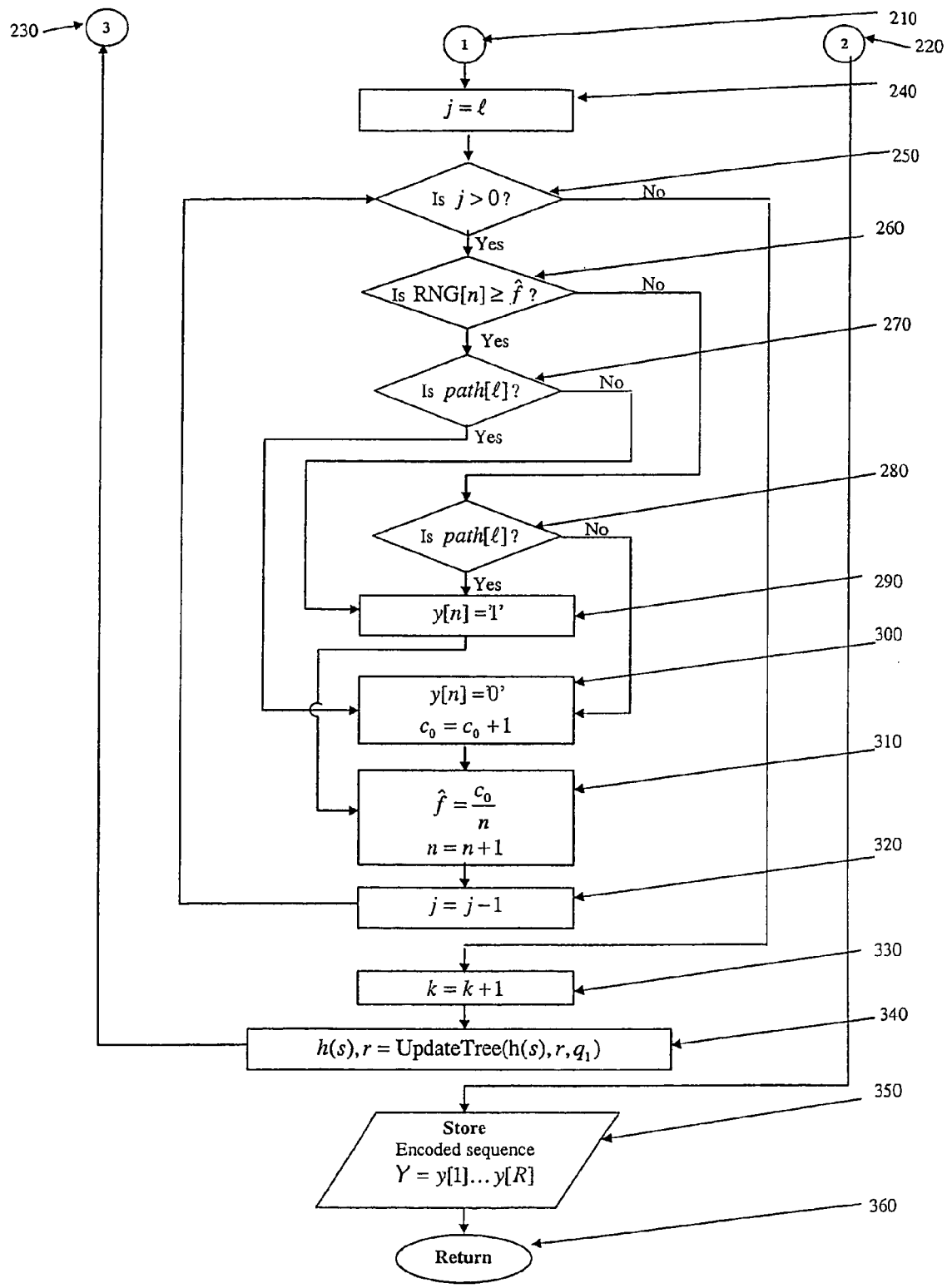
Figure 16:
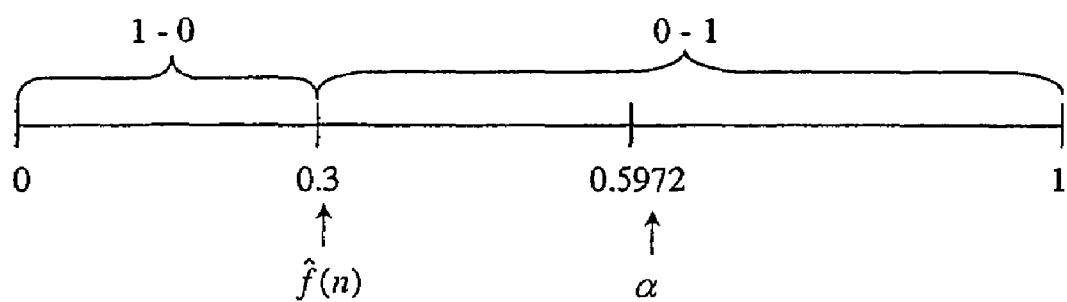
FIG. 16 demonstrates how the decision in the Branch Assignment Rule in Process $RV\_A\_H\_E_{m,2}$ is based on the value of f̂(n) and a pseudo-random number, α.

The Process $RV\_A\_H\_E_{m,2}$, depicted in FIGS. 14 and 15, begins in block 100, in which the input sequence, $X=x[1] \ldots x[M]$, the requested probability of '0' in the output, $f^*$, and a user-defined seed, $\beta$, are read. The initial seed must be exactly the same seed as used by the decoding Process $RV\_A\_H\_D_{m,2}$ to correctly recover the plaintext. A Huffman tree is then constructed in block 110 by following the procedure presented in Huffman (A Method for the Construction of Minimum Redundancy Codes, *Proceedings of IRE*, 40(9), pp. 1098-1101, (1952)), and assuming a suitable initial probability distribution for the source symbols. This procedure returns a pointer to the root of the tree, r, which serves as a reference to the entire tree, and a hashing function, h(s), which is used later to locate the node associated with s.

In block 120, a pseudo-random number generator (RNG) is initialized using the user-defined seed, $\beta$.

The next step consists of initializing the estimated probability of '0' in the output, $\hat{f}$, and the counter of zeros in the output, $c_0$, both to 0 (block 130). In this block, the counter of bits sent to the output, n, and the counter of source symbols processed from the input, k, are set to 1. Otherwise, the next decision block (block 140) constitutes the starting point of an iteration on the number of source symbols coming from the input. When there are symbols to be processed (the branch "Yes"), the process continues with block 150, where the current node, q, is set to the corresponding value that the hashing function returns after being invoked with the current source symbol as a parameter. The node associated with x[k], $q_1$, is set to the current node, q, and the length of the path from that node to the root, l, is set to 0. The decision block 160 evaluates if the current pointer, q, has not reached the root of the tree. In this case, the process continues with block 170, where the length of the path, l, is increased. The next block in the process is the decision block 180, which evaluates if the current node, q, is a left child or a right child. The path is set to true (block 190) in the former case, and to false (block 200) in the latter case. The process then continues with block 205, where the current pointer, q, is moved to its parent.

The branch "No" of the decision block 160 indicates that the current node has reached the root, and the process continues with block 240 through connector 210, where the counter of edges in the current path, j, is initialized to l, the length of the path. The decision block 250 constitutes the starting point of a looping structure that process all the nodes in the current path. When there are edges remaining in the path (j>0), the $n^{th}$ random number obtained from RNG is compared to the estimated probability of '0' in the output, $\hat{f}$, (block 260). If RNG[N]$\geq \hat{f}$, the branch assignment 0-1 is used, continuing the process with the decision block 270, which leads to the left child if path[l] is true. In this case, a '0' is sent to the output and the counter of zeros in the output, $c_0$, is incremented (block 310). If path[l] is false, the process continues with block 290, where a '1' is sent to the output. The branch "No" of the decision block 260 implies that the branch assignment 1-0 is used, continuing the process with the decision block 280. When path[l] is true, a '1' is sent to the output (block 290), otherwise the process continues with block 310. The next block in the process is block 320, where the estimated probability of '0' in the output, $\hat{f}$, is updated and the counter of bits sent to the output, n, is increased. The next block (block 320) decreases the counter of edges in the path, j, and continues with the next edge in the path (the decision block 250).

When all the edges in the current path have been processed, the process continues with block 330, where the counter of source symbols processed, k, is incremented. The next block in the process is block 340 in which the Huffman tree is updated by invoking the procedure introduced in Knuth (Dynamic Huffman Coding, *Journal of Algorithms*, Vol. 6, pp. 163-180, (1985)), or Vitter (Design and Analysis of Dynamic Huffman Codes, *Journal of the ACM*, 34(4):825-845, (1987)), returning the updated hash function, h(.), and the new root of the tree, r, if changed. The process continues with the decision block 140 (through connector 230).

When all the source symbols have been processed (branch "No" of the decision block 140), the process continues with the Input/Output block 350 (through connector 220), where the encoded sequence, Y, is stored. The process then terminates in block 360.

Process $RV\_A\_H\_E_{m,2}$

Input: The source alphabet, S. The source sequence, X. A user-defined seed, β. It is assumed that we are converging to the value of f*=0.5.

Output: The output sequence, Y.

Assumption: It is assumed that there is a hashing function which locates the position of the input alphabet symbols as leaves in T. It is also assumed that the Process has at its disposal an algorithm (see Knuth [5] and Vitter [16]) to update the Huffman tree adaptively as the source symbols come.

Method:

Construct a Huffman tree, T, assuming any suitable distribution for the symbols of S. In this instantiation, it is assumed that the symbols are initially equally likely.

---

Initialize a pseudo-random number generator, RNG, using β.
   $c_0(0) \leftarrow 0$; $n \leftarrow 1$; $\hat{f}(1) \leftarrow 0$
   for $i \leftarrow 1$ to M do   // For all the symbols of the input sequence
      Find the path for x[i]
      $q \leftarrow root(T)$
      while q is not a leaf do
         if RNG[next_random_number] $\geq \hat{f}(n)$ then   //Assignment 0-1
            if path is "left" then
               $y[n] \leftarrow 0$; $c_0(n) \leftarrow c_0(n-1)+1$; $q \leftarrow left(q)$
            else
               $y[n] \leftarrow 1$; $q \leftarrow right(q)$
            endif
         else   // Assignment 1-0
            if path is "left" then
               $y[n] \leftarrow 1$; $q \leftarrow left(q)$
            else
               $y[n] \leftarrow 0$; $c_0(n) \leftarrow c_0(n-1)+1$; $q \leftarrow right(q)$
            endif
         endif $\hat{f}(n) \leftarrow \dfrac{c_0(n)}{n}$; $n \leftarrow n + 1$ endwhile
      Update T by using the adaptive Huffman approach [5], [16].
   endfor
End Process $RV\_A\_H\_E_{m,2}$

---

Rationale for the Encoding Process

Process $RV\_A\_H\_E_{m,2}$ works by performing a stochastic rule, based on a pseudo-random number, a Huffman tree, and the estimated probability of 0 in the output at time 'n', $\hat{f}(n)$. At time 'n', the next pseudo-random number, α, obtained from the generator is compared with the current value of $\hat{f}(n)$. Since α is generated by a uniformly distributed random variable, the branch assignment 0-1 is chosen with probability $1-\hat{f}(n)$, and hence the branch assignment 1-0 is chosen with probability $\hat{f}(n)$. Let us denote $$p_i = \frac{\varpi_i}{\varpi_i + \varpi_{i+1}},$$

where $\overline{w}_i$ is the weight of the $i^{th}$ node of the Huffman tree, and $\overline{w}_{i+1}$ is the weight of its right sibling. Whenever $\hat{f}(n)<0.5$, the branch assignment 0-1 implies that the output is to be a 0 with probability $p_i$, and a 1 with probability $1-p_i$. Since $p_i \geq 0.5$ (because of the sibling property), the number of 0's in the output is more likely to be increased than the number of 1's. This rule causes $\hat{f}(n)$ to move towards f*=0.5. Conversely, when $\hat{f}(n)>0.5$, the branch assignment 1-0 causes $\hat{f}(n)$ to move downwards towards f*=0.5. This makes $\hat{f}(n)$ asymptotically converge to the fixed point f*=0.5 as n→∞. This is formally and empirically shown later in this section.

It is important to note that Process $RV\_A\_H\_E_{m,2}$ works only when the requested probability of 0 in the output is f*=0.5. However, $RV\_A\_H\_E_{m,2}$ can easily be adapted to work with any value of f*, whenever $1-f_{max} \leq f^* \leq f_{max}$. This can be achieved by generating random numbers from a random variable whose mean is the desired f*.

An example will clarify the above branch assignment rule.

EXAMPLE 5

Suppose that, at time 'n', the decision on the branch assignment has to be made. Suppose also that α=0.5972 . . . is the returned pseudo-random number, and that $\hat{f}(n)=0.3$. Both of these values are used to make the decision on the assignment. These values, the interval [0,1], and the range corresponding to each branch assignment are depicted in FIG. 15. From these arguments, it is easy to see that since $\hat{f}(n) \leq f^*=0.5$, it is more likely to send a 0 to the output than a 1, thus increasing $\hat{f}(n+1)$ from 0.3 towards f*. This shows the way by which $RV\_A\_H\_E_{m,2}$ works so as to asymptotically converge to f*.

The Decoding Process

The decoding process, $RV\_A\_H\_D_{m,2}$, follows from $RV\_A\_H\_E_{m,2}$, but in the reverse manner. As in the case of the $D\_A\_H\_E_{m,2}$ decoding process, $RV\_A\_H\_E_{m,2}$ works by keeping track of the number of 0's already read from the encoded sequence. These are used to estimate the probability of 0, $\hat{f}(n)$, at each time instant. Also, it is assumed that $RV\_A\_H\_E_{m,2}$ and $RV\_A\_H\_D_{m,2}$ utilize the same sequence of pseudo-random numbers to ensure that the encoded sequence is correctly decoded. Using this information and the Huffman tree (which is adaptively maintained), the stochastic rule is invoked so as to decide which branch assignment is to be used (either 0-1 or 1-0) to decode the given string. The actual procedure for the decoding process that uses Huffman coding adaptively is formalized in Process $RV\_A\_H\_D_{m,2}$ and given pictorially in FIGS. 17 and 18.

Schematic of $RV\_A\_H\_D_{m,2}$

Figure 17:
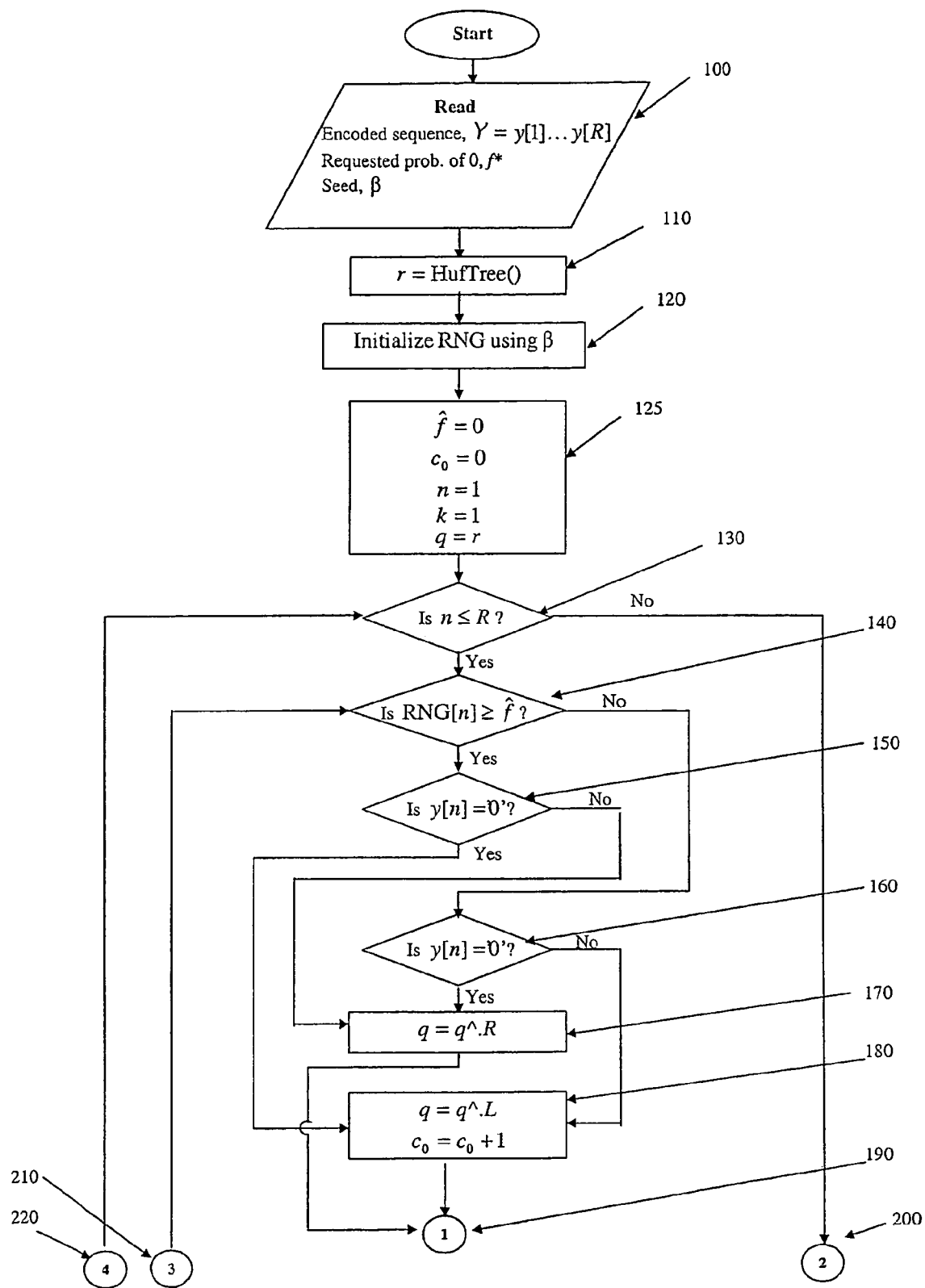
FIGS. 17 and 18 present a schematic diagram showing the Process $RV\_A\_H\_D_{m,2}$ used to decode a data sequence encoded by following Process $RV\_A\_H\_E_{m,2}$. The input to the process is the same initial Adaptive Huffman Tree, T used by Process $RV\_A\_H\_E_{m,2}$, and the encoded sequence, Y. The output is the decoded sequence, which is, indeed, the original source sequence, X.
Figure 18:
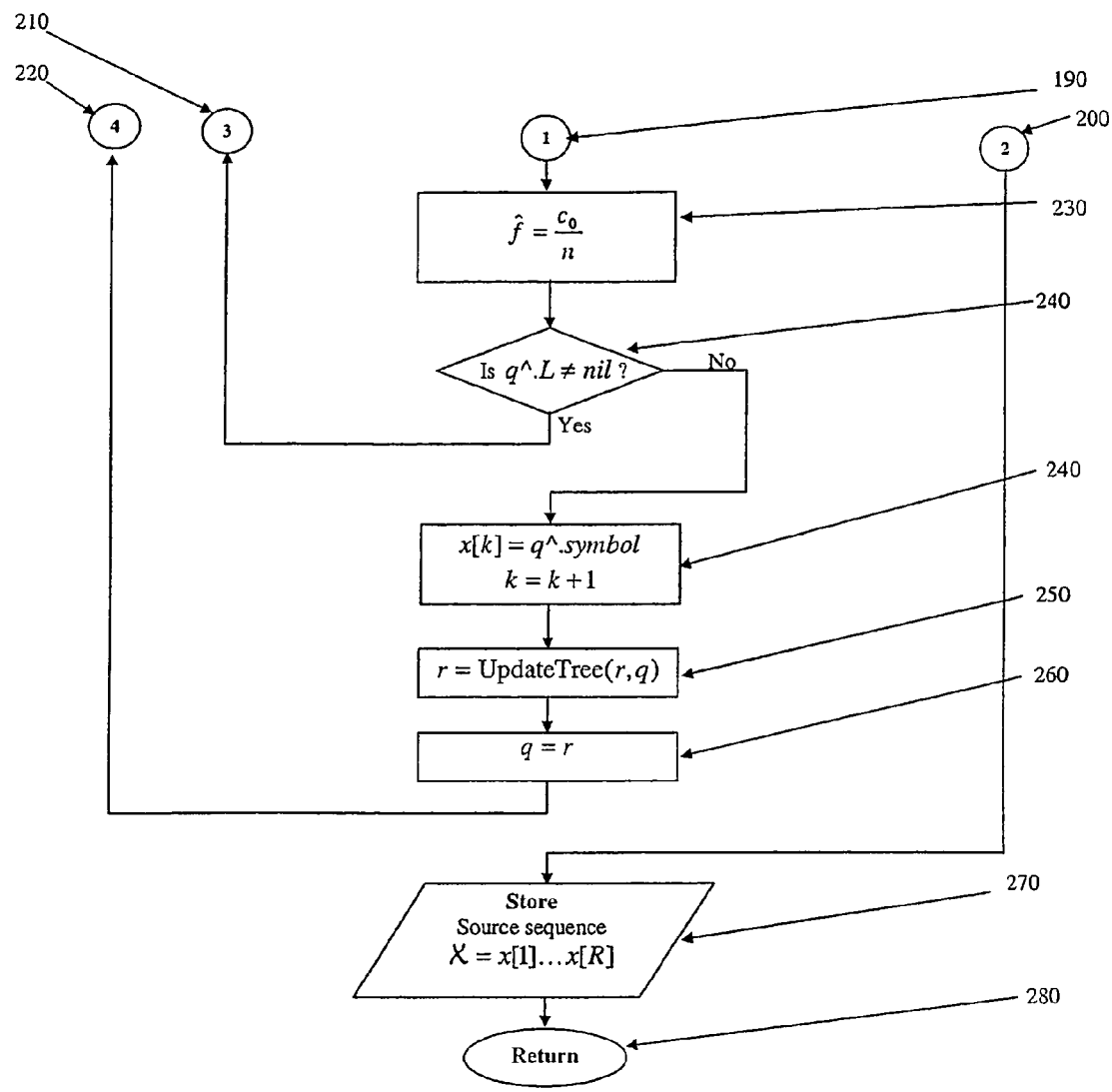

The schematic of Process $RV\_A\_H\_E_{m,2}$ given in FIGS. 17 and 18 is explained below. The process starts with the Input/Output block 100, where the encoded sequence, Y=y1] . . . y[R], the requested probability of '0' in the output, f*, and a user-defined seed, β, are read. The initial seed must be exactly the same seed as used by the Process $RV\_A\_H\_E_{m,2}$ to correctly recover the plaintext.

The next block (block 110) generates a Huffman tree by invoking the same procedure as that of the Process $RV\_A\_H\_E_{m,2}$ with the same initial probabilities for the source symbols, returning the root of the tree, r.

The next block in the process is block 120 which initializes the same pseudo-random number generator (RNG) as that of Process RV_A_H_E$_{m,2}$, using the user-defined seed β. In block 125, the estimated probability of '0' in Y, f̂, and the counter of zeros in Y, c$_0$, are both set to 0. The counter of bits processed from Y, n, and the counter of source symbols processed, k, are set to 1. As in the processes described earlier, other straightforward initializations of these quantities are also possible, but the Encoder and Decoder must maintain identical initializations if the original source sequence, X, is to be correctly recovered. In this block, the pointer to the current node, q, is set to the root r.

The next block of the process is the decision block 130, which constitutes the starting point of an iteration on the number of bits processed. The "Yes" branch of this block indicates that more bits have to be processed, continuing with the decision block 140, in which the current pseudo-random number from RNG is compared with the estimated probability of '0' in Y. When RNG[n]≧f̂, the branch assignment 0-1 is being used, and the process continues with the decision block 150, which tests if the current bit is a '0'. In this case, the process continues with block 180, where the current pointer, q, is moved to its left child and the counter of zeros in Y is incremented. Conversely, when the current bit is a '1', the process continues with block 170, in which the current pointer, q, is moved to its right child.

The branch "No" of block 140 continues with the decision block 160, which tests the current bit. If this bit is a '0', the process continues with block 170, otherwise, it goes to block 180.

The next block in the process is block 230 (reached through connector 190), where the estimated probability of '0' in y is re-calculated. The decision block 240 tests if the current pointer has not reached a leaf. In this case, the process continues with the next edge in the path, going to the decision block 140 (reached through connector 210). The branch "No" of the decision block 240 indicates that a leaf is reached, and the corresponding source symbol, x[k], is recovered (block 240). The counter of source symbols, k, is thus incremented.

The next block in the process is block 250, in which the Huffman tree is updated by invoking the same updating procedure as that of the Process RV_A_H_E$_{m,2}$. In block 260, the current pointer, q, is moved to the root r, and the process continues with the decision block 130 (reached through connector 220).

When all the bits from Y are processed (branch "No" of the decision block 130), the process continues with the Input/Output block 270 (reached through connector 200). The source sequence X is stored, and the process ends in block 280.

Process RV_A_H_D$_{m,2}$

Input: The source alphabet, S. The encoded sequence, Y. A user-defined seed, β. It is assumed that we are converging to the value of f*=0.5.

Output: The source sequence, X.

Assumption: It is assumed that there is a hashing function which locates the position of the input alphabet symbols as leaves in T. It is also assumed that the Process has at its disposal an algorithm (see Knuth [5] and Vitter [16]) to update the Huffman tree adaptively as the source symbols come. In order to recover the original source sequence, X, β must be the same as the one used in Process RV_A_H_E$_{m,2}$.

Method:

Construct a Huffman tree, T, assuming any suitable distribution for the symbols of S. In this instantiation, it is assumed that the symbols are initially equally likely.

Initialize a pseudo-random number generator, RNG, using β.

```
c_0(0) ← 0; n ← 1; f̂(i) ← 0
q ← root(T); k ← 1
for n ← 1 to R do    // For all the symbols of the output sequence
    if RNG[next_random_number] ≧ f̂(n) then   // Assignment 0-1
        if y[n] = 0 then
            c_0(n) ← c_0(n − 1) + 1; q ← left(q)
        else
            q ← right(q)
        endif
    else    // Assignment 1-0
        if y[n] = 0 then
            q ← right(q)
        else
            c_0(n) ← c_0(n − 1) + 1; q + left(q)
        endif
    endif
    if q is a "leaf" then
        x[k] ← symbol(q);
        Update T by using the adaptive Huffman approach [5], [16].
        q ← root(T); k ← k+ 1
    endif
```

$$\hat{f}(n) \leftarrow \frac{c_0(n)}{n} \quad \text{// Recalculate the probability of 0 in the output}$$

```
endfor
End Process RV_A_H_D_{m,2}
```

The Proof of Convergence

Prior to considering the more general case of RV_A_H_E$_{m,2}$ the convergence of the binary-input case, RV_A_H_E$_{2,2}$ is first discussed. This particular case uses an adaptively constructed Huffman tree which has three nodes: the root and two children. This tree has the sibling property, and hence the decision on the branch assignment is based on the value of f̂(n) and the pseudo-random numbers generated. Consider the case in which the requested probability in the output is f*=0.5. The proof of convergence[3] for this particular case is stated in Theorem 7, and proven in the Appendix B.[4]

[3]The modus operandus of the proof is slightly different from that of Theorem 4. It rather follows the proofs of the L$_{RP}$ scheme of automata learning (see Lakshmivarahan (*Learning Algorithms Theory and Applications*. Springer-Verlag, New York, (1981)), and Narendra et al. (*Learning Automata. An Introduction*, Prentice Hall, (1989))). The quantity $$E\left[\hat{f}(n+1)\big|_{\hat{f}(n)}\right]$$

in terms of f̂(n) is first computed. The expectation is then taken a second time and $$E\left[\hat{f}(n+1)\right]$$

is solved by analyzing the difference equation. It turns out that this difference equation is linear!

[4]The price that is paid for randomizing the solution to DODC is that the complexity of the analysis increases; f̂(n) is now a random variable whose mean converges to f* and variance converges to zero. Mean square convergence, and consequently, convergence in probability, are thus guaranteed.

Theorem 6 (Convergence of Process RV_A_H_E$_{2,2}$). Consider a memoryless source whose alphabet is S={0, 1} and a code alphabet, A={0, 1}. If the source sequence X=x[1], . . . , x[n], . . . , with x[i]∈S, i=1, . . . , n, . . . , is encoded using the Process RV_A_H_E$_{2,2}$ so as to yield the output sequence Y=y[1], ..., y[n], ..., such that y[i]∈A, i=1, ..., n, ..., then $$\lim_{n\to\infty} E[\hat{f}(n)] = f^*, \text{ and} \quad (8)$$

$$\lim_{n\to\infty} Var[\hat{f}(n)] = 0, \quad (9)$$

where f*=0.5 is the requested probability of 0 in the output, and $$\hat{f}(n) = \frac{c_0(n)}{n}$$

with $c_0(n)$ being the number of 0's encoded up to time n. Thus f(n) converges to f* in the mean square sense, and in probability.

When RV_A_H_E$_{2,2}$ is generalized to the Huffman tree maintained in RV_A_H_E$_{m,2}$, the latter satisfies the sibling property even though its structure may change at every time 'n'. As before, the proof of convergence of RV_A_H_E$_{m,2}$, relies on the convergence properties of the binary input alphabet scheme, RV_A_H_E$_{2,2}$. The convergence result is stated and proved in Theorem 8. Crucial to the argument is the fact that the estimated probability of 0 in the output can vary within the range [1-f$_{max}$, f$_{max}$].

Theorem 7 (Convergence of Process RV_A_H_E$_{m,2}$). Consider a memoryless source whose alphabet is S={=s$_1$, ..., s$_m$} and a code alphabet, A={0, 1}. If the source sequence X=x[1], ..., x[M], ..., with x[i]∈S, i=1, ..., n, ..., is encoded using the Process RV_A_H_E$_{m,2}$ so as to yield the output sequence Y=y[1], ..., y[R], ..., such that y[i]∈A, i=1, ..., R, ..., then $$\lim_{n\to\infty} E[\hat{f}(n)] = f^*, \text{ and} \quad (10)$$

$$\lim_{n\to\infty} Var[\hat{f}(n)] = 0, \quad (11)$$

where f*=0.5 is the requested probability of 0 in the output, and $$\hat{f}(n) = \frac{c_0(n)}{n}$$

with $c_0(n)$ being the number of 0's encoded up to time n. Thus f(n) converges to f* in the mean square sense and in probability.

Corollary 4. The Process RV_A_H_E$_{m,2}$ guarantees Statistical Perfect Secrecy.

RF_A_H_E$_{m,2}$: A Randomized Embodiment not Utilizing f(n)

The above randomized embodiment, RV_A_H_E$_{m,2}$, was developed by comparing the invoked random number with f(n). Since the mean of the random number is 0.5, and since convergence to a value f*=0.5 is intended, it is easy to modify RV_A_H_E$_{m,2}$ so that the random number invoked is compared to the fixed value 0.5, as opposed to the time-varying value f(n).

Indeed, this is achieved by modifying Process RV_A_H_E$_{m,2}$ by merely is changing the comparison:
  if RNG[next_random_number]≧f(n) then // Assignment 0-1 to:
  if RNG[next_random_number]≧0.5 then // Assignment 0-1.

Since the dependence of the branch assignment rule does not depend on f(n) the convergence rate degrades. However, this modified process, RF_A_H_E$_{m,2}$, is computationally more efficient than RV_A_H_E$_{m,2}$, since it avoids the necessity to constantly update f(n).

The convergence and Statistical. Perfect Secrecy properties of the RF_A_H_E$_{m,2}$ are easily proven.

The formal description of the processes RF_A_H_E$_{m,2}$ and the RF_A_H_D$_{m,2}$, and the corresponding proofs of their properties are omitted to avoid repetition.

RR_A_H_E$_{m,2}$: An Embodiment Utilizing an f(n)-Based Random Variable

As observed, the above randomized embodiment, RV_A_H_E$_{m,2}$, was developed by comparing the invoked random number, α, with f(n), which comparison was avoided in RF_A_H_E$_{m,2}$.

A new process, RR_A_H_E$_{m,2}$, is now designed in which the random number invoked, α, is not compared to f(n) but to a second random variable whose domain depends on f(n).

Figure 19:
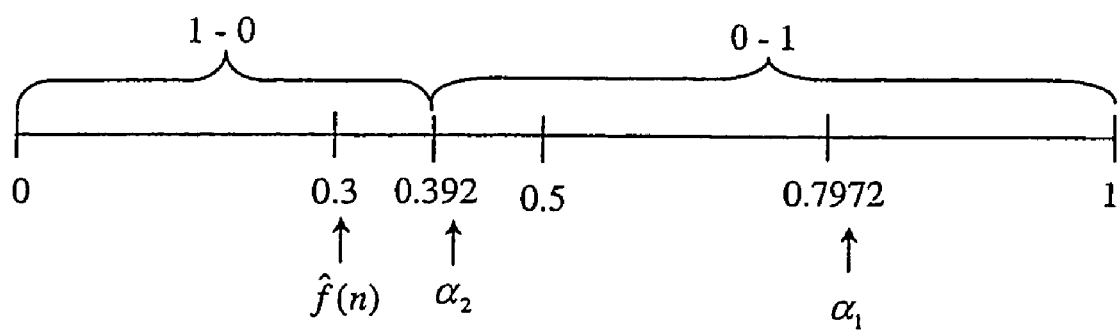
FIG. 19 demonstrates how the decision in the Branch Assignment Rule in Process $RR\_A\_H\_E_{m,2}$ is based on the value of f(n) and two pseudo-random member invocations.

Observe that the mean of the random number in [0,1] is 0.5. Since convergence to a value f*=0.5 is intended, RR_A_H_E$_{m,2}$ is developed by forcing f(n) to move towards 0.5 based on how far it is from the fixed point. But rather than achieve this in a deterministic manner, this is done by invoking two random variables. The first, α, as in RR_A_H_E$_{m,2}$ returns a value in the interval [0,1]. The second, α$_2$, is a random value in the interval [f(n), 0.5] (or [0.5, f(n)], depending on whether f(n) is greater than 0.5 or not). The branch assignment is made to be either 0-1 or 1-0 randomly depending on where α is with regard to α$_2$. The rationale for this is exactly as in the case of RV_A_H_E$_{m,2}$, except that the interval [f(n), 0.5] (or [0.5, f(n)]) is amplified to ensure that the convergence is hastened, and the variations around the fixed point are minimized. FIG. 19 clarifies this.

These changes are achieved by modifying Process RV_A_H_E$_{m,2}$ by merely changing the comparisons:

if RNG[next_random_number] ≧ f(n)
                                         then // Assignment 0-1
  to:
  if RNG[next_random_number] ≧ RNG[next_random_number (f(n), 0.5)]
                                         then // Assignment 0-1.

It should be observed that this process, RR_A_H_E$_{m,2}$, is computationally less efficient than RV_A_H_E$_{m,2}$ because it requires two random number invocations. However, the transient behavior is better, and the variation around the fixed point is less than that of RV_A_H_E$_{m,2}$.

The convergence and Statistical Perfect Secrecy properties of the RR_A_H_E$_{m,2}$ are easily proven.

The formal description of the processes RR_A_H_E$_{m,2}$ and the RR_A_H_D$_{m,2}$, and the corresponding proofs of their properties are omitted to avoid repetition. However, the experimental results involving these processes will be included later.

Empirical Results

As before, the Processes RV_A_H_E$_{m,2}$, RF_A_H_E$_{m,2}$ and the RR_A_H_E$_{m,2}$, and their respective decoding counterparts, have been rigorously tested on files of the Calgary corpus and the Canterbury corpus. The empirical results obtained for these runs for RV_A_H_E$_{m,2}$ are shown in Tables 8 and 9 respectively.

TABLE 8

Empirical results obtained from RV_A_H_E$_{m,2}$ and TAH which were tested files of the Calgary corpus, where f* = 0.5.

| File Name | f$_{TAH}$ | f$_{RVAHE}$ | d(F, F*) |
|---|---|---|---|
| bib | 0.534890885 | 0.499661985 | 1.14254E−07 |
| book1 | 0.539382961 | 0.499823502 | 3.11515E−08 |
| book2 | 0.536287453 | 0.499586161 | 1.71263E−07 |
| geo | 0.526089998 | 0.499553980 | 1.98933E−07 |
| news | 0.534758020 | 0.500035467 | 1.25789E−09 |
| obj1 | 0.527805217 | 0.498309924 | 2.85636E−06 |
| obj2 | 0.527944809 | 0.499897080 | 1.05926E−08 |
| paper1 | 0.535224321 | 0.498786652 | 1.47221E−06 |
| progc | 0.535104455 | 0.499165603 | 6.96219E−07 |
| progl | 0.535598140 | 0.500651864 | 4.24927E−07 |
| progp | 0.535403385 | 0.499089276 | 8.29419E−07 |
| trans | 0.533495837 | 0.499352913 | 4.18722E−07 |
| Average | | | 1.77154E−07 |

The second column, f$_{TAH}$, corresponds to the estimated probability of 0 in the output obtained from the Traditional Adaptive Huffman scheme (TAH). The third column, f$_{RVAHE}$, contains the estimated probability of 0 in the output obtained from running RV_A_H_E$_{m,2}$. The last column corresponds to the distance between f*=0.5 and f$_{RVAHE}$, calculated as in (14).

Observe the high accuracy of RV_A_H_E$_{m,2}$ for all the files. Although

TABLE 9

Empirical results obtained from running RV_A_H_E$_{m,2}$ and TAH on the files of the Canterbury corpus, where f* = 0.5.

| File Name | f$_{TAH}$ | f$_{RVAHE}$ | d(F, F*) |
|---|---|---|---|
| alice29.txt | 0.543888521 | 0.499892467 | 1.15633E−08 |
| asyoulik.txt | 0.538374097 | 0.499223828 | 6.02443E−07 |
| cp.html | 0.537992949 | 0.501100307 | 1.21068B−06 |
| fields.c | 0.534540728 | 0.498457539 | 2.37919E−06 |
| grammar.lsp | 0.537399558 | 0.500566251 | 3.20641E−07 |
| kennedy.xls | 0.535477484 | 0.500015798 | 2.49567E−10 |
| lcet10.txt | 0.538592652 | 0.500311976 | 9.73291E−08 |
| plrabn12.txt | 0.542479709 | 0.500325952 | 1.06245E−07 |
| ptt5 | 0:736702657 | 0.500339382 | 1.15180E−07 |
| xargs.1 | 0.536812041 | 0.500181340 | 3.28842E−08 |
| Average | | | 1.17159E−07 | the performance of RV_A_H_E$_{m,2}$ is comparable to that of D_A_H_E$_{m,2}$, the average distance is less than 2.0E-07 for files of the Calgary corpus and the Canterbury corpus. Note also that the largest value of the distance for the files of the Calgary corpus and the Canterbury corpus is less than 1.5E-06.

Figure 20:
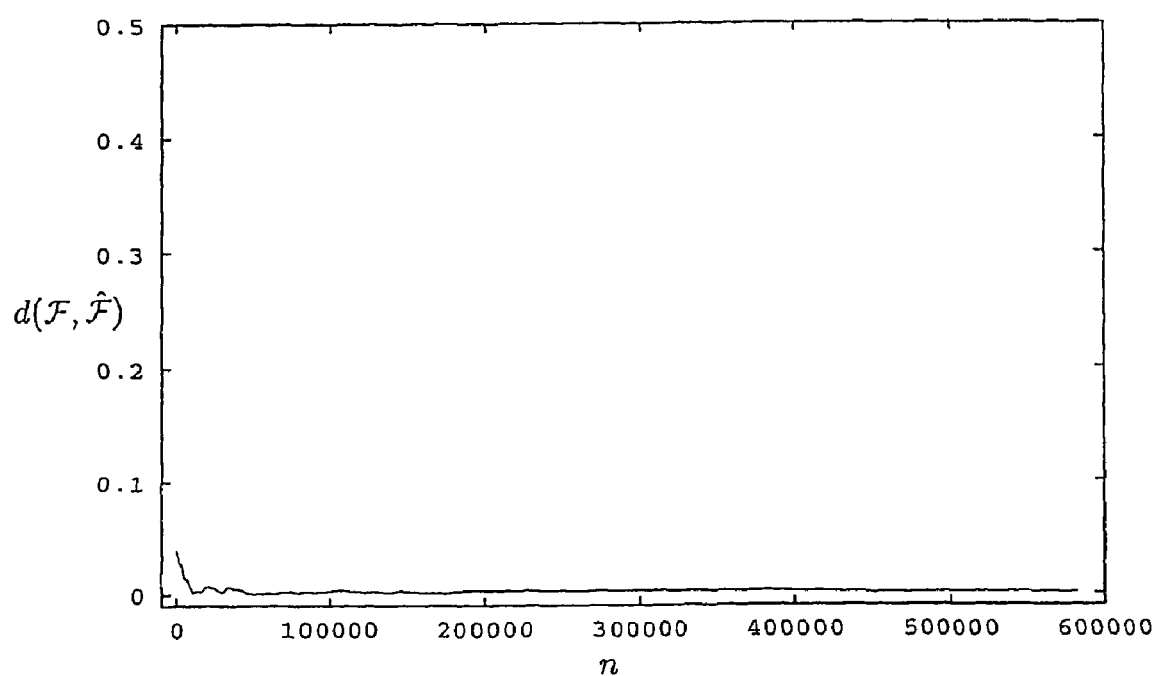
FIG. 20 graphically plots the average distance obtained after running Process $RV\_A\_H\_E_{m,2}$ on file bib from the Calgary Corpus, where f*=0.5 and Θ=2.

A graphical analysis of the RV_A_H_E$_{m,2}$ is presented by plotting the value of d(F, F̂) obtained by processing the file bib of the Calgary corpus. The plot of the distance for this is depicted in FIG. 20.

Note how the estimated probability of 0 converges very rapidly (although marginally slower than D_A_H_E$_{m,2}$) to 0.5. This is reflected in the fact that the distance remains arbitrarily close to 0 as n increases. Similar results are available for the other files of the Calgary corpus and for files of the Canterbury corpus, and are omitted.

Encryption Processes Utilizing DDODE and RDODE Solutions

This section describes how the deterministic and randomized embodiments of DODE can be incorporated to yield various encryption strategies.

As mentioned earlier, the notation used is that DDODE is a generic name for any Deterministic encoding solution that yields Statistical Perfect Secrecy. Similarly, RDODE is a generic name for any Randomized encoding solution that yields Statistical Perfect Secrecy.

Elimination of Transient Behavior

There are two ways to eliminate the transient behavior of any DDODE or RDODE process. These are explained below.

In the first method, the Sender and the Receiver both initialize n to have a large value (typically about 1000) and also assign f̂(n) to be 0.5. Since the initial solution for f̂(n) is at the terminal fixed point, the process is constrained by the updating rule to be arbitrarily close to it. This eliminates the transient behavior.

In the second method, the input sequence X is padded in a prefix manner with a simple key-related string. This string could be, in the simplest case, a constant number of repetitions of the key itself. In more elegant implementations, this prefix string could be multiple number of predetermined variations of a string generated from the key. It should be noted that since the Sender and the Receiver are aware of the key, they are also aware of the prefix padded portion. This key-related prefix is called the TransientPrefix. The only requirement that is imposed on TransientPrefix is that it must be key related, known a priori to the Sender and Receiver, and must be of sufficient length so that after it, is processed, the system enters into its steady state, or non-transient behavior. Typically, a string of a few thousand bits guarantees this phenomenon.

The issue of eliminating the transient is solved as follows. The Sender first pads X with TransientPrefix, to generate a new message X$_{Temp}$, which is now processed by the encryption that utilizes either the process DDODE or RDODE. Before transmitting its coded form, say, X'$_{Temp}$, the Sender deletes TransientPrefix', the prefix information in X'$_{Temp}$, which pertains to the encryption of TransientPrefix, to yield the resultant string X"$_{Temp}$. X"$_{Temp}$ does not have any transient characteristics—it converges to 0.5 immediately. The Receiver, being aware of this padding information and the process which yielded X"$_{Temp}$, pads X"$_{Temp}$ with TransientPrefix' to yield X'$_{Temp}$, whence the decryption follows.

The formal procedure for achieving this is straightforward and omitted in the interest of brevity. In future, whenever reference is made to encryptions involving DDODE or RDODE, they refer to the versions in which the transient behavior is eliminated.

Serial Use of DDODE or RDODE with Traditional Encryptions

Both DDODE and RDODE can be used to enhance encryption Systems by utilizing them serially, in conjunction with any, already existing, encryption mechanism.

Two encryption methods, DODE^ and DODE$^+$ respectively, based on a solution to the DODE are presented. The solution to the DODE can be either deterministic (DDODE) or randomized (RDODE).

1. DODE^ uses a DDODE or RDODE process as an encoding mechanism in conjunction with any encryption, say ENC$_{NonPreserve}$, that does not preserve the input-output random properties. Observe that without a key specifying mechanism, both DDODE and RDODE can be used as encoding processes that guarantee Statistical Perfect Secrecy. If this output is subsequently encrypted, the system cannot be broken by statistical methods because DDODE and RDODE annihilate the statistical information found in the original plaintext, and simultaneously provides Stealth. However, the output of the serial pair will depend on the stochastic properties of $ENC_{NonPreserve}$. $ENC_{NonPreserve}$, the encryption operating in tandem with DDODE or RDODE can be any public key cryptosystem or private key cryptosystem (see Stinson (*Cryptography: Theory and Practice*, CRC Press, (1995))).

2. $DODE^+$ uses a DDODE or RDODE process as an encoding mechanism in conjunction with any encryption that preserves the input-output random properties, say, $ENC_{Preserve}$. Typically, any "good" substitution or permutation encryption achieves this (one such straightforward process for $ENC_{Preserve}$ is given in Appendix C). From the earlier discussions it is clear that without a key specifying mechanism, both DDODE and RDODE can be used as encoding processes that guarantee Statistical Perfect Secrecy. If this output is subsequently encrypted by $ENC_{Preserve}$, the system cannot be broken by statistical methods because DDODE and RDODE annihilate the statistical information found in the original plaintext. Observe that since $ENC_{Preserve}$ preserves the input-output random properties, one can expect the output of the tandem pair to also guarantee Statistical Perfect Secrecy. Thus, breaking $DODE^+$ using statistical-based cryptanalytic methods is impossible, and necessarily requires the exhaustive search of the entire key space. $DODE^+$ also provides Stealth.

RDODE*: Encryption Utilizing RDODE

This section describes how RDODE, any randomized embodiment for DODE, can be utilized for encryption. The encryption is obtained by incorporating into RDODE a key specifying mechanism.

Unlike $DODE^\wedge$ and $DODE^+$, in which the two processes of compression (expansion or data length specification in the case of general Oommen-Rueda Trees) and encryption operate serially on each other, in the case of RDODE*, it is not possible to decompose RDODE* into the two composite mutually exclusive processes. They augment each other in a non-decomposable manner.

RDODE* uses a private key. This key[5] is used to specify $\beta$, the initial seed used by the Random Number Generator invoked by the specific randomized solution, RDODE. The mapping from the key to the seed is now described.

[5] The key alphabet can contain letters, numbers, special symbols (such as '*', ')', '#'), the blank space, etc. In a developed prototype, the key alphabet consists of $\{a, \ldots, z\} \cup \{A, \ldots, Z\} \cup \{0, \ldots, 9\} \cup \{space, `.`\}$.

Formally, the key, K, is a sequence of symbols, $k[1] \ldots k[T]$, where $\forall i, k[i] \in B = \{b_1, \ldots, b_r\}$. The key uniquely specifies the initial seed used by the pseudo-random generator, by means of a transformation of K into an integer. There are numerous ways by which this transformation can be defined. First of all, any key, K, of length T can clearly be transformed into an integer in the range $[0, \ldots, t^T-1]$. Furthermore, since the symbols of the key can be permuted, there are numerous possible transformations that such a key-to-integer mapping can be specified. One such transformation procedure is proposed below.

Consider a key, $K = k[1] \ldots k[T]$ (where $k[i] \in B$), which is to be transformed into a seed, $\beta$. First, K is transformed into an sequence of integers, where each symbol of B is a unique integer between 0 and t-1. This sequence is of the form $K' = k'[1] \ldots k'[T]$, such that $\forall i, k'[i] \in \{0, \ldots, t-1\}$. After this transformation, the seed[6], $\beta$, is calculated as follows:

[6] It should be noted that this conversion yields the seed as an integer number. If the system requires a binary seed, the latter can be trivially obtained from the binary expansion of $\beta$.

$$\beta = \sum_{i=0}^{T-1} k'[i+1] t^i. \qquad (12)$$

It can be trivially seen that for each transformed key, $k'[1] \ldots k'[T]$, there is a unique integer, $\beta$ in the set $\{0, \ldots, t^T-1\}$, and hence if $\beta \leq Z_{max}$, Statistical Perfect Secrecy can be achieved, where $Z_{max}$ is the maximum possible seed of the pseudo-random number generator. Observe too that both the Sender and Receiver must have the same initial seed, $\beta$, so as to recover the original source sequence.

After invoking the RNG using $\beta$, the value of the seed $\beta$, is updated. This implies that the labeling branch assignment to yield the $n^{th}$ bit of the output, is determined by the current pseudo-random number generated using the current value of $\beta$. Thus, same sequences of pseudo-random numbers are utilized by the encryption and decryption mechanisms.

In any practical implementation, the maximum number that a seed can take depends on the precision of the system being used. When $\beta > Z_{max}$, where $Z_{max}$ is the maximum seed that the system supports, $\beta$ can be decomposed into J seeds, $Z_1, \ldots, Z_J$, so as to yield J pseudo-random numbers. The actual pseudo-random number, (say $\alpha$), to be utilized in the instantiation of RDODE is obtained by concatenating the J random numbers generated at time n, each of which invokes a specific instantiation of the system's RNG. Thus, if the encryption guarantees 192-bit security, it would imply the invocation of four 48-bit pseudo-random numbers, each being a specific instantiation of the system's RNG.

A small example will help to clarify this procedure.

EXAMPLE 6

Suppose that a message is to be encrypted using the key K="The Moon", which is composed of symbols drawn from the alphabet B that contains 64 symbols: decimal digits, the blank space, upper case letters, lower case letters, and '.'. The transformation of K into K' is done as follows:

the digits from 0 to 9 are mapped to the integers from 0 to 9,

The blank space is mapped to 10, the letters from A to Z are mapped to the integers from 11 to 36, the letters from a to z are mapped to the integers from 37 to 62, and the period, '.', is mapped to 63.

Therefore, $K' = 30\ 44\ 41\ 10\ 23\ 51\ 51\ 50$. There are $64^8 = 281,474,976,710,656$ possible seeds, which are contained in the set $\{0, \ldots, 64^8-1\}$.

The seed, $\beta$, is calculated from K as follows:

$$\beta = (30)64^0 + (44)64^1 + (41)64^2 + (10)64^3 + (23)64^4 + (51)64^5 + (51)64^6 + (50)64^7$$

$$= 223,462,168,369,950.$$

Observe that such a key-to-seed transformation is ideal for an RNG implementation working with 48-bit accuracy, as in the Java programming language (jdk 1.xx). In such a case, a key of length eight chosen from the 64-symbol key space leads to a seed which is uniform in the seed space.

We conclude this section by noting that by virtue of the previous results, every instantiation of RDODE* guarantees Statistical Perfect Secrecy. Thus, breaking RDODE* using statistical-based cryptanalytic methods is impossible, and necessarily requires the exhaustive search of the entire key space.

Testing of Encryptions Utilizing $RV\_A\_H\_E_{m,2}$ and $RR\_A\_H\_E_{m,2}$

To demonstrate the power of the encryption in which the transient behaviour is eliminated, and the seed is key-dependent, $RV\_A\_H\_E_{m,2}$ and $RR\_A\_H\_E_{m,2}$ have been incorporated into a fully operational 48-bit prototype cryptosystem. Both of these been rigouously tested for a variety of tests, and these results are cataloged below. The key-to-seed specifying mechanism is exactly as explained in the above example.

The results for testing $RV\_A\_H\_E_{m,2}$ on the Calgary Corpus and Canterbury are given in Tables 10 and 11 respectively. Observe that the value of distance as computed by (14) is arbitrarily close to zero in every case. Similar results for $RR\_A\_H\_E_{m,2}$ on the Calgary Corpus and Canterbury Corpus are given in Tables 12 and 13 respectively.

Figure 21:
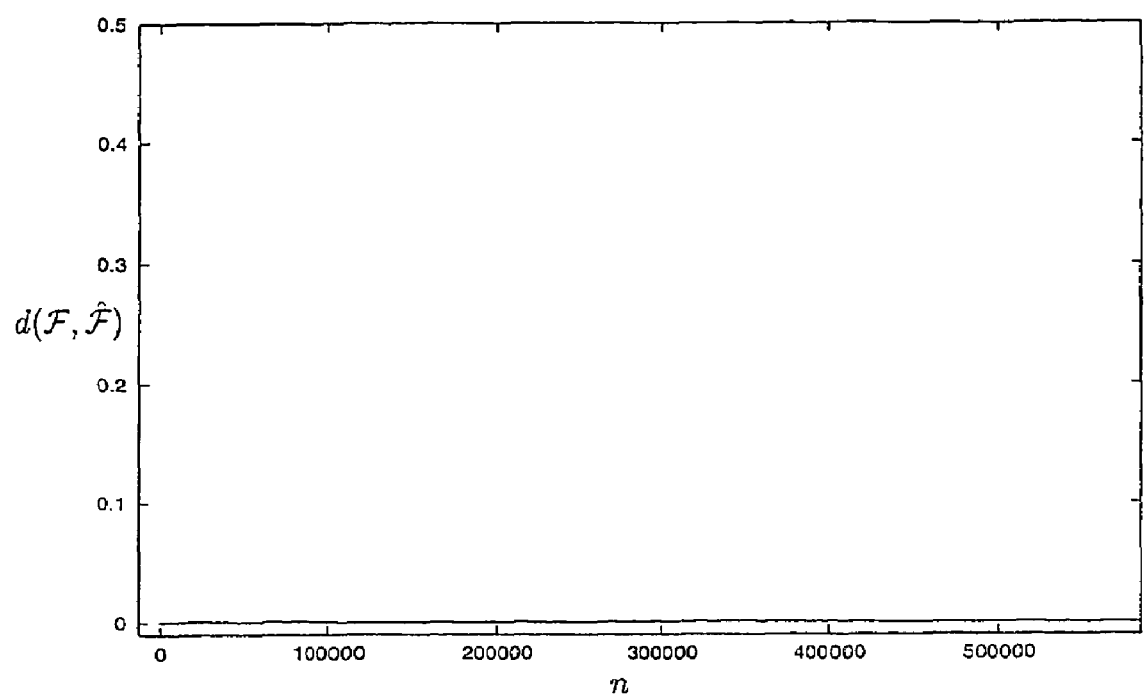
FIG. 21 graphically plots the average distance obtained after running Process $RV\_A\_H\_E_{m,2}$ on file bib from the Calgary Corpus, where f*=0.5 and Θ=2, and where the transient behavior has been eliminated.
Figure 22:
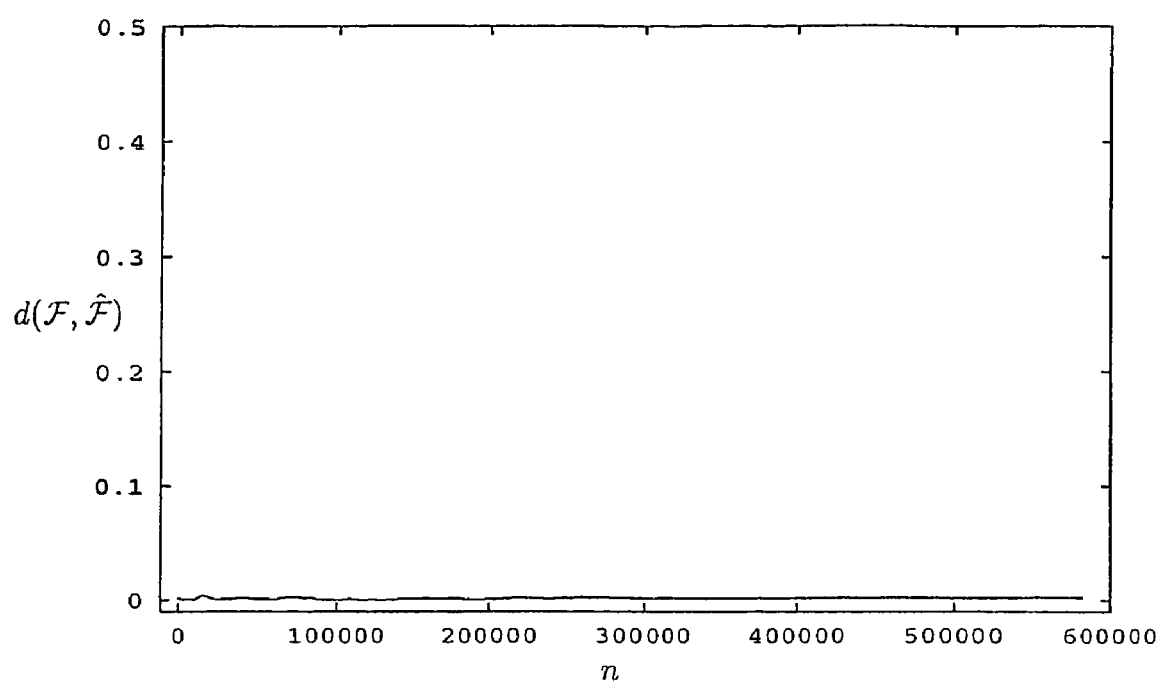
FIG. 22 graphically plots the average distance obtained after running Process $RR\_A\_H\_E_{m,2}$ on file bib from the Calgary Corpus, where f*=0.5 and Θ=2, and where the transient behavior has been eliminated.

The variation of the distance as a function of the encrypted stream has also been plotted for various files. FIG. 21 graphically plots the average distance obtained after encrypting file bib (from the Calgary Corpus) using the Process $RV\_A\_H\_E_{m,2}$ as the kernel. The similar figure in which Process $RR\_A\_H\_E_{m,2}$ is used as the kernel is found in FIG. 22. Observe that the graphs attains their terminal value close to zero right from the outset—without any transient characteristics.

TABLE 10

Empirical results obtained after encrypting files from the Calgary Corpus using the Process $RV\_A\_H\_E_{m,2}$ as the kernel. The results are also compared with the Traditional Adaptive Huffman (TAH) scheme.

| File Name | $f_{TAH}$ | $f_{ROHA}$ | $d(F, F^*)$ |
|---|---|---|---|
| bib | 0.534890885 | 0.498926052 | 1.15336E−06 |
| book1 | 0.539382961 | 0.500425219 | 1.80811E−07 |
| book2 | 0.536287453 | 0.500349415 | 1.22091E−07 |
| geo | 0.526089998 | 0.501331183 | 1.77205E−06 |
| news | 0.534758020 | 0.499712212 | 8.28219E−08 |
| obj1 | 0.527805217 | 0.4997762 | 5.00864E−08 |
| obj2 | 0.527944809 | 0.499521420 | 2.29039E−07 |
| paper1 | 0.535224321 | 0.500632728 | 4.00345E−07 |
| progc | 0.535104455 | 0.499916321 | 7.00218E−09 |
| progl | 0.535598140 | 0.499278758 | 5.20190E−07 |
| progp | 0.535403385 | 0.499946669 | 2.84420E−09 |
| trans | 0.533495837 | 0.499784304 | 4.65248E−08 |
| Average | | | 2.74079E−07 |

TABLE 11

Empirical results obtained after encrypting files from the Canterbury Corpus using the Process $RV\_A\_H\_E_{m,2}$ as the kernel. The results are also compared with the Traditional Adaptive Huffman (TAH) scheme.

| File Name | $f_{TAH}$ | $f_{ROHA}$ | $d(F, F^*)$ |
|---|---|---|---|
| alice29.txt | 0.543888521 | 0.499315030 | 4.69184E−07 |
| asyoulik.txt | 0.538374097 | 0.500483773 | 2.34036E−07 |

TABLE 11-continued

Empirical results obtained after encrypting files from the Canterbury Corpus using the Process $RV\_A\_H\_E_{m,2}$ as the kernel. The results are also compared with the Traditional Adaptive Huffman (TAH) scheme.

| File Name | $f_{TAH}$ | $f_{ROHA}$ | $d(F, F^*)$ |
|---|---|---|---|
| cp.html | 0.537992949 | 0.498694099 | 1.70538E−06 |
| fields.c | 0.534540728 | 0.501490468 | 2.22149E−06 |
| grammar.lsp | 0.537399558 | 0.505635555 | 2.22149E−06 |
| kennedy.xls | 0.535477484 | 0.500505392 | 3.17595E−05 |
| lcet10.txt | 0.538592652 | 0.499913752 | 2.55421E−07 |
| plrabn12.txt | 0.542479709 | 0.499932933 | 7.43872E−09 |
| ptt5 | 0.736702657 | 0.500238738 | 5.69958E−08 |
| xargs.1 | 0.536812041 | 0.505213528 | 2.71809E−05 |
| Average | | | 1.16081E−05 |

Output Markovian Modeling and Independence Analysis

The theoretical analysis of convergence and the empirical results discussed for $RV\_A\_H\_E_{m,2}$ were done by merely considering the probabilities of occurrence of the output symbols. The question of the dependencies of the output symbols is now studied using a Markovian analysis and a $\chi^2$ hypothesis testing analysis. To achieve this goal, the possibility of the output sequence obtained by $RV\_A\_H\_E_{m,2}$ being a higher-order Markov model is analyzed. This model, which considers conditional probabilities of a symbol given the occurrence of the k previous symbols, is called a $k^{th}$-order model.

Consider the first-order model with the following conditional probabilities,

TABLE 12

Empirical results obtained after encrypting files from the Calgary Corpus using the Process $RR\_A\_H\_E_{m,2}$ as the kernel. The results are also compared with the Traditional Adaptive Huffman (TAH) scheme.

| File Name | $f_{TAH}$ | $f_{RROHA}$ | $d(F, F^*)$ |
|---|---|---|---|
| bib | 0.534890885 | 0.498730944 | 1.61050E−06 |
| book1 | 0.539382961 | 0.499440591 | 3.1293SE−07 |
| book2 | 0.536287453 | 0.499593621 | 1.65144E−07 |
| geo | 0.526089998 | 0.500380707 | 1.44938E−07 |
| news | 0.534758020 | 0.499766932 | 5.43207E−08 |
| obj1 | 0,527805217 | 0.500416731 | 1.73665E−07 |
| obj2 | 0.527944809 | 0.499376045 | 3.89320E−07 |
| paper1 | 0.535224321 | 0.498987636 | 1.02488E−06 |
| progc | 0.535104455 | 0.500757891 | 5.74399E−07 |
| progl | 0.535598140 | 0.499958084 | 1.75695E−09 |
| progp | 0.535403385 | 0.500176402 | 3.11177E−08 |
| trans | 0.533495837 | 0.498818445 | 1.39607E−06 |
| Average | | | 3.5628E−07 |

$f_{0|0}(n)$ and $f_{1|0}(n)$ (where the latter is equal to $1-f_{0|0}(n)$), $f_{0|1}(n)$, and $f_{1|1}(n)$ (which in turn, is $1-f_{0|1}(n)$). These probabilities can also be expressed in terms of a 2×2 matrix form, the underlying transition matrix. Since the asymptotic probabilities are [0.5, 0.5], it is easy to see that this matrix has to be symmetric of the form $$\begin{bmatrix} \delta & 1-\delta \\ 1-\delta & \delta \end{bmatrix},$$

where $\delta=0.5$ is the case when there is no Markovian dependence. The value of $\delta$ is estimated from the output sequence in a straightforward manner.

In order to analyze the independence of the symbols in the output, RV_A_H_E$_{m,2}$ has been tested on files of the Calgary corpus and the

TABLE 13

Empirical results obtained after encrypting files from the Canterbury Corpus using the Process RR_A_H_E$_{m,2}$ as the kernel. The results are also compared with the Traditional Adaptive Huffman (TAH) scheme.

| File Name | f$_{TAH}$ | f$_{RROHA}$ | d(F, F*) |
|---|---|---|---|
| alice29.txt | 0.543888521 | 0.499618479 | 1.45558E−07 |
| asyoulik.txt | 0.538374097 | 0.499708422 | 8.50177E−08 |
| cp.html | 0.537992949 | 0.500003807 | 1.44932E−11 |
| fields.c | 0.534540728 | 0.502928943 | 8.57871E−06 |
| grammar.lsp | 0.537399558 | 0.499433748 | 3.20641E−07 |
| kennedy.xls | 0.535477484 | 0.499559689 | 1.93874E−07 |
| lcet10.txt | 0.538592652 | 0.499937297 | 3.93167E−09 |
| plrabn12.txt | 0.542479709 | 0.500082543 | 6.81335E−09 |
| ptt5 | 0.736702657 | 0.500392045 | 1.53699E−07 |
| xargs.1 | 0.536812041 | 0.504488168 | 2.01437E−05 |
| Average | | | 1.92746E−07 |

Canterbury corpus. The requested probability of 0 in the output is f*=0.5. The estimated probability of 0 given 0 in a file of R bits is obtained as follows:

$$\hat{f}_{0|0} = \frac{c_{0|0}(R)}{c_0(R)},$$

where $c_{0|0}(R)$ is the number of occurrences of the sequence '00' in Y, and $c_0(R)$ is the number of 0's in Y. Analogously, $\hat{f}_{1|1}$ is calculated.

Assuming that Y is a sequence of random variables, the analysis of independence in the output is done by using a Chi-square hypothesis test (see Snedecor et al. (*Statistical Methods*, Iowa State University Press, 8th edition, (1989))). The empirical results obtained from executing RV_A_H_E$_{m,2}$ on files of the Calgary corpus and the Canterbury corpus are shown in Tables 14 and 15 respectively.

TABLE 14

Results of the Chi-square test of independence in the output of the encryption that uses RV_A_H_E$_{m,2}$ as the kernel. The encryption was tested on files of the Calgary corpus with f* = 0.5.

| File name | $\frac{\hat{f}_{0|0} + \hat{f}_{1|1}}{2}$ | $\chi^2$ | Decision (98%) |
|---|---|---|---|
| bib | 0.4991533 | 0.00000726 | Indep. |
| book1 | 0.4997611 | 0.00000166 | Indep. |
| book2 | 0.4995139 | 0.00000196 | Indep. |
| geo | 0.4999662 | 0.00000096 | Indep. |
| news | 0.4992739 | 0.00000423 | Indep. |
| obj1 | 0.5008566 | 0.00000608 | Indep. |
| obj2 | 0.5005717 | 0.00000315 | Indep. |
| paper1 | 0.4995268 | 0.00000367 | Indep. |
| progc | 0.5009482 | 0.00001100 | Indep. |
| progl | 0.4977808 | 0.00005315 | Indep. |
| progp | 0.4994945 | 0.00002204 | Indep. |
| trans | 0.4999502 | 0.00000060 | Indep. |

The second column represents the average between $\hat{f}_{0|0}$ and $\hat{f}_{1|1}$ which are calculated as explained above. The third column contains the value of the Chi-square statistic for $\hat{f}_{\alpha_i|\alpha_j}$, where $\alpha_i, \alpha_j$ are either 0 or 1, and the number of degrees of freedom is unity. The last column stands for the decision of the testing based on a 98% confidence level. Observe that for all the files of the Calgary corpus and the Canterbury corpus the output random variables are independent. This implies that besides converging to the value 0.5 in the mean square sense, the output of RV_A_H_E$_{m,2}$ is also statistically independent as per the 98% confidence level.

Similar results are also available for higher-order Markovian models

TABLE 15

Results of the Chi-square test of independence in the output of the encryption that uses RV_A_H_E$_{m,2}$ as the kernel. The encryption was tested on files of the Canterbury corpus with f* = 0.5.

| File name | $\frac{\hat{f}_{0|0} + \hat{f}_{1|1}}{2}$ | $\chi^2$ | Decision (98%) |
|---|---|---|---|
| alice29.txt | 0.5001650 | 0.00000032 | Indep. |
| asyoulik.txt | 0.5004983 | 0.00001600 | Indep. |
| cp.html | 0.5008097 | 0.00001010 | Indep. |
| fields.c | 0.5018163 | 0.00001105 | Indep. |
| grammar.lsp | 0.5022818 | 0.00008135 | Indep. |
| kennedy.xls | 0.4998954 | 0.00000009 | Indep. |
| lcet10.txt | 0.5006621 | 0.00000154 | Indep. |
| plrabn12.txt | 0.4999315 | 0.00000013 | Indep. |
| ptt5 | 0.4993704 | 0.00000320 | Indep. |
| xargs.1 | 0.4915672 | 0.00057094 | Indep. | up to level five, in which the output of RV_A_H_E$_{m,2}$ proves to be also statistically independent as per the 98% confidence level.

The FIPS 140-1 Statistical Tests of Randomness of RDODE*

The results of the previous two subsections demonstrate the power of the encryptions for Statistical Perfect Secrecy (convergence to f*=0.5) and the Markovian independence. However, it is well known that a good cryptosystem must endure even most stingent statistical tests. One such suite of tests are those recommended by the standard FIPS 140-1 (see Menezes et al. (*Handbook of Applied Cryptography*, CRC Press, (1996)) pp. 181-183). These tests include the frequency test, the poker test, the runs test, and the long runs test. As suggested these tests have been run for encrypted strings of lengh 20000 bits with the corresponding statistics for passing the tests are clearly specified. The empirical results obtained after encrypting the files of the Calgary Corpus and the Canterbury Corpus using RV_A_H_E$_{m,2}$ as the kernel are cataloged in Tables 16, 17, 18, 19, 20, 21, 22, 23, 24, and 25, respectively. Notice that the encryption passes all the tests. Similar results are available for the encryption which uses RR_A_H_Em, 2 as the kernel.

TABLE 16

Results of the Monobit test in the output of the encryption that uses RV_A_H_E$_{m,2}$ as the kernel. The encryption was tested on files of the Calgary corpus.

| File name | n$_{1min}$ | <n$_1$< | n$_{1max}$ |
|---|---|---|---|
| bib | 9,654 | 10,007 | 10,646 |
| book1 | 9,654 | 9,974 | 10,646 |
| book2 | 9,654 | 9,991 | 10,646 |
| geo | 9,654 | 10,009 | 10,646 |
| news | 9,654 | 10,000 | 10,646 |
| obj1 | 9,654 | 10,053 | 10,646 |
| obj2 | 9,654 | 9,866 | 10,646 |
| paper1 | 9,654 | 9,958 | 10,646 |
| progc | 9,654 | 10,006 | 10,646 |
| progl | 9,654 | 10,072 | 10,646 |

TABLE 16-continued

Results of the Monobit test in the output of the encryption that uses $RV\_A\_H\_E_{m,2}$ as the kernel. The encryption was tested on files of the Calgary corpus.

| File name | $n_{1min}$ | $<n_1<$ | $n_{1max}$ |
|---|---|---|---|
| progp | 9,654 | 9,973 | 10,646 |
| trans | 9,654 | 10,046 | 10,646 |

TABLE 17

Results of the Monobit test in the output of the encryption that uses $RV\_A\_H\_E_{m,2}$ as the kernel. The encryption was tested on files of the Canterbury corpus.

| File name | $n_{1min}$ | $<n_1<$ | $n_{1max}$ |
|---|---|---|---|
| alice29.txt | 9,654 | 10,008 | 10,646 |
| asyoulik.txt | 9,654 | 10,029 | 10,646 |
| cp.html | 9,654 | 9,955 | 10,646 |
| fields.c | 9,654 | 9,974 | 10,646 |
| kennedy.xls | 9,654 | 9,983 | 10,646 |
| lcet10.txt | 9,654 | 10,131 | 10,646 |
| plrabn12.txt | 9,654 | 9,926 | 10,646 |
| ptt5 | 9,654 | 10,137 | 10,646 |
| sum | 9,654 | 10,046 | 10,646 |
| xargs.1 | 9,654 | 9,989 | 10,646 |

TABLE 18

Results of the Poker test (when m = 4) in the output of the encryption that uses $RV\_A\_H\_E_{m,2}$ as the kernel. The encryption was tested on files of the Calgary corpus.

| File name | $X_{3min}$ | $<X_3<$ | $X_{3max}$ |
|---|---|---|---|
| bib | 1.03 | 6.25 | 57.4 |
| book1 | 1.03 | 28.74 | 57.4 |
| book2 | 1.03 | 10.33 | 57.4 |
| geo | 1.03 | 13.50 | 57.4 |
| news | 1.03 | 18.65 | 57.4 |
| obj1 | 1.03 | 9.28 | 57.4 |
| obj2 | 1.03 | 11.00 | 57.4 |
| paper1 | 1.03 | 21.72 | 57.4 |
| progc | 1.03 | 11.15 | 57.4 |
| progl | 1.03 | 13.67 | 57.4 |
| progp | 1.03 | 7.71 | 57.4 |
| trans | 1.03 | 14.30 | 57.4 |

TABLE 19

Results of the Poker test (when m = 4) in the output of the encryption that uses $RV\_A\_H\_E_{m,2}$ as the kernel. The encryption was tested on files of the Canterbury corpus.

| File name | $X_{3min}$ | $<X_3<$ | $X_{3max}$ |
|---|---|---|---|
| alice29.txt | 1.03 | 12.34 | 57.4 |
| asyoulik.txt | 1.03 | 18.19 | 57.4 |
| cp.html | 1.03 | 8.85 | 57.4 |
| fields.c | 1.03 | 17.81 | 57.4 |
| kennedy.xls | 1.03 | 14.31 | 57.4 |
| lcet10.txt | 1.03 | 12.16 | 57.4 |
| plrabn12.txt | 1.03 | 23.69 | 57.4 |
| ptt5 | 1.03 | 11.45 | 57.4 |
| sum | 1.03 | 10.44 | 57.4 |
| xargs.1 | 1.03 | 16.25 | 57.4 |

TABLE 20

Results of the Runs test in the output of the encryption that uses $RV\_A\_H\_E_{m,2}$ as the kernel. The encryption was tested on files of the Calgary corpus.

| File name | $l_{run}$ | $B_i/G_{imin}$ | $<G_i$ | $B_i<$ | $B_i/G_{imax}$ |
|---|---|---|---|---|---|
| bib | 1 | 2,267 | 2,482 | 2,445 | 2,733 |
| | 2 | 1,079 | 1,241 | 1,214 | 1,421 |
| | 3 | 502 | 612 | 672 | 748 |
| | 4 | 223 | 293 | 327 | 402 |
| | 5 | 90 | 173 | 146 | 223 |
| | 6 | 90 | 146 | 164 | 223 |
| book1 | 1 | 2,267 | 2,540 | 2,539 | 2,733 |
| | 2 | 1,079 | 1,305 | 1,336 | 1,421 |
| | 3 | 502 | 628 | 574 | 748 |
| | 4 | 223 | 264 | 295 | 402 |
| | 5 | 90 | 138 | 150 | 223 |
| | 6 | 90 | 143 | 149 | 223 |
| book2 | 1 | 2,267 | 2,463 | 2,532 | 2,733 |
| | 2 | 1,079 | 1,266 | 1,184 | 1,421 |
| | 3 | 502 | 627 | 636 | 748 |
| | 4 | 223 | 328 | 322 | 402 |
| | 5 | 90 | 165 | 169 | 223 |
| | 6 | 90 | 170 | 170 | 223 |
| geo | 1 | 2,267 | 2,494 | 2,517 | 2,733 |
| | 2 | 1,079 | 1,226 | 1,251 | 1,421 |
| | 3 | 502 | 660 | 613 | 748 |
| | 4 | 223 | 320 | 289 | 402 |
| | 5 | 90 | 158 | 157 | 223 |
| | 6 | 90 | 152 | 161 | 223 |
| news | 1 | 2,267 | 2,532 | 2,579 | 2,733 |
| | 2 | 1,079 | 1,255 | 1,261 | 1,421 |
| | 3 | 502 | 643 | 610 | 748 |
| | 4 | 223 | 319 | 293 | 402 |
| | 5 | 90 | 156 | 138 | 223 |
| | 6 | 90 | 176 | 154 | 223 |
| obj1 | 1 | 2,267 | 2,534 | 2,510 | 2,733 |
| | 2 | 1,079 | 1,257 | 1,230 | 1,421 |
| | 3 | 502 | 620 | 637 | 748 |
| | 4 | 223 | 313 | 344 | 402 |
| | 5 | 90 | 149 | 158 | 223 |
| | 6 | 90 | 156 | 168 | 223 |

TABLE 21

Results of the Runs test in the output of the encryption that uses $RV\_A\_H\_E_{m,2}$ as the kernel. The encryption was tested on files of the Calgary corpus.

| File name | $l_{run}$ | $B_i/G_{imin}$ | $<G_i$ | $B_i<$ | $B_i/G_{imax}$ |
|---|---|---|---|---|---|
| obj2 | 1 | 2,267 | 2,406 | 2,494 | 2,733 |
| | 2 | 1,079 | 1,277 | 1,241 | 1,421 |
| | 3 | 502 | 640 | 618 | 748 |
| | 4 | 223 | 313 | 287 | 402 |
| | 5 | 90 | 143 | 164 | 223 |
| | 6 | 90 | 177 | 135 | 223 |
| paper1 | 1 | 2,267 | 2,427 | 2,476 | 2,733 |
| | 2 | 1,079 | 1,328 | 1,223 | 1,421 |
| | 3 | 502 | 560 | 611 | 748 |
| | 4 | 223 | 306 | 335 | 402 |
| | 5 | 90 | 161 | 144 | 223 |
| | 6 | 90 | 161 | 151 | 223 |
| progc | 1 | 2,267 | 2,540 | 2,516 | 2,733 |
| | 2 | 1,079 | 1,250 | 1,268 | 1,421 |
| | 3 | 502 | 604 | 618 | 748 |
| | 4 | 223 | 300 | 292 | 402 |
| | 5 | 90 | 152 | 167 | 223 |
| | 6 | 90 | 159 | 169 | 223 |
| progl | 1 | 2,267 | 2,550 | 2,494 | 2,733 |
| | 2 | 1,079 | 1,202 | 1,259 | 1,421 |
| | 3 | 502 | 660 | 586 | 748 |
| | 4 | 223 | 287 | 333 | 402 |
| | 5 | 90 | 146 | 176 | 223 |
| | 6 | 90 | 147 | 142 | 223 |

TABLE 21-continued

Results of the Runs test in the output of the encryption that uses $RV\_A\_H\_E_{m,2}$ as the kernel. The encryption was tested on files of the Calgary corpus.

| File name | $l_{run}$ | $B_i/G_{imin}$ | $<G_i$ | $B_i<$ | $B_i/G_{imax}$ |
|---|---|---|---|---|---|
| progp | 1 | 2,267 | 2,582 | 2,576 | 2,733 |
|  | 2 | 1,079 | 1,291 | 1,288 | 1,421 |
|  | 3 | 502 | 580 | 601 | 748 |
|  | 4 | 223 | 323 | 311 | 402 |
|  | 5 | 90 | 152 | 154 | 223 |
|  | 6 | 90 | 147 | 131 | 223 |
| trans | 1 | 2,267 | 2,457 | 2,462 | 2,733 |
|  | 2 | 1,079 | 1,228 | 1,245 | 1,421 |
|  | 3 | 502 | 642 | 587 | 748 |
|  | 4 | 223 | 316 | 312 | 402 |
|  | 5 | 90 | 146 | 187 | 223 |
|  | 6 | 90 | 177 | 161 | 223 |

TABLE 22

Results of the Runs test in the output of the encryption that uses $RV\_A\_H\_E_{m,2}$ as the kernel. The encryption was tested on files of the Canterbury corpus.

| File name | $l_{run}$ | $B_i/G_{imin}$ | $<G_i$ | $B_i<$ | $B_i/G_{imax}$ |
|---|---|---|---|---|---|
| alice29.txt | 1 | 2,267 | 2,529 | 2,502 | 2,733 |
|  | 2 | 1,079 | 1,238 | 1,292 | 1,421 |
|  | 3 | 502 | 632 | 631 | 748 |
|  | 4 | 223 | 319 | 308 | 402 |
|  | 5 | 90 | 173 | 155 | 223 |
|  | 6 | 90 | 158 | 170 | 223 |
| asyoulik.txt | 1 | 2,267 | 2,473 | 2,467 | 2,733 |
|  | 2 | 1,079 | 1,243 | 1,268 | 1,421 |
|  | 3 | 502 | 617 | 609 | 748 |
|  | 4 | 223 | 332 | 296 | 402 |
|  | 5 | 90 | 146 | 151 | 223 |
|  | 6 | 90 | 149 | 151 | 223 |
| cp.html | 1 | 2,267 | 2,579 | 2,604 | 2,733 |
|  | 2 | 1,079 | 1,291 | 1,266 | 1,421 |
|  | 3 | 502 | 596 | 644 | 748 |
|  | 4 | 223 | 294 | 274 | 402 |
|  | 5 | 90 | 155 | 146 | 223 |
|  | 6 | 90 | 147 | 133 | 223 |
| fields.c | 1 | 2,267 | 2,542 | 2,593 | 2,733 |
|  | 2 | 1,079 | 1,314 | 1,232 | 1,421 |
|  | 3 | 502 | 588 | 621 | 748 |
|  | 4 | 223 | 307 | 311 | 402 |
|  | 5 | 90 | 161 | 170 | 223 |
|  | 6 | 90 | 161 | 162 | 223 |
| kennedy.xls | 1 | 2,267 | 2,532 | 2,559 | 2,733 |
|  | 2 | 1,079 | 1,259 | 1,212 | 1,421 |
|  | 3 | 502 | 626 | 624 | 748 |
|  | 4 | 223 | 294 | 351 | 402 |
|  | 5 | 90 | 174 | 144 | 223 |
|  | 6 | 90 | 177 | 169 | 223 |

TABLE 23

Results of the Runs test in the output of the encryption that uses $RV\_A\_H\_E_{m,2}$ as the kernel. The encryption was tested on files of the Canterbury corpus.

| File name | $l_{run}$ | $B_i/G_{imin}$ | $<G_i$ | $B_i<$ | $B_i/G_{imax}$ |
|---|---|---|---|---|---|
| lcet10.txt | 1 | 2,267 | 2,513 | 2,443 | 2,733 |
|  | 2 | 1,079 | 1,196 | 1,224 | 1,421 |
|  | 3 | 502 | 635 | 610 | 748 |
|  | 4 | 223 | 314 | 340 | 402 |
|  | 5 | 90 | 136 | 157 | 223 |
|  | 6 | 90 | 170 | 132 | 223 |
| plrabn12.txt | 1 | 2,267 | 2,467 | 2,526 | 2,733 |
|  | 2 | 1,079 | 1,294 | 1,261 | 1,421 |
|  | 3 | 502 | 601 | 619 | 748 |
|  | 4 | 223 | 316 | 296 | 402 |
|  | 5 | 90 | 161 | 140 | 223 |
|  | 6 | 90 | 170 | 150 | 223 |
| ptt5 | 1 | 2,267 | 2,513 | 2,468 | 2,733 |
|  | 2 | 1,079 | 1,239 | 1,230 | 1,421 |
|  | 3 | 502 | 653 | 619 | 748 |
|  | 4 | 223 | 281 | 331 | 402 |
|  | 5 | 90 | 148 | 172 | 223 |
|  | 6 | 90 | 155 | 145 | 223 |
| sum | 1 | 2,267 | 2,589 | 2,522 | 2,733 |
|  | 2 | 1,079 | 1,257 | 1,286 | 1,421 |
|  | 3 | 502 | 586 | 626 | 748 |
|  | 4 | 223 | 298 | 308 | 402 |
|  | 5 | 90 | 150 | 149 | 223 |
|  | 6 | 90 | 159 | 158 | 223 |
| xargs.1 | 1 | 2,267 | 2,502 | 2,508 | 2,733 |
|  | 2 | 1,079 | 1,241 | 1,264 | 1,421 |
|  | 3 | 502 | 654 | 629 | 748 |
|  | 4 | 223 | 301 | 304 | 402 |
|  | 5 | 90 | 152 | 149 | 223 |
|  | 6 | 90 | 159 | 153 | 223 |

TABLE 24

Results of the Long Runs test in the output of the encryption that uses $RV\_A\_H\_E_{m,2}$ as the kernel. The encryption was tested on files of the Calgary corpus.

| File name | Max. run length | Runs ≥ 34 |
|---|---|---|
| bib | 13 | 0 |
| book1 | 12 | 0 |
| book2 | 14 | 0 |
| geo | 14 | 0 |
| news | 16 | 0 |
| obj1 | 14 | 0 |
| obj2 | 13 | 0 |
| paper1 | 15 | 0 |
| progc | 17 | 0 |
| progl | 16 | 0 |
| progp | 17 | 0 |
| trans | 14 | 0 |

TABLE 25

Results of the Long Runs test in the output of the encryption that uses $RV\_A\_H\_E_{m,2}$ as the kernel. The encryption was tested on files of the Canterbury corpus.

| File name | Max. run length | Runs ≥ 34 |
|---|---|---|
| alice29.txt | 15 | 0 |
| asyoulik.txt | 16 | 0 |
| cp.html | 13 | 0 |
| fields.c | 17 | 0 |
| kennedy.xls | 14 | 0 |
| lcet10.txt | 17 | 0 |
| plrabn12.txt | 14 | 0 |
| ptt5 | 14 | 0 |
| sum | 13 | 0 |
| xargs.1 | 15 | 0 |

Statistical Tests of Key-Input-Output Dependency

Apart from the FIPS 140-1 tests described above, the encryption which uses $RV\_A\_H\_E_{m,2}$ has also been rigorously tested to see how encrypted output varies with the keys and the input. In particular, the probability of observing changes in the output when the key changes by a single bit has been computed. This is tabulated in Table 26. Observe that as desired, the value is close to 0.5 for all the files of the Calgary Corpus. Similarly, the probability of changing subsequent output bits after a given input symbol has been changed by one bit has also been computed. This value is also close to the desired value of 0.5 in almost all files. The results are tabulated in Table 27. Similar results are available for files of the Canterbury Corpus also.

TABLE 26

Statistical independence test between the key and the output performed by modifying the key in one single bit on files of the Calgary corpus. $\hat{p}$ is the estimated prob. of change.

| File name | $\hat{p}$ |
|---|---|
| bib | 0.499610 |
| book1 | 0.499955 |
| book2 | 0.500052 |
| geo | 0.499907 |
| news | 0.499842 |
| obj1 | 0.499463 |
| obj2 | 0.500309 |
| paper1 | 0.500962 |
| progc | 0.498403 |
| progl | 0.500092 |
| progp | 0.499961 |
| trans | 0.499244 |

TABLE 27

Statistical independence test between the input and the output performed by modifying one single bit in the input on files of the Calgary corpus. $\hat{p}$ is the estimated prob. of change.

| File name | $\hat{p}$ |
|---|---|
| bib | 0.492451 |
| book1 | 0.467442 |
| book2 | 0.501907 |
| geo | 0.500798 |
| news | 0.500089 |
| obj1 | 0.477444 |
| obj2 | 0.496427 |
| paper1 | 0.481311 |
| progc | 0.484270 |
| progl | 0.471639 |
| progp | 0.490529 |
| trans | 0.491802 |

Applications of DDODE and RDODE

With regard to applications, both DDODE and RDODE (and their respective instantiations) can be used as compressions/encodings in their own right. They can thus be used in both data transmission, data storage and in the recording of data in magnetic media. However, the major applications are those that arise from their cryptographic capabilities and include:

Traffic on the internet

E-commerce/e-banking

E-mail

Video conferencing

Secure wired or wireless communications

Network security. To clarify this, let us assume that the files stored in a network are saved using one of the schemes advocated by this invention. In such a case, even if a hacker succeeds in breaking the firewall and enters the system, he will not be able to "read" the files he accesses, because they will effectively be stored as random noise. The advantages of this are invaluable.

Appart from the above, the application of DDODE and RDODE in steganography is emphasized.

Steganography is the ancient art of hiding information, which dates back from around 440 B.C (see Katzenbeisser et al. (*Information Hiding Techniques for Steganography and Digital Watermarking*, Artech House, (2000))). One of the most common steganographic techniques consists of hiding information in images. To experimentally demonstrate the power of $RV\_A\_H\_E_{m,2}$, the latter has been incorporated into a steganographic application by modifying 256-gray scale images with the output of RDODE*. By virtue of the Statistical Perfect Secrecy property of $RV\_A\_H\_E_{m,2}$, its use in steganography is unique.

Rather than use a sophisticated scheme, to demonstrate a prima-facie case, the Least Significant Bit (LSB) substitution approach for image "carriers" has been used. This technique consists of replacing the least significant bit of the $j_k^{th}$ pixel (or, to be more specific, the byte that represents it) by the $k^{th}$ bit of the output sequence. The set of indices, $\{j_1, \ldots, j_R\}$, where R is the size of the output ($R \leq |I|$, and $|I|$ is the size of the carrier image), can be chosen in various ways, including the, so called, pseudo-random permutations. Details of this techniques can be found in Katzenbeisser et al. (*Information Hiding Techniques for Steganography and Digital Watermarking*, Artech House, (2000)).

Figure 23:
FIG. 23 displays the original carrier image, the well-known Lena, image, and the resulting image after applying steganographic techniques to the output of the file fields.c from the Canterbury corpus. The steganographic method used is a fairly simplistic one, but includes the message encrypted as per Process $RV\_A\_H\_E_{m,2}$.
Figure 23:

Although this is a fairly simplistic approach to applying $RV\_A\_H\_E_{m,2}$ in steganography, it has been deliberately used so as to demonstrate its power. An example will clarify the issue. In an experimental prototype, the well known "Lena" image has been used as the carrier file, which carries the output of $RV\_A\_H\_E_{2,2}$. The original Lena image and the image resulting from embedding the output obtained from encrypting the file fields.c of the Canterbury corpus are shown in FIG. 23. Apart from the two images being visually similar, their respective histograms pass the similarity test with a very high level of confidence. Such results are typical.

Observe that once the output of $RV\_A\_H\_E_{m,2}$ has been obtained, it can be easily embedded in the carrier by the most sophisticated steganography tools (see *Information Hiding Techniques for Steganography and Digital Watermarking*, Artech House, (2000)) currently available, and need not be embedded by the simplistic LSB pseudo-random permutation scheme described above.

The present invention has been described herein with regard to preferred embodiments. However, it will be obvious to persons skilled in the art that a number of variations and modifications can be made without departing from the scope of the invention as described herein.

REFERENCES

[1] R. Arnold and T. Bell. A Corpus for the Evaluation of Lossless Compression Algorithms. *Proceedings of the IEEE Data Compression Conference* pages 201-210, Los Alamitos, Calif., 1997. IEEE Computer Society Press.

[2] R. Gallager. Variations on a Theme by Huffman. *IEEE Transactions on Information Theory*, 24(6):668-674, 1978.

[3] D. Hankerson, G. Harris, and P. Johnson Jr. *Introduction to Information Theory and Data Compression*. CRC Press, 1998.

[4] D. A. Huffman. A Method for the Construction of Minimum Redundancy Codes. *Proceedings of IRE*, 40(9):1098-1101, 1952.

[5] D. Knuth. Dynamic Huffman Coding. *Journal of Algorithms*, 6:163-180, 1985.

[6] S. Lakshmivarahan. *Learning Algorithms Theory and Applications*. Springer-Verlag, New York, 1981.

[7] A. Menezes, P. van Oorschot, and S. Vanstone. *Handbook of Applied Cryptography*. CRC Press, 1996.

[8] K. Narendra and M. Thathachar. *Learning Automata. An Introduction*. Prentice Hall, 1989.

[9] K. Sayood. *Introduction to Data Compression*. Morgan Kaufmann, 2nd. edition, 2000.

[10] G. Snedecor and W. Cochran. *Statitical Methods*. Iowa State University Press, 8th edition, 1989.

[11] C. E. Shannon. Communication Theory of Secrecy Systems. *Bell System Technical Journal*, 28:656-715, 1949.

[12] W. Stallings. *Cryptography & Network Security: Principles & Practice*. Prentice Hall, 1998.

[13] D. R. Stinson. *Cryptography: Theory and Practice*. CRC Press, 1995.

[14] I. Witten, A. Moffat, and T. Bell. *Managing Gigabytes: Compressing and Indexing Documents and Images*. Morgan Kaufmann, 2nd. edition, 1999.

[15] S. Katzenbeisser and F. Peticolas. *Information Hiding Techniques for Steganography and Digital Watermarking*. Artech House, 2000.

[16] J. Vitter. Design and Analysis of Dynamic Huffman Codes. *Journal of the ACM*, 34(4):825-845, 1987.

Appendix A

Formal Statement of the DODE Open Problem

Assume that a code alphabet $A=\{a_1, \ldots, a_r\}$ is given, and that the user specifies the desired output probabilities (or frequencies) of each $a_j \in A$ in the compressed file by $F^*=\{f^*_1, \ldots, f^*_r\}$. Such a rendering will be called an "entropy optimal" rendering. On the other hand, the user also simultaneously requires optimal, or even sub-optimal lossless data compression. Thus, if the decompression process is invoked on a compressed a file, the file recovered must be exactly the same as the original uncompressed file.

As stated in Hankerson et al. (*Introduction to Information Theory and Data Compression*, CRC Press, (1998) pp.75-79), the Distribution Optimizing Data Compression (DODC) problem[7] can be more formally written as follows:

Problem 1. Consider the source alphabet, $S=\{s_1, \ldots, s_m\}$, with probabilities of occurrence, $P=[p_1, \ldots, p_m]$, where the input sequence is $X=x[1] \ldots x[M]$, the code alphabet, $A=\{a_1, \ldots, a_r\}$, and the optimal frequencies, $F^*=\{f^*_1, \ldots, f^*_r\}$, of each $a_j$, $j=1, \ldots r$, required in the output sequence. The output is to be a sequence, $Y=y[1] \ldots y[R]$, whose probabilities are $F=\{f_1, \ldots f_r\}$, generated by the encoding scheme $\phi$: $S \rightarrow C=\{w_1, \ldots, w_m\}$, where $l_i$ is the length of $w_i$, such that:

[7]In general, outside the context of compression, this problem is referred to as the Distribution Optimizing Data Encoding (DODE) problem.

(i) C is prefix, (ii) the average code word length of $\phi$, $$\bar{l} = \sum_{i=1}^{m} p_i l_i, \qquad (13)$$

is minimal, and (iii) the distance $$d(\mathcal{F}, \mathcal{F}^*) = \sum_{j=1}^{r} |f_j - f^*_j|^\Theta \qquad (14)$$

is minimal, where $\Theta \geq 1$ is a real number.

The Distribution Optimization Data Compression (DODC) problem involves developing an encoding scheme in which $d(F, F^*)$ is arbitrarily close to zero.

Given the source alphabet, the probabilities of occurrence of the source symbols, and the encoding scheme, each $f_j$ can be calculated without is encoding X, as stated in the following formula for $j=1, \ldots, r$:

$$f_j = \frac{\sum_{i=1}^{m} u_{ji} p_i}{\sum_{i=1}^{m} p_i l_i} = \bar{l}^{-1} \sum_{i=1}^{m} u_{ji} p_i, \qquad (15)$$

where $a_j$ occurs $u_{ji}$ times in $w_i$, for $i=1, \ldots, m$ and $j=1, \ldots, r$.

It is interesting to note that the problem is intrinsically difficult because the data compression requirements and the output probability requirements can be contradictory. Informally speaking, if the occurrence of '0' is significantly lower than the occurrence of '1' in the uncompressed file, designing a data compression method which compresses the file and which simultaneously increases the proportion of '0's to '1's is far from trivial.

The importance of the problem is reflected in the following paragraph as originally stated in Hankerson et al. (*Introduction to Information Theory and Data Compression*, CRC Press, (1998)):

"It would be nice to have a slick algorithm to solve Problem 1, especially in the case r=2, when the output will not vary with different definitions of d(F, F*). Also, the case r=2 is distinguished by the fact that binary channels are in widespread use in the real world.

We have no such algorithm! Perhaps someone reading this will supply one some day . . . "

Appendix B

Proof of Theorems

Theorem 1 (Convergence of Process $D\_S\_H\_E_{2,2}$). Consider a stationary, memoryless source with alphabet $S=\{0,1\}$, whose probabilities are $P=[p, 1-p]$, where $p \geq 0.5$, and the code alphabet, $A=\{0, 1\}$. If the source sequence $X=x[1], \ldots, x[n], \ldots$, with $x[i] \in S$, $i=1, \ldots, n, \ldots$, is encoded using the Process $D\_S\_H\_E_{2,2}$ so as to yield the output sequence $Y=y[1], \ldots, y[n], \ldots$, such that $y[i] \in A$, $i=1, \ldots, n, \ldots$, then $$\lim_{n \to \infty} Pr[\hat{f}(n) = f^*] = 1, \qquad (16)$$

where f* is the requested probability of 0 in the output ($1-p \leq f^* \leq p$), and $$\hat{f}(n) = \frac{c_0(n)}{n}$$

with $c_0(n)$ being the number of 0's encoded up to time n.

Proof. By following the sequence of operations executed by the Process $D\_S\_H\_E_{2,2}$, and using the fact that the most likely symbol of S is 0, $y[n+1]$ is encoded as follows:

$$y[n+1] = \begin{cases} 0 & \text{if } x[n+1] = 0 \text{ and } f(n) \leq \hat{f} \text{ or} \\ & x[n+1] = 1 \text{ and } f(n) > \hat{f} \\ 1 & \text{if } x[n+1] = 0 \text{ and } f(n) > \hat{f} \text{ or} \\ & x[n+1] = 1 \text{ and } f(n) \leq \hat{f}, \end{cases} \quad (17)$$

where $\hat{f}(n)$ is the estimated probability of 0 in the output, obtained as the ratio between the number of 0's in the output and n as follows:

$$\hat{f}(n) = \frac{c_0(n)}{n}.$$

For ease of notation, let $\hat{f}(n+1)|_{\hat{f}(n)}$ denote the conditional probability $Pr[y[n+1]=0|\hat{f}(n)]$, which is, indeed, the probability of obtaining 0 in the output at time n+1 given $\hat{f}(n)$. Using (17) and the fact that $\hat{f}(n)$ is given, $\hat{f}(n+1)|_{\hat{f}(n)}$ is calculated as follows:

$$\hat{f}(n+1)|_{\hat{f}(n)} = \begin{cases} \frac{c_0(n)+1}{n+1} & \text{if } x[n+1] = 0 \text{ and } \hat{f}(n) \leq f^* \text{ or} \\ & x[n+1] = 1 \text{ and } \hat{f}(n) > f^* \\ \frac{c_0(n)}{n+1} & \text{if } x[n+1] = 0 \text{ and } \hat{f}(n) > f^* \text{ or} \\ & x[n+1] = 1 \text{ and } \hat{f}(n) \leq f^*, \end{cases} \quad (18)$$

where $c_0(n)$ is the number of 0's in the output at time n.
Since $$\hat{f}(n) = \frac{c_0(n)}{n},$$

it implies that $c_0(n) = n\hat{f}(n)$. Hence, (18) can be re-written as follows:

$$\hat{f}(n+1)|_{\hat{f}(n)} = \begin{cases} \frac{n\hat{f}(n)+1}{n+1} & \text{if } x[n+1]=0 \text{ and } \hat{f}(n) \leq f^* \text{ or} & (a) \\ & x[n+1]=1 \text{ and } \hat{f}(n) > f^* & (b) \\ \frac{n\hat{f}(n)}{n+1} & \text{if } x[n+1]=0 \text{ and } \hat{f}(n) > f^* \text{ or} & (c) \\ & x[n+1]=1 \text{ and } \hat{f}(n) \leq f^*. & (d) \end{cases} \quad (19)$$

Since (16) has to be satisfied, the behavior of (19) is analyzed for an arbitrarily large value of n. To be more specific, the analysis consists of considering the convergence of $\hat{f}(n+1)|_{\hat{f}(n)}$ as $n \rightarrow \infty$. This is accomplished by considering three mutually exclusive and exhaustive cases for $\hat{f}(n)$.

The first one, deals with the situation in which $\hat{f}(n)=f^*$. As $n \rightarrow \infty$, it is shown that $f^*$ is a fixed point. That is, $\hat{f}(n+1)|_{\hat{f}(n)=f^*}$ is increased by an increment whose limit (for $n \rightarrow \infty$) is 0, and hence $\hat{f}(n+1)|_{\hat{f}(n)=f^*}$ will stay at a fixed point, $f^*$.

The second case considers the scenario when $\hat{f}(n)<f^*$. The Process $D\_S\_H\_E_{2,2}$ increments $\hat{f}(n+1)|_{\hat{f}(n)<f^*}$ with a value proportional to the difference $p-\hat{f}(n)$, causing $\hat{f}(n)$ to rapidly converge towards $f^*$ in the direction of p. As it approaches p from $\hat{f}(n)$, it has to necessarily cross the value $f^*$, since $\hat{f}(n)<f^*$. It will be shown that this is done in a finite number of steps, k, for which $\hat{f}(n+k)|_{\hat{f}(n)<f^*} \geq f^*$.

On the other hand, when $\hat{f}(n)>f^*$, $\hat{f}(n+1)|_{\hat{f}(n)>f^*}$ decreases. This decrement is by an amount proportional to the difference $\hat{f}(n)-(1-p)$. This, in turn, causes $\hat{f}(n)$ to rapidly converge towards $1-p$, and as before, it intersects the value $f^*$.

While the above quantities are proportional to $p-\hat{f}(n)$ and ($\hat{f}(n)-(1-p)$), respectively, it will be shown that they are both inversely proportional to n+1.

These two convergence phenomena, namely those of the second and third cases, cause $\hat{f}(n+1)|_{\hat{f}(n)}$ to become increasingly closer to $f^*$ as n is large, until ultimately $\hat{f}(n)$ is arbitrarily close to $f^*$, whence the fixed point result of the first case forces $\hat{f}(n)$ to remain arbitrarily close to $f^*$.

Observe that the combination of the convergence properties of the three cases yields a strong convergence result, namely convergence with probability one. The formal analysis for the three cases follows.

(i) $\hat{f}(n)=f^*$.

The analysis of the asymptotic property of the probability of $y[n+1]=0$ given $\hat{f}(n)=f^*$ is required. In this case, this is calculated using (19.(a)) and (19.(d)), and the fact that $Pr[x[n+1]=0]=p$, as follows:

$$\hat{f}(n+1)|_{\hat{f}(n)=f^*} = \frac{n\hat{f}(n)+1}{n+1}p + \frac{n\hat{f}(n)}{n+1}(1-p) \quad (20)$$

$$= \frac{n\hat{f}(n)+p}{n+1}$$

$$= \frac{n\hat{f}(n)+\hat{f}(n)}{n+1} + \frac{p-\hat{f}(n)}{n+1}$$

$$= \hat{f}(n) + \frac{p-\hat{f}(n)}{n+1}$$

Since, in this case, $\hat{f}(n)=f^*$, (20) results in:

$$\hat{f}(n+1)|_{\hat{f}(n)=f^*} = f^* + \frac{p-f^*}{n+1}. \quad (21)$$

This implies that $\hat{f}(n+1)|_{\hat{f}(n)=f^*} \rightarrow f^*$, as $n \rightarrow \infty$ and $f^*$ is a fixed point. Therefore, the following is true:

$$\lim_{n \rightarrow \infty} Pr[\hat{f}(n+1)|_{\hat{f}(n)=f^*} = f^*] = 1. \quad (22)$$

Equation (22) is a very strong statement, since it implies that, as n→∞, once f̂(n) arrives at f*, it stays at f* with probability one.

(ii) f̂(n)<f*.

In this case, the conditional probability of y[n+1]=0 given f̂(n)<f*, is calculated using (20) as follows:

$$\hat{f}(n+1)\big|_{\hat{f}(n)<f^*} = \hat{f}(n) + \frac{p - \hat{f}(n)}{n+1}. \quad (23)$$

Since f̂(n)<f* and f*≦p, by our hypothesis, it is clear that f̂(n)<p. Hence:

$$\hat{f}(n+1)\big|_{\hat{f}(n)<f^*} = \hat{f}(n) + \Delta, \quad (24)$$

where $$\Delta = \frac{p - \hat{f}(n)}{n+1} > 0$$

for all finite values of n.

Prior to analyzing the number of steps, k, required to ensure that f̂(n+k)|_{f̂(n)<f*} becomes greater than or equal to f*, a closed-form expression for f̂(n+k)|_{f̂(n)<f*} is first derived. Since (23) determines f̂(n+1)|_{f̂(n)<f*}, it will be shown below that f̂(n+k)|_{f̂(n)<f*} can be calculated as follows:

$$\hat{f}(n+k)\big|_{\hat{f}(n)<f^*} = \hat{f}(n) + \frac{k[p - \hat{f}(n)]}{n+k}. \quad (25)$$

Equation (25) is proven by induction on k.

Basis step: Clearly, (25) is satisfied for k=1 by the fact that (23) is true.

Inductive hypothesis: Suppose that (25) is satisfied for any j>1. That is:

$$\hat{f}(n+j)\big|_{\hat{f}(n)<f^*} = \hat{f}(n) + \frac{j[p - \hat{f}(n)]}{n+j}. \quad (26)$$

Inductive step: It is required to prove that (25) is true for j+1. Substituting n for n+j in (23):

$$\hat{f}(n+j+1)\big|_{\hat{f}(n)<f^*} = \hat{f}(n+j) + \frac{p - \hat{f}(n+j)}{n+j+1}. \quad (27)$$

Using the inductive hypothesis, (26), (27) can be rewritten as follows:

$$\hat{f}(n+j+1)\big|_{\hat{f}(n)<f^*} = \hat{f}(n) + \frac{j[p-\hat{f}(n)]}{n+j} + \quad (28)$$

$$\frac{p - \left[\hat{f}(n) + \frac{j[p-\hat{f}(n)]}{n+j}\right]}{n+j+1}$$

$$= \hat{f}(n) + \frac{jp}{n+j} - \frac{j\hat{f}(n)}{n+j} +$$

$$\frac{p}{n+j+1} - \frac{\hat{f}(n)}{n+j+1} -$$

$$\frac{jp}{(n+j)(n+j+1)} + \frac{j\hat{f}(n)}{(n+j)(n+j+1)}$$

$$= \hat{f}(n) + \frac{njp + j^2 p + (n+j)p}{(n+j)(n+j+1)} -$$

$$\frac{nj\hat{f}(n) + j^2\hat{f}(n) + (n+j)\hat{f}(n)}{(n+j)(n+j+1)}$$

$$= \hat{f}(n) + \frac{jp+p}{n+j+1} - \frac{j\hat{f}(n) + \hat{f}(n)}{n+j+1}$$

$$= \hat{f}(n) + \frac{(j+1)[p - \hat{f}(n)]}{n+j+1}. \quad (29)$$

Hence, (25) is satisfied for all k≧1.

On analyzing the conditions for k so that f̂(n+k)|_{f̂(n)<f*}≧f*, it is seen that the following must be true:

$$\hat{f}(n) + \frac{k[p - \hat{f}(n)]}{n+k} \geq f^*. \quad (30)$$

Subtracting f̂(n) from both sides:

$$\frac{k[p - \hat{f}(n)]}{n+k} \geq f^* - \hat{f}(n). \quad (31)$$

Multiplying both sides by $$\frac{n+k}{k} > 0$$

and dividing by f*−f̂(n)>0, (31) results in:

$$\frac{p - \hat{f}(n)}{f^* - \hat{f}(n)} \geq \frac{n+k}{k} = \frac{n}{k} + 1. \quad (32)$$

Solving for k yields:

$$k \geq \frac{n}{\frac{p - \hat{f}(n)}{f^* - \hat{f}(n)} - 1}. \quad (33)$$

Hence, for a finite n, after k steps (k finite), (30) is satisfied with probability one. More formally, $$Pr[\hat{f}(n+k)|_{\hat{f}(n)<f^*} \geq f^*] = 1, \; k<\infty. \quad (34)$$

Observe that the convergence implied by (34) is very strong. It implies that f̂(n+k)|_{f̂(n)<f*} will be above (or equal to) f* in a finite number of steps, k, with probability one. Moreover, since the increment is inversely proportional to n+1, f̂(n) converges quickly towards f* for small values of n, and will stay arbitrarily close to f*, as n→∞ with probability one.

Since f̂(n+k)|_{f̂(n)<f*} will sooner or later exceed f*, the discussion of this case is concluded by noting that when f̂(n+k)|_{f̂(n)<f*}>f*, the quantity f̂(n+k+1)|_{f̂(n)<f*} has to be calculated in a different way since the hypothesis of Case (ii) is violated. Indeed, in this scenario, the hypothesis of Case (iii) is satisfied, and the following analysis comes into effect. Finally, if f̂(n+k)|_{f̂(n)<f*}=f*, the quantity f̂(n+k+1)|_{f̂(n)<f*} is calculated using (21) as in Case (i), converging to the fixed point, f*, as n→∞.

(iii) f(n)>f*

In this case, the conditional probability of y[n+1]=0 given f(n)>f*, is calculated using (19.(b)) and (19.(c)), and the fact that Pr[x[n+1]=0]=p, as follows:

$$f(n+1)|_{\hat{f}(n)>f^*} = \frac{n\hat{f}(n)+1}{n+1}(1-p) + \frac{n\hat{f}(n)}{n+1}p \qquad (35)$$

$$= \frac{n\hat{f}(n)+1-p}{n+1}$$

$$= \frac{n\hat{f}(n)+\hat{f}(n)}{n+1} + \frac{(1-p)-\hat{f}(n)}{n+1}$$

$$= \hat{f}(n) - \frac{\hat{f}(n)-(1-p)}{n+1}$$

Since f(n)>f* and f*≧1−p, it means that f(n)>1−p, which implies that f(n)−(1−p)>0. Thus:

$$f(n+1)|_{\hat{f}(n)>f^*} = f(n) - \Delta, \qquad (36)$$

where $$\Delta = \frac{\hat{f}(n)-(1-p)}{n+1} > 0$$

for n finite. Hence, as n grows, f(n) decreases by a positive value, Δ.

A closed-form expression for $f(n+k)|_{\hat{f}(n)>f^*}$ is now derived. Indeed, it is shown by induction that if $f(n+1)|_{\hat{f}(n)>f^*}$ is calculated as in (35), $f(n+k)|_{\hat{f}(n)>f^*}$ can be calculated as follows (k≧1):

$$f(n+k)|_{\hat{f}(n)>f^*} = \hat{f}(n) - \frac{k[\hat{f}(n)-(1-p)]}{n+k}. \qquad (37)$$

Basis step: Equation (37) is clearly satisfied, by virtue of the fact that (35) holds. Hence the basis step.

Inductive hypothesis: Assume that (37) is true for j>1. That is:

$$f(n+j)|_{\hat{f}(n)>f^*} = \hat{f}(n) - \frac{j[\hat{f}(n)-(1-p)]}{n+j}. \qquad (38)$$

Inductive step: It is shown that (37) is satisfied for j+1. Substituting n for n+j in (35) results in:

$$f(n+j+1)|_{\hat{f}(n)>f^*} = f(n+j) - \frac{f(n+j)-(1-p)}{n+j+1}. \qquad (39)$$

Using the inductive hypothesis, (38), (39) can be rewritten as follows[8]:

[8]The algebra for this case mirrors the algebra of Case (ii). It is not identical, though, since p and 1−p interchange places, and the sign for f(n) changes from being positive to negative in various places. The proof is included in the interest of completeness.

$$f(n+j+1)|_{\hat{f}(n)>f^*} = \hat{f}(n) - \frac{j[\hat{f}(n)-(1-p)]}{n+j} - \qquad (40)$$

$$\frac{\hat{f}(n) - \frac{j[\hat{f}(n)-(1-p)]}{n+j} - (1-p)}{n+j+1}$$

$$= \hat{f}(n) - \frac{j\hat{f}(n)}{n+j} + \frac{j(1-p)}{n+j} -$$

$$\frac{\hat{f}(n)}{n+j+1} + \frac{(1-p)}{n+j+1} +$$

$$\frac{j\hat{f}(n)}{(n+j)(n+j+1)} - \frac{j(1-p)}{(n+j)(n+j+1)}$$

$$= \hat{f}(n) - \frac{nj\hat{f}(n)+j^2\hat{f}(n)+(n+j)\hat{f}(n)}{(n+j)(n+j+1)} +$$

$$\frac{nj(1-p)+j^2(1-p)+(n+j)(1-p)}{(n+j)(n+j+1)}$$

$$= \hat{f}(n) - \frac{j\hat{f}(n)+\hat{f}(n)}{n+j+1} +$$

$$\frac{j(1-p)+(1-p)}{n+j+1}$$

$$= \hat{f}(n) - \frac{(j+1)[\hat{f}(n)-(1-p)]}{n+j+1}. \qquad (41)$$

Therefore, (37) is satisfied for all k≧1.

Observe now that f(n) monotonically decreases till it crosses f*.

To satisfy $f(n+k)|_{\hat{f}(n)>f^*} \leq f^*$, the following must be true:

$$\hat{f}(n) - \frac{k[\hat{f}(n)-(1-p)]}{n+k} \leq f^*. \qquad (42)$$

Subtracting f(n), and reversing the inequality, yields:

$$\hat{f}(n) - f^* \leq \frac{k}{n+k}[\hat{f}(n)-(1-p)]. \qquad (43)$$

Multiplying both sides by $$\frac{n+k}{k} > 0$$

and dividing by f(n)−f*>0, (43) results in:

$$\frac{\hat{f}(n)-(1-p)}{\hat{f}(n)-f^*} \geq \frac{n+k}{k} = \frac{n}{k} + 1. \qquad (44)$$

As before, solving for k, yields:

$$k \geq \frac{n}{\frac{\hat{f}(n)-(1-p)}{\hat{f}(n)-f^*} - 1}. \qquad (45)$$

Thus, for a finite n, after k steps (k finite), (42) is satisfied with probability one. That is:

$$Pr[\hat{f}(n+k)|_{\hat{f}(n)>f^*} \leq f^*] = 1. \quad (46)$$

As in the case of (34), equation (46) represents a strong convergence result. It implies that, starting from $\hat{f}(n)>f^*$, $\hat{f}(n+k)|_{\hat{f}(n)>f^*}$ will be below (or equal to) $f^*$ in a finite number of steps, k, with probability one. Moreover, since the decrement is inversely proportional to n+1, $\hat{f}(n)$ converges quickly towards $f^*$ for small values of n, and will stay arbitrarily close to $f^*$, as n→∞ with probability one.

Since $\hat{f}(n+k)|_{\hat{f}(n)>f^*}$ will sooner or later become less than or equal to $f^*$, this case is terminated by noting that when $\hat{f}(n+k)|_{\hat{f}(n)>f^*}<f^*$, the quantity $\hat{f}(n+k+1)|_{\hat{f}(n)>f^*}$ has to be calculated in a different way since the hypothesis of Case (iii) is violated. At this juncture, the hypothesis of Case (ii) is satisfied, and the previous analysis of Case (ii) comes into effect. Clearly, if $\hat{f}(n+k)|_{\hat{f}(n)>f^*}=f^*$, the quantity $\hat{f}(n+k+1)|_{\hat{f}(n)>f^*}$ is calculated using (21) as in Case (i), converging to the fixed point, $f^*$, as n→∞.

To complete the proof, the analyses of the three cases are combined to show that the total probability $\hat{f}(.)$, converges to $f^*$.

From (34), there exists m>n such that $$Pr[\hat{f}(m)|_{\hat{f}(n)<f^*} \geq f^*] = 1. \quad (47)$$

This means that $\hat{f}(m)|_{\hat{f}(n)<f^*} \geq f^*$, but $\hat{f}(m+1)|_{\hat{f}(n)<f^*} < \hat{f}(m)|_{\hat{f}(n)<f^*}$ since $\hat{f}(m)|_{\hat{f}(n)<f^*}$ obeys (35). Equation (35) yields:

$$\hat{f}(m)|_{\hat{f}(n)<f^*} = f^* \pm \delta, \quad (48)$$

where δ→0 as n→∞. Hence, there exists $n_0$>m, and ε arbitrarily small such that:

$$\lim_{n_0 \to \infty} Pr[|\hat{f}(n_0)|_{\hat{f}(n)<f^*} - f^*| < \epsilon] = 1. \quad (49)$$

In the contrary scenario of (46), it is known that there exists m>n such that:

$$Pr[\hat{f}(m)|_{\hat{f}(n)>f^*} \leq f^*] = 1. \quad (50)$$

Hence $\hat{f}(m)|_{\hat{f}(n)>f^*}<f^*$, but $\hat{f}(m+1)|_{\hat{f}(n)>f^*}>\hat{f}(m)|_{\hat{f}(n)>f^*}$. From (23), it can be seen that:

$$\hat{f}(m)|_{\hat{f}(n)>f^*} = f^* \pm \delta, \quad (51)$$

where δ→0 as n→∞. Again, there exists $n_0$=m, and ε arbitrarily small such that:

$$\lim_{n_0 \to \infty} Pr[|\hat{f}(n_0)|_{\hat{f}(n)>f^*} - f^*| < \epsilon] = 1. \quad (52)$$

Combining (22), (49), and (52), yields:

$$\lim_{t \to \infty} Pr[\hat{f}(t)|_{\hat{f}(n)=f^*} = f^*] = 1, \quad (53)$$

$$\lim_{t \to \infty} Pr[\hat{f}(t)|_{\hat{f}(n)<f^*} = f^*] = 1, \text{ and} \quad (54)$$

$$\lim_{t \to \infty} Pr[\hat{f}(t)|_{\hat{f}(n)>f^*} = f^*] = 1. \quad (55)$$

From the three cases discussed above, the total probability $\hat{f}(t)=f^*$ is evaluated as:

$$Pr[\hat{f}(t) = f^*] = Pr[\hat{f}(t)|_{\hat{f}(n)=f^*} = f^*]Pr[\hat{f}(n) = f^*] + \quad (56)$$
$$Pr[\hat{f}(t)|_{\hat{f}(n)<f^*} = f^*]Pr[\hat{f}(n) < f^*] +$$
$$Pr[\hat{f}(t)|_{\hat{f}(n)>f^*} = f^*]Pr[\hat{f}(n) > f^*].$$

Since the conditioning events are mutually exclusive and collectively exhaustive, (53), (54), (55), and (56) are combined to yield:

$$\lim_{t \to \infty} Pr[\hat{f}(t) = f^*] = 1, \quad (57)$$

and the result is proven.

Theorem 2 (Rate of Convergence of Process D_S_H_$E_{2,2}$). If $f^*$ is set at 0.5, then $E[\hat{f}(1)]=0.5$, for Process D_S_H_$E_{2,2}$, implying a one-step convergence in the expected value.

Proof. From (23) it can be seen that $\hat{f}(n+1)$ has the value given below $$\hat{f}(n+1)|_{\hat{f}(n)<f^*} = \hat{f}(n) + \frac{p - \hat{f}(n)}{n+1}. \quad (58)$$

whenever $\hat{f}(n)<f^*$.

But independent of the value set for $\hat{f}(0)$ in the initialization process, this quantity cancels in the computation of $\hat{f}(1)$, leading to the simple expression (obtained by setting n=0) that $\hat{f}(1)=p$ whenever $\hat{f}(0)<0.5$.

Similarly, using expression (35), it is clear that $\hat{f}(1)$ has the value $1-p$ whenever $\hat{f}(0)>0.5$.

Initializing the value of $\hat{f}(0)$ to be less than $f^*$ with probability s, leads to:

$\hat{f}(1)=sp\hat{f}(0)+sp[1-\hat{f}(0)]$, which can be expressed in its matrix form as follows:

$$\begin{bmatrix} \hat{f}(1) \\ 1 - \hat{f}(1) \end{bmatrix} = \begin{bmatrix} sp & s(1-p) \\ sp & s(1-p) \end{bmatrix}^T \begin{bmatrix} \hat{f}(0) \\ 1 - \hat{f}(0) \end{bmatrix}. \quad (59)$$

The above, of course, implies that the value of $\hat{f}(0)$ can be initialized to be greater than $f^*$ with probability 1−s. Thus, $\hat{f}(1)=(1-s)(1-p)\hat{f}(0)+(1-s)p[1-\hat{f}(0)]$, which can also be expressed using the matrix form as follows:

$$\begin{bmatrix} \hat{f}(1) \\ 1 - \hat{f}(1) \end{bmatrix} = \begin{bmatrix} (1-s)(1-p) & (1-s)p \\ (1-s)(1-p) & (1-s)p \end{bmatrix}^T \begin{bmatrix} \hat{f}(0) \\ 1 - \hat{f}(0) \end{bmatrix}. \quad (60)$$

From (59), (60), and using $\hat{F}(\bullet)$ to denote the vector $[\hat{f}(\bullet), 1-\hat{f}(\bullet)]$, the expected value of $\hat{f}(1)$ and $1-\hat{f}(1)$ becomes:

$$E[\hat{F}(1)] = M^T E[\hat{F}(0)], \quad (61)$$

where M is the Markov transition matrix given by:

$$M^T = \begin{bmatrix} sp+(1-s)(1-p) & s(1-p)+(1-s)p \\ sp+(1-s)(1-p) & s(1-p)+(1-s)p \end{bmatrix}^T. \quad (62)$$

Calculating the eigenvalues of M, yields $\lambda_1=1$ and $\lambda_2=0$, and hence the Markov chain converges in a single step!!

Therefore, if $\hat{f}(0)$ is uniformly initialized with probability $s=0.5$, $E[\hat{f}(1)]$ attains the value of $f^*=0.5$ in a single step.

Theorem 3 (Convergence of Process D_S_H_$E_{m,2}$). Consider a stationary, memoryless source with alphabet $S=\{s_1, \ldots, s_m\}$ whose probabilities are $P=[p_1, \ldots, p_m]$, the code alphabet $A=\{0, 1\}$, and a binary Huffman tree, T, constructed using Huffman's process. If the source sequence $X=x[1] \ldots x[M]$ is encoded by means of the Process D_S_H_$E_{m,2}$ and T, generating the output sequence $Y=y[1] \ldots y[R]$, then $$\lim_{n \to \infty} Pr[\hat{f}(n) = f^*] = 1, \quad (63)$$

where $f^*$ is the requested probability of 0 in the output $(1-f_{max} \leq f^* \leq f_{max})$ and $$\hat{f}(n) = \frac{c_0(n)}{n}$$

with $c_0(n)$ being the number of 0's encoded up to time n.

Proof. Assume that the maximum number of levels in T is j. Since different symbols coming from the input sequence are being encoded, it is clear that the level j is not reached for every symbol. Observe that the first node of the tree is reached for every symbol coming from X—which is obvious, since every path starts from the root of T. Using this fact the basis step is proved, and assuming that the fixed point, $f^*$, is achieved at every level (up to j-1) of T, the inductive step that $f^*$ is also attained at level j can be proven.

Basis step: It has to be proved that the fixed point $f^*$ is achieved at the first level of T. Note that the root node has the associated probability equal to unity, and hence its left child has some probability $p_1 \geq 0.5$ (because of the sibling property), and the right child has probability $1-p_1$. This is exactly a Huffman tree with three nodes as in Theorem 1.

Depending on the condition $\hat{f}(n)<f^*$, the value of $\hat{f}(n)$ will be increased (Case (ii) of Theorem 1) or decreased (Case (iii) of Theorem 1) by $\Delta_1$ as given in (24) or (36) respectively. Whenever $\hat{f}(n)$ asymptotically reaches the value of $f^*$, it will stay at this fixed point (Case (i) of Theorem 1). By following the rigorous analysis of Theorem 1, omitted here for the sake of brevity, it is clear that $\hat{f}(n)$ asymptotically attains the fixed point $f^*$ as $n \to \infty$, w.p.1.

Inductive hypothesis: Assume that the fixed point $f^*$ is attained by Process D_S_H_$E_{m,2}$ at level $j-1>2$, for $n \to \infty$ with probability unity.

Inductive step: It is to be shown that the fixed point $f^*$ is asymptotically achieved at level $l=j$. Since the level j may not reached for all the symbols coming from the input sequence, the decision regarding the assignment 0-1 or 1-0 for these symbols must have been taken at a level k<j. In this case, the argument is true for j, because of the inductive hypothesis.

For the case in which the level j is reached, the decision concerning the branch assignment is to be taken in a subtree, $T_j$, whose root (at level j) has weight $\overline{w}$, and its two leafs have probabilities $p_{j1}$ and $p_{j2}$. After normalizing (i.e. dividing by $\overline{w}$), the root of $T_j$ will have an associated normalized probability 1, the left child has the associated normalized probability $$p_j = \frac{p_{j1}}{\overline{w}},$$

and the right child has probability $$1 - p_j = \frac{p_{j2}}{\overline{w}},$$

where $p_1 \geq 0.5$ because of the sibling property.

Since the decision on the branch assignment is being taken at the root of $T_j$, if $\hat{f}(n)<f^*$, the value of $\hat{f}(n)$ will be increased by an amount $\Delta_j$ as given in (24). This corresponds to Case (ii) of Theorem 1. On the other hand, if $\hat{f}(n)>f^*$, $\hat{f}(n)$ will be decrease by $\Delta_j$ as given in (36), which corresponds to Case (iii) of Theorem 1. Finally, if $\hat{f}(n)=f^*$, $\hat{f}(n)$ will asymptotically stay at the fixed point $f^*$ (Case (i) of Theorem 1). As in the basis step, by following the rigorous analysis of Theorem 1, which is omitted here for the sake of brevity, it follows that $\hat{f}(n)$ asymptotically achieves the fixed point $f^*$ as $n \to \infty$, w.p.1.

The induction follows and the theorem is proved.

Theorem 4 (Convergence of Process D_A_H_$E_{2,2}$). Consider a memoryless source with alphabet $S=\{0, 1\}$ and the code alphabet, $A=\{0, 1\}$. If the source sequence $X=x[1], \ldots, x[n], \ldots$, with $x[i] \in S$, $i=1, \ldots, n, \ldots$, is encoded using the Process Process D_A_H_$E_{2,2}$ so as to yield the output sequence $Y=y[1], \ldots, [n], \ldots$, such that $y[i] \in A$, $i=1, \ldots, n, \ldots$, then $$\lim_{n \to \infty} Pr[\hat{f}(n) = f^*] = 1, \quad (64)$$

where $f^*$ is the requested probability of 0 in the output, and $$\hat{f}(n) = \frac{c_0(n)}{n}$$

with $c_0(n)$ being the number of 0's encoded up to time n.

Proof. It is to be shown that the fixed point $f^*$ is asymptotically achieved by Process D_A_H_$E_{2,2}$ as $n \to \infty$, with probability unity. Observe that at each time instant, Process D_A_H_$E_{2,2}$ maintains a Huffman Tree $T_n$, which has the sibling property. $T_n$ has the root, whose probability or weight is unity, the left child with probability $\hat{p}(n)$, and the right child whose probability is $1-\hat{p}(n)$, where $\hat{p}(n) \geq 0.5$ because of the sibling property.

The details of the proof follow the exact same lines as the proof of Theorem 1. They are not repeated here. However, it is clear that at each time instant 'n', there are three cases for $\hat{f}(n)$:

(i) $\hat{f}(n)=f^*$: In this case, as n increases indefinitely, $\hat{f}(n)$ will stay at the fixed point $f^*$, by invoking Case (i) of Theorem 1, where the probability of 0 in the input at time 'n' is $\hat{p}(n)$.

(ii) $\hat{f}(n)<f^*$: In this case, the value of $\hat{f}(n)$ will be increased by $\Delta$, as given in (24). This corresponds to Case (ii) of Theorem 1.

(iii) $\hat{f}(n)>f^*$: In this case, the value $\hat{f}(n)$ will be decreased by $\Delta$, as given in (36). This corresponds to Case (iii) of Theorem 1.

With these three cases, and mirroring the same rigorous analysis done in Theorem 1, one can conclude that the estimated probability of 0 in the output, $\hat{f}(n)$, converges to the fixed point $f^*$, as $n\to\infty$. This will happens w. p. 1, as stated in (64).

Theorem 5 (Convergence of Process $D\_A\_H\_E_{m,2}$). Consider a memoryless source with alphabet $S=\{s_1, \ldots, s_m\}$ whose probabilities are $P=[p_1, \ldots p_m]$, and the code alphabet $A=\{0, 1\}$. If the source sequence $X=x[1] \ldots x[M]$ is encoded by means of the Process $D\_A\_H\_E_{m,2}$, generating the output sequence $Y=y[1] \ldots y[R]$, then $$\lim_{n\to\infty} Pr[\hat{f}(n) = f^*] = 1, \quad (65)$$

where $f^*$ is the requested probability of 0 in the output $(1-f_{max}\leq f^*\leq f_{max})$, and $$\hat{f}(n) = \frac{c_0(n)}{n}$$

with $c_0(n)$ being the number of 0's encoded up to time n.

Proof. Considering an initial distribution for the symbols of S, a Huffman tree, $T_0$, is created at the beginning of Process $D\_A\_H\_E_{m,2}$. As in Process $D\_S\_H\_E_{m,2}$, it is assumed that the maximum level of $T_k$ is $l=j$. This level will not be reached at all time instants. However, the first node is reached for every symbol coming from X, because every path starts from the root of $T_k$. Assuming that the fixed point $f^*$ is achieved at every level (up to j−1) of $T_k$, it is shown by induction that $f^*$ is also asymptotically attained at level j.

Basis step: The root node of $T_0$ has the normalized weight of unity, its left child has the normalized weight $\hat{p}(k)$, and hence the right child has the normalized weight $1-\hat{p}(k)$, where $\hat{p}(k)\geq 0.5$ because of the sibling property. There are again three cases for the relation between $\hat{f}(n)$ and $f^*$.

(i) Whenever $\hat{f}(n)=f^*$, $\hat{f}(n)$ will asymptotically stay at the fixed point $f^*$ as $n\to\infty$.

(ii) If $\hat{f}(n)<f^*$, $\hat{f}(n)$ will be increased by $\Delta_1$, as in Case (ii) of Theorem 4.

(iii) If $\hat{f}(n)>f^*$, $\hat{f}(n)$ will be decreased by $\Delta_1$ (Case (iii) of Theorem 4).

From these three cases and from the analysis done in Theorem 4, it can be shown that $\hat{f}(n)$ will converge to $f^*$ as $n\to\infty$ w. p. 1, and hence (65) is satisfied Inductive hypothesis: Assume that the fixed point $f^*$ is attained w. p. 1 by $D\_A\_H\_E_{m,2}$ at any level $j-1\geq 2$ of $T_k$, for $n\to\infty$.

Inductive step: In order to show that $f^*$ is asymptotically achieved at level $l=j$, two cases are considered. The first case is when the level j is not reached by the symbol being encoded. In this case, the labeling strategy was considered in a level $i<j$, for which the result follows from the inductive hypothesis.

For the case in which the level j is reached, the decision on the labeling is being taken in a subtree, $T_{k_j}$, whose root has the estimated probability $\overline{w}(k)$, and its two leafs have estimated probabilities $\hat{p}_{j_1}(k)$ and $\hat{p}_{j_2}(k)$. After normalizing (i.e. dividing by $\overline{w}(k)$), the root of $T_{k_j}$ has probability unity, the left child has probability $$\hat{p}_j(k) = \frac{\hat{p}_{j_1(k)}}{\hat{w}(k)},$$

and the right child has probability $$1 - \hat{p}_j(k) = \frac{\hat{p}_{j_2(k)}}{\hat{w}(k)},$$

where $\hat{p}_j(k)\geq 0.5$ because of the sibling property.

Again, there are three cases for $\hat{f}(n)$ for the local subtree. When $\hat{f}(n)=f^*$, $\hat{f}(n)$ will asymptotically stay at the fixed point $f^*$. Whenever $\hat{f}(n)<f^*$, $\hat{f}(n)$ will be increased by $\Delta_j(k)$, calculated as in (24), which is positive, since it depends on $\hat{p}_j(k)\geq 0.5$. If $\hat{f}(n)>f^*$, $\hat{f}(n)$ will be decreased by $\Delta_j(k)$ (again positive, because $\hat{p}_j(k)\geq 0.5$) as given in (36). From these three cases and the analysis done in Theorem 5, it follows in an analogous manner that Process $D\_A\_H\_E_{m,2}$ achieves the fixed point $f^*$ as $n\to\infty$ w. p. 1, as stated in (65).

Theorem 6 (Convergence of Process $RV\_A\_H\_E_{2,2}$). Consider a memoryless source whose alphabet is $S=\{0, 1\}$ and a code alphabet, $A=\{0, 1\}$. If the source sequence $X=x[1], \ldots, x[n], \ldots$, with $x[i]\in S, i=1, \ldots, n, \ldots$, is encoded using the Process $RV\_A\_H\_E_{2,2}$ so as to yield the output sequence $Y=y[1], \ldots, y[n], \ldots$, such that $y[i]\in A, i=1, \ldots, n, \ldots$, then $$\lim_{n\to\infty} E[\hat{f}(n)] = f^*, \text{ and} \quad (66)$$

$$\lim_{n\to\infty} \text{Var}[\hat{f}(n)] = 0, \quad (67)$$

where $f^*=0.5$ is the requested probability of 0 in the output, and $$\hat{f}(n) = \frac{c_0(n)}{n}$$

with $c_0(n)$ being the number of 0's encoded up to time n. Thus $\hat{f}(n)$ converges to $f^*$ in the mean square sense, and in probability.

Proof. The estimated probability of 0 in the output at time 'n+1' given the value of $\hat{f}(n)$, $\hat{f}(n+1)|_{\hat{f}(n)}$, is calculated as follows:

$$\hat{f}(n+1)|_{\hat{f}(n)} = \begin{cases} \frac{c_0(n)}{n+1} & \text{if } y[n+1] = 0 \\ \frac{c_0(n)+1}{n+1} & \text{if } y[n+1] = 1 \end{cases} \quad (68)$$

where $\hat{f}(n)$ is the estimated probability of 0 in the output, obtained as the ratio between the number of 0's in the output and n as $$\hat{f}(n) = \frac{c_0(n)}{n}.$$

On the other hand, the output of Process RV_A_H_$E_{2,2}$ at time n+1, is generated as per the following probabilities:

$$y[n+1] = \begin{cases} 0 & \text{with probability } [1-\hat{f}(n)]\hat{p}(n) + \hat{f}(n)(1-\hat{p}(n)) \\ 1 & \text{with probability } [1-\hat{f}(n)](1-\hat{p}(n)) + \hat{f}(n)\hat{p}(n), \end{cases} \quad (69)$$

where $\hat{p}(n)$ is the estimated probability of 0 in the input at time 'n', and $\hat{p}(n) \geq 0.5$ because of the sibling property.

Unlike in the convergence analysis of Process D_S_H_$E_{2,2}$ in which the exact value of $\hat{f}(n+1)|_{\hat{f}(n)}$ was calculated, here the expected value of $\hat{f}(n+1)|_{\hat{f}(n)}$ is computed. For the ease of notation, let $\underline{\hat{f}}(n+1)$ be the expected value of $\hat{f}(n+1)$ given $\hat{f}(n)$. Replacing the value of $c_o(n)$ by $n\hat{f}(n)$ in (68), and using (69), all the quadratic terms disappear. Taking expectations again $\underline{\hat{f}}(n+1)$ is evaluated as:

$$\underline{\hat{f}}(n+1) = \frac{n\underline{\hat{f}}(n)+1}{n+1}\{[1-\underline{\hat{f}}(n)]\hat{p}(n) + \underline{\hat{f}}(n)(1-\hat{p}(n))\} + \quad (70)$$
$$\frac{n\underline{\hat{f}}(n)}{n+1}\{[1-\underline{\hat{f}}(n)](1-\hat{p}(n)) + \underline{\hat{f}}(n)\hat{p}(n)\}.$$

After some algebraic manipulations, (70) can be written as:

$$\underline{\hat{f}}(n+1) = \underline{\hat{f}}(n) + \frac{\hat{p}(n)[1-2\underline{\hat{f}}(n)]}{n+1}. \quad (71)$$

The convergence of (76) can be paralleled by the convergence results of Theorem 1 with the exception that instead of speaking of $\hat{f}(n)$ the convergence of $E[\hat{f}(n)]$ is investigated. This proof is achieved by analyzing three mutually exclusive cases for $\underline{f}(n)$.

(i) $\underline{f}(n)=f^*$.

In this case, Equation (71) asymptotically leads to $\underline{f}(n+1)=f^*$. This implies that if $\underline{f}(n)$ is at the fixed point $f^*$, it will remain there as n→∞, and hence (66) is satisfied.

(ii) $\underline{f}(n)<f^*$.

In this scenario, equation (71) can be written as:

$$\underline{f}(n+1)=\underline{f}(n)+\Delta, \quad (72)$$

where $$\Delta = \frac{\hat{p}(n)[1-2\underline{\hat{f}}(n)]}{n+1} > 0,$$

since $\underline{f}(n)<f^*$.

Note that (72) is similar to (24), where $\Delta>0$ again implying that $\underline{f}(n)$ increases at time 'n' towards $f^*$.

(iii) $\underline{f}(n)>f^*$.

For the analysis of this case, (71) is expressed as below:

$$\underline{f}(n+1)=\underline{f}(n)-\Delta, \quad (73)$$

where $$\Delta = \frac{\hat{p}(n)[2\underline{\hat{f}}(n)-1]}{n+1} > 0,$$

because $\underline{f}(n)>f^*$.

For this case, (73) is analogous to (36), where $\Delta>0$ except that $\underline{f}(n)$ replaces the term $\hat{f}(n)$ of (36).

With these three cases, and following the rigorous analysis of Theorem 1 (omitted here for the sake of brevity), it can be seen that $$\lim_{n\to\infty} E[\hat{f}(n)] = f^*. \quad (74)$$

Thus $\hat{f}(n)$ is a random variable whose expected value, $\underline{f}(n)$, converges to the desired probability of 0 in the output, $f^*$, as n→∞.

To analyze the asymptotic variance of this random variable, $\hat{f}(n)$, the calculation is as follows:

$$Var[\hat{f}(n+1)]=E[\hat{f}^2(n+1)]-E[\hat{f}(n+1)]^2. \quad (75)$$

To evaluate $$E[\hat{f}^2(n+1)],$$

the expression for the conditional expectation $$E[\hat{f}^2(n+1)|_{\hat{f}(n)}]$$

from (68) is written as follows:

$$E[\hat{f}^2(n+1)|_{\hat{f}(n)}] = \left(\frac{n\hat{f}(n)+1}{n+1}\right)^2 \quad (76)$$
$$\{[1-\hat{f}(n)]\hat{p}(n) + \hat{f}(n)[1-\hat{p}(n)]\} +$$
$$\left(\frac{n\hat{f}(n)}{n+1}\right)^2 \{[1-\hat{f}(n)][1-\hat{p}(n)] + \hat{f}(n)\hat{p}(n)\}$$

On simplification, it turns out that all the cubic terms involving $\hat{f}(n)$ cancel (fortunately). Taking expectations a second time yields $E[\hat{f}^2(n+1)]$ to be a linear function of $E[\hat{f}^2(n)]$, E[f̂(n)] and some constants not involving f̂(n). More specifically, if f̲(n) represents E[f̂(n)], $$\underline{\hat{f}}^2(n+1) = \frac{1}{(n+1)^2}\left\{\underline{\hat{f}}^2(n)[n^2 - 2n + 4np] + \right. \tag{77}$$

$$\left. [2p - 1 + 2n - 2np]\underline{\hat{f}}(n) + (1-p)\right\}$$

Normalizing this equation by multiplying both sides by $(n+1)^2$ yields $$(n+1)^2\left[\underline{\hat{f}}^2(n+1)\right] = \tag{78}$$

$$\left\{\underline{\hat{f}}^2(n)[n^2 - 2n + 4np] + [2p - 1 + 2n - 2np]\underline{\hat{f}}(n) + (1-p)\right\}.$$

There are now two situations, namely the case when the sequence converges and alternatively, when it does not. In the latter case, f̲(n) converges slower than $n^2$. Taking the limit as $n \to \infty$, this leads to the trivial (non-interesting) result that f̲(∞)=f̲(∞). The more meaningful result is obtained when f̲(n) converges faster than $n^2$. In this case, expanding both sides and setting f̲(n) to its terminal value f̲(∞) (which is ultimately solved for, and hence moved to the LHS), yields:

$$\lim_{n\to\infty} [n^2 + 2n + 1 - n^2 + 2n - 4np]\underline{\hat{f}}^2(\infty) = \tag{79}$$

$$\lim_{n\to\infty} [2p - 1 + 2n - 2np]\underline{\hat{f}}(\infty) + (1-p). \tag{80}$$

Observe that the $n^2$ terms again cancel implying that a finite limit for the solution exists. This leads to:

$$\underline{\hat{f}}^2(\infty) = \lim_{n\to\infty} \frac{2p - 1 + 2n - 2np}{4n - 4np + 1}\underline{\hat{f}}(\infty). \tag{81}$$

or rather:

$$\underline{\hat{f}}^2(\infty) = \lim_{n\to\infty} \frac{2n(1-p)}{4n(1-p)}\underline{\hat{f}}(\infty) = 0.25. \tag{82}$$

Since f̲(∞) is 0.5 and f̲²(∞) is 0.25, it follows that Var[f̂] is zero. Thus f̂(n) converges to a random variable with mean f* and variance zero, implying both mean square convergence and convergence in probability. Hence the theorem.

Theorem 7 (Convergence of Process RV_A_H_$E_{m,2}$). Consider a memoryless source whose alphabet is $S=\{s_1, \ldots, s_m\}$ and a code alphabet, $A=\{0, 1\}$. If the source sequence $X=x[1], \ldots, x[M], \ldots$, with $x[i] \in S$, $i=1, \ldots, m, \ldots$, is encoded using the Process RV_A_H_$E_{m,2}$ so as to yield the output sequence $Y=y[1], \ldots, y[R], \ldots$, such that $y[i] \in A$, $i=1, \ldots, R, \ldots$, then $$\lim_{n\to\infty} E[\hat{f}(n)] = f^*, \text{ and} \tag{83}$$

$$\lim_{n\to\infty} Var[\hat{f}(n)] = 0, \tag{84}$$

where f*=0.5 is the requested probability of 0 in the output, and $$\hat{f}(n) = \frac{c_0(n)}{n}$$

with $c_0(n)$ being the number of 0's encoded up to time n. Thus f̂(n) converges to f* in the mean square sense and in probability.

Proof. As per Process RV_A_H_$E_{m,2}$, a Huffman tree, $T_0$, is initially created based on the initial assumed distribution for the symbols of S. As in the proof of convergence of Process D_A_H_$E_{m,2}$ (Theorem 5), it is again assumed that the maximum level of $T_k$ is l=j. This level may not be reached all the time instants. However, the fist node is reached for every symbol coming from X, because every path starts from the root of $T_k$. The proof of Theorem 6 now completes the proof of the basis case.

For the inductive argument, the inductive hypothesis is used, i.e., that the fixed point f* is achieved at every level (up to j−1) of $T_k$. By arguing in a manner identical to the proof of Theorem 5 (omitted here to avoid repetition), the result follows by induction on the number of levels in the tree $T_k$.

Appendix C

A Simple Encryption Useful for DODE⁺

This Appendix contains a straightforward encryption that can be used in DODE⁺ as a special case of $ENC_{Preserve}$.

Suppose that the input sequence X is encoded by using any deterministic or randomized embodiment for DODE, generating an output sequence $Y=y[1] \ldots y[R]$, where $y[i] \in A=\{0, 1\}$. Y is parsed using $m=2^k$ source symbols, $S=\{s_0, \ldots, s_{m-1}\}$, whose binary representations are obtained in a natural manner (i.e. from 0000 . . . to 1111 . . . ). The output, Y', is generated by encoding each of the R div k symbols, $s_i$, of Y as the corresponding $w_i$ obtained from a particular encoding scheme, $\phi$: $S=\{s_0, \ldots s_{m-1}\} \to C=\{w_0, \ldots, w_{m-1}\}$. The remaining R mod k bits can be encoded by using a similar mapping for a smaller number of bits.

Notice that there are m! different encoding schemes, and that each encoding scheme has a unique key, K, which is an integer from 0 to m!−1. The Process to transform a given key into a mapping consists of repeatedly dividing the key by a number, Z, which starts at m! and is decremented to unity. The remainder at every stage specifies the current mapping, and the dividend is then divided by the decremented value of Z.

More formally, let $w_{j0}w_{j1} \ldots w_{jk}$ refer to $w_j \in C$.

The mapping procedure proceeds as follows. It starts with $S=\{s_0, \ldots, s_{m-1}\}$. K is divided by m obtaining the dividend, $d_0$, and the reminder, $j_0$. The code word of C, $w_0$, is $s_{j_0}$, which is removed from S. Then, $d_0$ is divided by m−1 obtaining d, and $j_1$, and it continues in the same fashion until all the symbols of S have been removed.

The process is straightforward and explained in standard textbooks, and omitted in the interest of brevity. However, a small example will help to clarify this procedure.

EXAMPLE 7

Let S={000, 001, 010, 011, 100, 101, 110, 111} be the source alphabet for the case when the output obtained from DODE is Y=011101001010110010110, and the key is K=2451.

The mapping construction procedure is depicted in Table 28. Dividing K by 8, we obtain $d_0$=308, and $i_0$=3, and hence $s_3$=011 is assigned to $w_0$; $s_3$ is removed from S (in bold typeface in the table). Dividing 308 by 7, we obtain $d_1$=43 and $i_0$=5, and hence $s_5$=110 is assigned to $w_1$; $s_5$ is removed from S (in bold typeface in the table).

The mapping construction procedure continues in the same fashion obtaining the following mapping shown in Table 29 below.

Finally, we parse Y using this mapping, and hence we obtain Y'=100000110001101001101.

It is easy to see that if the symbols of S are equally likely (as it is, since the output of DODE and RDODE guarantee Statistical Perfect Secrecy), the key specification capabilities presented above make DODE$^+$ a truly $$8 \quad \left\lfloor \frac{2451}{306} \right\rfloor : 3 \qquad 7 \quad \left\lfloor \frac{306}{43} \right\rfloor : 5 \qquad 6 \quad \left\lfloor \frac{43}{7} \right\rfloor : 1$$

| | | | | | | | |
|---|---|---|---|---|---|---|---|
| 0 | 000 | | 0 | 000 | | 0 | 000 |
| 1 | 001 | | 1 | 001 | | 1 | 001 |
| 2 | 010 | ⇒ | 2 | 010 | ⇒ | 2 | 010 | ⇒
| 3 | 011 | | 3 | 100 | | 3 | 100 |
| 4 | 100 | | 4 | 101 | | 4 | 101 |
| 5 | 101 | | 5 | 110 | | 5 | 111 |
| 6 | 110 | | 6 | 111 | | | |
| 7 | 111 | | | | | | |

Table 28: An example of a straightforward mapping construction procesdure that can be used by DODE+. In this case, the key K is 2451, and the encryption is achieved by transforming sequences of three symbols at a time.

TABLE 29

An example of one of the 8! possible encoding schemes from S to C. In this case, the key K is 2451, and the encryption is achieved by transforming sequences of three symbols at a time.

| S | binary | | C | binary |
|---|---|---|---|---|
| $s_0$ | 000 | → | $w_0$ | 011 |
| $s_1$ | 001 | → | $w_1$ | 110 |
| $s_2$ | 010 | → | $w_2$ | 001 |
| $s_3$ | 011 | → | $w_3$ | 100 |
| $s_4$ | 100 | → | $w_4$ | 010 |
| $s_5$ | 101 | → | $w_5$ | 000 |
| $s_6$ | 110 | → | $w_6$ | 101 |
| $s_7$ | 111 | → | $w_7$ | 111 | functional cryptosystem that also guarantees Statistical Perfect Secrecy. Thus, the cryptanalysis of DODE$^+$ using statistical means is impossible. Breaking DODE$^+$ necessarily requires the exhaustive search of the entire key space.

The embodiments of the invention in which an exclusive property or privilege is claimed are defined as follows:

1. A method for encoding plaintext to create ciphertext using an Oommen-Rueda tree, which Oommen-Rueda tree has a root, branches and leaves, comprising the steps of:
   (a) receiving a first character of plaintext;
   (b) traversing the Oommen-Rueda tree between the root of the Oommen-Rueda tree, and a leaf of the Oommen-Rueda tree corresponding to the first character of plaintext, and recording an Assignment Value of at least one branch of the Oommen-Rueda tree so traversed;
   (c) calculating a character of ciphertext related to the Assignment Value of the at least one branch of the Oommen-Rueda tree so traversed;
   (d) calculating an Assignment Value for at least one other branch of the Oommen-Rueda tree related to a distribution of the ciphertext previously calculated;
   (e) receiving a next character of plaintext;
   (f) traversing the Oommen-Rueda tree between the root of the Oommen-Rueda tree and a further leaf of the Oommen-Rueda tree corresponding to a next character of plaintext;
   (g) calculating a further Assignment Value for at least one further traversed branch of the Oommen-Rueda tree related to a further distribution of the further ciphertext previously calculated;
   (h) calculating a further character of ciphertext relating to the further Assignment Value for the at least one further traversed branch of the Oommen-Rueda tree;
   (i) repeating steps (e) through (h) until all of the plaintext has been processed;
   (j) outputting the ciphertext; and
   wherein the Assignment Value for at least one branch traversed is determined in accordance with a Branch Assignment Rule.

2. The method for encoding plaintext to create ciphertext using an Oommen-Rueda tree according to claim 1 wherein when a member of the ciphertext alphabet is under-represented in the ciphertext generated thus far, the Branch Assignment Rule assigns that member of the ciphertext alphabet to at least one of the branches being traversed between the root and the leaf so that that member of the ciphertext alphabet is no longer as under-represented as before the assignment.

3. The method for encoding plaintext to create ciphertext using an Oommen-Rueda tree according to claim 1 wherein when a member of the ciphertext alphabet is under-represented in the ciphertext generated thus far, the Branch Assignment Rule assigns that member of the ciphertext alphabet more frequently than other members of the ciphertext alphabet to the branches being traversed between the root and the leaf so that that member of the ciphertext alphabet is no longer as under-represented as before the assignment.

4. The method for encoding plaintext to create ciphertext using an Oommen-Rueda tree according to claim 1 wherein when the ciphertext alphabet is binary, the Branch Assignment Rule assigns a zero to the majority of branches being traversed between the root and the leaf when zero is under-represented in the ciphertext generated thus far, and assigns a one to the majority of branches being traversed between the root and the leaf when one is under-represented in the ciphertext generated thus far.

5. The method for encoding plaintext to create ciphertext using an Oommen-Rueda tree according to claim 1 wherein, when the conditional frequency of one member of the ciphertext alphabet given a particular sequence of members of the ciphertext alphabet in the ciphertext generated thus far, is under-represented in the ciphertext generated thus far, the Branch Assignment Rule assigns that member of the ciphertext alphabet to at least one of the branches being traversed between the root and the leaf so that the said conditional frequency of that member of the ciphertext alphabet is no longer as under-represented as before the assignment.

6. The method for encoding plaintext to create ciphertext using an Oommen-Rueda tree according to claim 1 wherein, when the conditional frequency of one member of the ciphertext alphabet given a particular sequence of members of the ciphertext alphabet in the ciphertext generated thus far, is under-represented in the ciphertext generated thus far, the Branch Assignment Rule assigns that member of the ciphertext alphabet more frequently than other members of the ciphertext alphabet to the branches being traversed between the root and the leaf so that the said conditional frequency of that member of the ciphertext alphabet is no longer as under-represented as before the assignment.

7. The method for encoding plaintext to create ciphertext using an Oommen-Rueda tree according to claim 1 wherein the Branch Assignment Rule assigns a member of the ciphertext alphabet to at least one of the branches being traversed between the root and the leaf, such assignment being determined by comparing a number associated with the frequency of at least one member of the ciphertext alphabet in the ciphertext generated thus far, with a number associated with the output of a pseudo-random number generator.

8. The method for encoding plaintext to create ciphertext using an Oommen-Rueda tree according to claim 1 wherein when the ciphertext alphabet is binary, the Branch Assignment Rule assigns a member of the binary alphabet to at least one branch being traversed between the root and the leaf by utilizing at least two pseudo-random numbers, zero being assigned when a first pseudo-random number is less than a second pseudo-random number, where the generation of the second pseudo-random number is bounded between a number associated with the frequency of zeros in the ciphertext generated thus far and the quantity of one minus the said number associated with the frequency of zeros in the ciphertext generated thus far.

9. The method for encoding plaintext to create ciphertext using an Oommen-Rueda tree according to claim 1 wherein when the ciphertext alphabet is binary, the Branch Assignment Rule assigns a member of the binary alphabet to at least one of the branches being traversed between the root and the leaf, such assignment being determined by comparing a number associated with the frequency of a member of the binary alphabet in the ciphertext generated thus far, with a number associated with the output of a pseudo-random number generator.

10. The method for encoding plaintext to create ciphertext using an Oommen-Rueda tree according to claim 1 wherein the Branch Assignment Rule assigns a member of the ciphertext alphabet to at least one branch being traversed between the root and the leaf, such assignment being determined by a number associated with the output of a pseudo-random number generator.

11. The method for encoding plaintext to create ciphertext using an Oommen-Rueda tree according to claim 1 wherein when the ciphertext alphabet is binary, the Branch Assignment Rule assigns a member of the binary alphabet to at least one branch being traversed between the root and the leaf, such assignment being determined by comparing a number associated with the a pseudo-random number with a range equal to half the domain of the generator generating the pseudo-random number.

12. The method for encoding plaintext to create ciphertext using an Oommen-Rueda tree according to claim 1 wherein the Branch Assignment Rule assigns a member of the ciphertext alphabet of cardinality R to at least one branch being traversed between the root and the leaf, such assignment being determined by invoking at least two times (R minus 1) pseudo-random numbers, the domains of at least one of the pseudo-random numbers being related to the frequencies of the occurrences of the ciphertext characters generated thus far, and the domain of at least one of the other of the pseudo-random numbers having a mean of i/R for the ith branch of each node encountered in the traversal, where i is the relative position of the branch quantified by a pre-specified ordering of the branches, and the Branch Assignment Rule being such that where the ciphertext character associated with the ith branch in the said ordering is under-represented in the ciphertext generated thus far, it is no longer as under-represented.

13. The method for encoding plaintext to create ciphertext using an Oommen-Rueda tree according to claim 1 wherein when the ciphertext alphabet is binary; the Branch Assignment Rule assigns a member of the binary ciphertext alphabet to at least one branch being traversed between the root and the leaf, such assignment being determined by invoking at least two pseudo-random numbers, the domain of the first of these pseudo-random numbers being related to the frequency of the occurrence of zero in the ciphertext, and the domain of a second of these pseudo-random numbers having a mean of 0.5, and the Branch Assignment Rule being such that when any character of the ciphertext alphabet is under-represented in the ciphertext generated thus far, it is no longer as under-represented.

14. The method for encoding plaintext to create ciphertext using an Oommen-Rueda tree according to claim 1 wherein when the ciphertext alphabet is binary, the Branch Assignment Rule assigns a member of the binary ciphertext alphabet to at least one branch being traversed between the root and the leaf, such assignment being determined by comparing at least the output of two invoked pseudo-random numbers, the first of which has a domain having a mean between a number associated with the frequency of zeros and the quantity 0.5, and the second of which is a pseudo-random number having a domain whose mean is 0.5, and the Branch Assignment Rule being such that where any member of the ciphertext alphabet is under-represented in the binary ciphertext generated thus far, it is no longer as under-represented.

15. The method for encoding plaintext to create ciphertext using an Oommen-Rueda tree according to claims 7, 9, 10, 11, 12, 13, 14, or 8, comprising the further step of receiving first key data associated with an initial seed for at least one of the generators of the pseudo-random numbers utilized by the Branch Assignment Rule.

16. The method for encoding plaintext to create ciphertext using an Oommen-Rueda tree according claim 1 comprising the further steps of, after at least one traversal of the Oommen-Rueda Tree, recalculating a number associated with the frequency weight of at least one of the nodes of the Oommen-Rueda tree including the internal nodes and the leaves depending therefrom, and thereafter restructuring the Oommen-Rueda Tree in accordance with a Tree Restructuring Rule.

17. The A method for encoding plaintext to create ciphertext using an Oommen-Rueda tree according to claim 1, comprising the further step of receiving second key data associated with the structure and labeling of the Oommen-Rueda Tree.

18. The method for encoding plaintext to create ciphertext using an Oommen-Rueda tree according to claim 1, wherein the plaintext is modified prior to processing by the addition of a pre- specified prefix data stream.

19. The method for encoding plaintext to create ciphertext using an Oommen-Rueda tree according to claim 1, wherein at least one of the steps is preformed by a suitably programmed processor.

20. The method for encoding plaintext to create ciphertext using an Oommen-Rueda tree according to claim 1, wherein at least one of the steps is a process executed in software.

21. The method for encoding plaintext to create ciphertext using an Oommen-Rueda tree according to claim 1, wherein at least one of the steps is a process executed in firmware.

22. The method for encoding plaintext to create ciphertext using an Oommen-Rueda tree according to claim 1, further comprising the step of subsequently encrypting the ciphertext generated by any standard encryption process.

23. The method for encoding plaintext to create ciphertext using an Oommen-Rueda tree according to claim 1, wherein the ciphertext possesses Statistical Perfect Secrecy.

24. The method for encoding plaintext to create ciphertext using an Oommen-Rueda tree according to claim 1, wherein the ciphertext output is at least one of displayed, transmitted, and stored.

25. A method for decoding ciphertext encoded utilizing an Oommen-Rueda Tree and utilizing a Branch Assignment Rule to provide Assignment Values for the branches depending from the root of the Oommen-Rueda Tree, comprising the steps of:
   (a) receiving a first character of ciphertext;
   (b) utilizing an Oommen-Rueda Tree having a structure corresponding to the Oommen-Rueda Tree initially utilized to encode the ciphertext and utilizing the same Branch Assignment Rule as utilized to encode the ciphertext to provide the Assignment Values for the branches depending from the root, traversing such Oommen-Rueda Tree from the root towards a leaf, the first character of ciphertext determining the branch to then be traversed;
   (c) if a leaf has not been reached, utilizing the same Branch Assignment Rule as utilized to encode the ciphertext to provide Assignment Values for the branches depending from the node that has been reached, receiving the next character of ciphertext, and continuing to traverse the Oommen-Rueda Tree from the node that has been reached towards a leaf, the current symbol of ciphertext determining the branch to then be traversed;
   (d) when a leaf is reached, recording the plaintext character associated with the label of the leaf, the root becoming the node that has been reached for the purpose of further processing;
   (e) repeating steps c and d until all symbols of ciphertext have been processed.

26. The method for decoding ciphertext according to claim 25 comprising the further step of receiving first key data associated with the initial seed for at least one of the generators of the pseudo-random numbers utilized by the Branch Assignment Rule, where first key data is associated with the first key data utilized by the Encoder.

27. The method for decoding ciphertext according to claim 25, comprising the further step of receiving second key data associated with the structure and labeling of the Oommen-Rueda Tree, where second key data is associated with the second key data utilized by the Encoder.

28. The method for decoding ciphertext according to claim 25, wherein when the plaintext has been modified prior to processing by the addition of a pre-specified prefix data stream, the ciphertext is modified prior to processing by the addition of an encoded pre-specified data stream in a prefix manner, and where this encoded pre-specified data stream is related to the pre-specified data stream utilized by the Encoder.

29. The method for decoding ciphertext according to claim 25, wherein at least one of the steps is preformed by a suitably programmed processor.

30. The method for decoding ciphertext according to claim 25, wherein at least one of the steps is a process executed in software.

31. The method for decoding ciphertext according to claim 25, wherein at least one of the steps is a process executed in firmware.

32. The method of decoding ciphertext according to claim 25, comprising the further steps of initially decrypting the ciphertext data stream using the standard decryption process associated with the encryption process, and thereafter decoding.

33. A method for decoding ciphertext, comprising the steps of:
   (a) creating an Oommen-Rueda Tree structure corresponding to the Oommen-Rueda Tree initially utilized by the Encoder;
   (b) receiving a first character of ciphertext;
   (c) utilizing the Oommen-Rueda Tree structure, and utilizing the same Branch Assignment Rule as utilized by the Encoder to provide the Assignment Values for the branches depending from the root, traversing such Oommen-Rueda Tree from the root towards a leaf, the first character of ciphertext determining the branch to then be traversed;
   (d) if a leaf has not been reached, utilizing the same Branch Assignment Rule as utilized by the Encoder to provide Assignment Values for the branches depending from the node that has been reached, receiving the next character of ciphertext, and continuing to traverse the Oommen-Rueda Tree from the node that has been reached towards a leaf, the current symbol of ciphertext determining the branch to then be traversed;
   (e) when a leaf is reached, recording the plaintext character associated with the label of the leaf, the root becoming the node that has been reached for the purpose of further processing;
   (f) repeating steps d and e until all symbols of ciphertext have been processed.

* * * * *